US009061837B2

(12) United States Patent
Takahashi et al.

(10) Patent No.: US 9,061,837 B2
(45) Date of Patent: Jun. 23, 2015

(54) PACKAGING DEVICE

(71) Applicants: Toshihiro Takahashi, Nagoya (JP); Teruo Imamaki, Nissin (JP)

(72) Inventors: Toshihiro Takahashi, Nagoya (JP); Teruo Imamaki, Nissin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/080,829

(22) Filed: Nov. 15, 2013

(65) Prior Publication Data
US 2014/0224619 A1    Aug. 14, 2014

(30) Foreign Application Priority Data

Feb. 12, 2013 (JP) .................................. 2013-025020
Aug. 5, 2013 (JP) .................................. 2013-162693

(51) Int. Cl.
  B65G 47/24    (2006.01)
  B65G 37/00    (2006.01)
  B65B 11/00    (2006.01)

(52) U.S. Cl.
  CPC ................ *B65G 47/24* (2013.01); *B65B 11/00* (2013.01)

(58) Field of Classification Search
  None
  See application file for complete search history.

(56) References Cited

U.S. PATENT DOCUMENTS

| 2,980,231 | A | * | 4/1961 | Mahaffy et al. ............... | 198/802 |
| 4,061,223 | A | * | 12/1977 | McGinnis ..................... | 198/821 |
| 5,603,198 | A |   | 2/1997 | Rimondi et al. | |
| 2013/0298498 | A1 |   | 11/2013 | Imamaki et al. | |
| 2013/0298503 | A1 |   | 11/2013 | Takahashi et al. | |

FOREIGN PATENT DOCUMENTS

| CN | 2871468 Y | 2/2007 |
| CN | 102211720 A | 10/2011 |
| JP | H01-111604 A | 4/1989 |
| JP | H03-027930 U | 3/1991 |
| JP | H05-330517 A | 12/1993 |
| JP | H06-255635 A | 9/1994 |
| JP | 07-149310 A | 6/1995 |
| JP | 2000-177708 A | 6/2000 |
| JP | 2007-030898 A | 2/2007 |

OTHER PUBLICATIONS

Co Pending U.S. Appl. No. 14/080,833, filed Nov. 15, 2013.
Co Pending U.S. Appl. No. 14/080,834, filed Nov. 15, 2013.
Co Pending U.S. Appl. No. 14/080,872, filed Nov. 15, 2013.
Co Pending U.S. Appl. No. 14/080,882, filed Nov. 15, 2013.
Co Pending U.S. Appl. No. 14/080,902, filed Nov. 15, 2013.
Jul. 18, 2014—(EP) Extended EP Search Report—App 13159467.3.
Aug. 29, 2014—(CN) Notification of First Office Action—App 201310078682.3—Eng Tran.

\* cited by examiner

*Primary Examiner* — Kavel Singh
(74) *Attorney, Agent, or Firm* — Banner & Witcoff, Ltd.

(57) ABSTRACT

A packaging device includes a conveyance mechanism configured to convey a base and an object, a guide portion configured to guide a film, and a processor. The conveyance mechanism includes pulleys, an endless belt routed around the pulleys, a drive portion configured to rotationally drive the belt and a conveyance portion. The conveyance portion includes a first conveyance portion and a second conveyance portion provided in a position separated from the first conveyance portion in a direction in which the belt extends. The first conveyance portion includes a first protruding portion protruding outward from an outer side surface of the belt and a first extending portion extending toward the second conveyance portion. The second conveyance portion includes a second protruding portion protruding outward from the outer side surface of the belt and a second extending portion extending toward the first conveyance portion.

5 Claims, 56 Drawing Sheets

PACKAGING DEVICE

CROSS-REFERENCE TO RELATED APPLICATION

This application claims priority to Japanese Patent Applications No. 2013-025020 filed on Feb. 12, 2013, and No. 2013-162693 filed on Aug. 5, 2013. The disclosures of the foregoing applications are herein incorporated by reference in their entireties.

BACKGROUND

The present disclosure relates to a packaging device that is configured package an object that has been placed on a base by covering both the object and the base with a film.

A packaging device is known that is configured to move a product to a specified position along a conveyor belt and wraps the product with a plastic film at the specified position. In a state in which the product has been placed on a plate-shaped base, this sort of packaging device can also wrap both the base and the product with the film. In that case, the base on which the product has been placed is conveyed in a conveyance direction by the conveyor belt.

SUMMARY

In the packaging device that is described above, when a load bears on the base in the opposite direction from the conveyance direction, the base may slide on the conveyor belt. In that case, there is a possibility that the packaging device will not be able to convey the base in a stable manner.

Various exemplary embodiments of the general principles described herein provide a packaging device that is able to convey, in a stable manner, a base on which an object has been placed.

Various exemplary embodiments herein provide a packaging device configured to package, with a film, an object and a base on which the object is placed. The packaging device includes a conveyance mechanism, a guide portion and a processor. The conveyance mechanism is configured to convey the base along a conveyance path. The conveyance mechanism includes a plurality of pulleys, an endless belt, a drive portion, and a conveyance portion. The plurality of pulleys are disposed such that axes of the plurality of pulleys are parallel to one another. The endless belt is routed around the plurality of pulleys. The drive portion is configured to rotationally drive the belt. The conveyance portion is provided on an outer side surface of the belt. The conveyance portion includes a first conveyance portion and a second conveyance portion. The first conveyance portion includes a first protruding portion and a first extending portion. The first protruding portion protrudes outward from the outer side surface of the belt. The first extending portion extends toward the second conveyance portion from a surface of the first protruding portion that faces the second conveyance portion. The second conveyance portion is provided in a position separated from the first conveyance portion in a direction in which the belt extends. The second conveyance portion includes a second protruding portion and a second extending portion. The second protruding portion protrudes outward from the outer side surface of the belt. The second extending portion extends toward the first conveyance portion from a surface of the second protruding portion that faces the first conveyance portion. The guide portion is configured to guide the film and to move along a movement path. The movement path extends in a direction that intersects the conveyance path. The processor is configured to cause the conveyance mechanism to convey the base and to cause the guide portion to move along the movement path, thereby packaging the object and the base with the film.

BRIEF DESCRIPTION OF THE DRAWINGS

Exemplary embodiments will be described below in detail with reference to the accompanying drawings in which.

DETAILED DESCRIPTION

Figure 1:
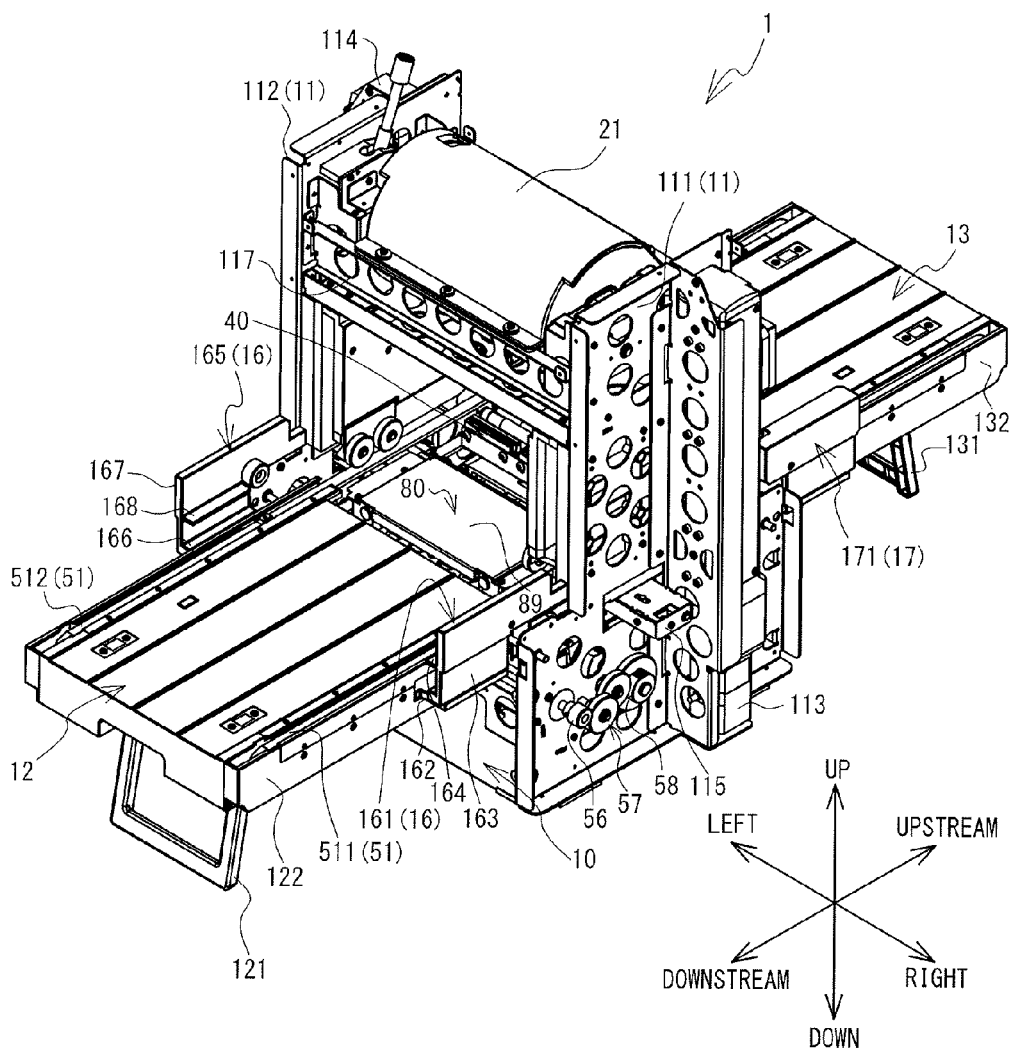
FIG. 1 is an oblique view of a packaging device in a state in which a first receiving tray and a second receiving tray are opened.

Hereinafter, embodiments will be explained with reference to the drawings. An overview of a packaging device 1 will be explained with reference to FIGS. 1 to 3. The packaging device 1 is configured to package an object 3 (refer to FIG. 33 and the like) that has been placed on a base 2 (refer to FIG. 23 and the like), such as a piece of cardboard or the like, by anchoring the object 3 to the base 2 by covering the object 3 with a film 24 (refer to FIG. 33 and the like). Hereinafter, packaging the object 3 in this manner is called "packaging the base 2 and the object 3". The upper side, the lower side, the lower right side, and the upper left side in FIG. 1 are respectively the upper side, the lower side, the right side, and the left side of the packaging device 1. The upper right side and the lower left side of FIG. 1 are respectively the upstream side and the downstream side in the conveyance direction. The packaging device 1 is configured to package the base 2 and the object 3 while conveying the base 2 from the upstream side toward the downstream side in the conveyance direction in FIG. 1.

Figure 2:
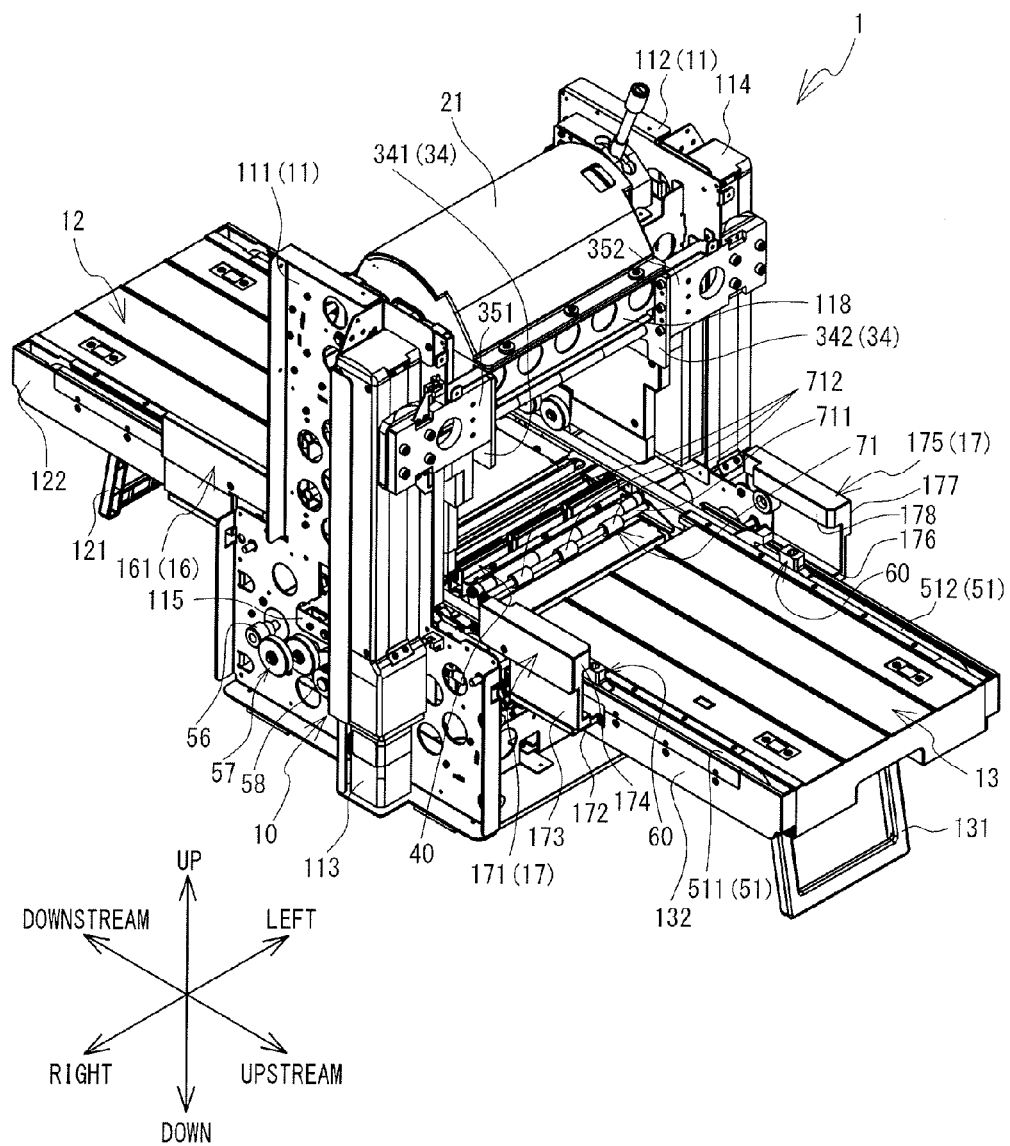
FIG. 2 is another oblique view of the packaging device in the state in which the first receiving tray and the second receiving tray are opened.

The packaging device 1 includes a bottom portion 10 and side plate portions 111 and 112. The side plate portions 111 and 112 respectively extend upward from the right and left edges of the bottom portion 10, which is rectangular in a plan view. The side plate portion 111 is provided on the right side of the packaging device 1. The side plate portion 112 is provided on the left side of the packaging device 1. Hereinafter, the side plate portions 111 and 112 are also collectively called side plate portions 11. The side plate portions 11 are shaped as substantially rectangular plates whose long sides extend in the up-down direction. The inner surfaces of the side plate portions 111 and 112 face each other. As shown in FIG. 1, a plate-shaped bridge portion 117 is mounted between the downstream edge of the side plate portion 111 and the downstream edge of the side plate portion 112. As shown in FIG. 2, a plate-shaped bridge portion 118 is mounted between the upstream edge of the side plate portion 111 and the upstream edge of the side plate portion 112. A film cassette 21 may be disposed between the bridge portions 117 and 118. The film cassette 21 may be supported between the side plate portions 111 and 112.

A protruding portion 113 that protrudes to the right is provided on the right side surface of the side plate portion 111. A protruding portion 114 that protrudes to the left is provided on the left side surface of the side plate portion 112. Each of the protruding portions 113 and 114 is a housing that extends in the up-down direction. A carriage (not shown in the drawings) that may be driven by rotation of a first motor 221 (refer to FIG. 31) is provided inside each of the protruding portions 113 and 114. As shown in FIG. 2, the carriage inside the protruding portion 113 connects to a support plate portion 351. The support plate portion 351 is a plate-shaped member that extends to the right from a support portion 341 (which will be described later) on the upstream side of the protruding portion 113. The carriage inside the protruding portion 114 connects to a support plate portion 352. The support plate portion 352 is a plate-shaped member that extends to the left from a support portion 342 (which will be described later) on the upstream side of the protruding portion 114. The first motor 221 can cause the support portions 341 and 342 that respectively connect to the support plates 351 and 352 via the carriages to move up and down.

A protruding portion 115 that protrudes to the right is provided on the right side surface of the side plate portion 111, on the downstream side of the protruding portion 113. A protruding portion 116 (refer to FIG. 4 and FIG. 5) that protrudes to the left is provided on the left side surface of the side plate portion 112, on the downstream side of the protruding portion 114. A fifth motor 225 (refer to FIG. 31) is provided inside the protruding portion 115. The fifth motor 225 may drive a carriage (not shown in the drawings) that is provided between the protruding portions 115 and 116. The carriage can move a cutting portion 77 (refer to FIG. 5) in the left-right direction.

The film cassette 21 internally contains a film roll 22 (refer to FIG. 5) around which the film 24 is wound. A discharge opening (not shown in the drawings) is provided on the lower side of the film cassette 21. The discharge opening extends across the width of the film 24 that is wound around the film roll 22. The film 24 that is fed out from the film roll 22 is discharged downward from the discharge opening. The base 2 on which the object 3 has been placed may be conveyed below the film cassette 21 and between the side plate portions 111 and 112, and the object 3 may be packaged with the film 24 that is fed out from the film roll 22.

The side plate portions 111 and 112 are each provided with a clutch spring on a portion that supports the film cassette 21. The clutch spring applies torque in the opposite direction from the direction in which the film roll 22 rotates when the film 24 is discharged from the film cassette 21.

The downstream edges of the side plate portions 11 support a first receiving tray 12 such that the first receiving tray 12 can swing up and down. In a plan view, the first receiving tray 12 has a substantially rectangular box shape whose short sides extend in the left-right direction. The first receiving tray 12 is configured to swing up and down, with its upstream end serving as a pivot point. The top surface of the first receiving tray 12 may receive the base 2 and the object 3 for which the packaging has been completed. Hereinafter, the top surface of the first receiving tray 12 will be called a receiving surface.

A guide portion 161 is provided on the right edge and on the upstream side of the first receiving tray 12. The guide portion 161 includes a first extending portion 162, a second extending portion 163, and a protruding portion 164. The first extending portion 162 is a plate-shaped member that extends to the right from the right edge of the first receiving tray 12. The second extending portion 163 is a substantially rectangular plate-shaped member in a side view, and extends upward from the right edge of the first extending portion 162. The protruding portion 164 is a plate-shaped member that protrudes to the left from the left side surface of the second extending portion 163. A guide portion 165 is provided on the left edge and on the upstream side of the first receiving tray 12. The guide portion 165 includes a first extending portion 166, a second extending portion 167 and a protruding portion 168. The first extending portion 166 is a plate-shaped member that extends to the left from the left edge of the first receiving tray 12. The second extending portion 167 is a substantially rectangular plate-shaped member in a side view, and extends upward from the left edge of the first extending portion 166. The protruding portion 168 is a plate-shaped member that protrudes to the right from the right side surface of the second extending portion 167. Hereinafter, the guide portions 161 and 165 will be collectively called guide portions 16.

As shown in FIG. 2, the upstream edges of the side plate portions 11 support a second receiving tray 13 such that the second receiving tray 13 can swing up and down. In a plan view, the second receiving tray 13 has a substantially rectangular box shape whose short sides extend in the left-right direction. The second receiving tray 13 is configured to swing up and down, with its downstream end serving as a pivot point. The top surface of the second receiving tray 13 receives the base 2, which will be conveyed from the upstream side toward an opening between the side plate portions 111 and 112. Hereinafter, the top surface of the second receiving tray 13 will be called a receiving surface, in the same manner as in the case of the first receiving tray 12.

A guide portion 171 is provided on the right edge and on the downstream side of the second receiving tray 13. The guide portion 171 includes a first extending portion 172, a second extending portion 173 and a protruding portion 174. The first extending portion 172 is a plate-shaped member that extends to the right from the right edge of the second receiving tray 13. The second extending portion 173 is a substantially rectangular plate-shaped member in a side view, and extends upward from the right edge of the first extending portion 172. The protruding portion 174 protrudes to the left from the left side surface of the second extending portion 173. A guide portion 175 is provided on the left edge and on the downstream side of the second receiving tray 13. The guide portion 175 includes a first extending portion 176, a second extending portion 177 and a protruding portion 178. The first extending portion 176 is a plate-shaped member that extends to the left from the left edge of the second receiving tray 13. The second extending portion 177 is a substantially rectangular plate-shaped member in a side view, and extends upward from the left edge of the first extending portion 176. The protruding portion 178 is a plate-shaped member that protrudes to the right from the right side surface of the second extending portion 177. Hereinafter, the guide portions 171 and 175 will be collectively called guide portions 17.

As shown in FIG. 1 and FIG. 2, when the first receiving tray 12 and the second receiving tray 13 have been swung down and their receiving surfaces have become substantially horizontal, the receiving surface of the first receiving tray 12 and the receiving surface of the second receiving tray 13 form the same plane. A leg portion 121 supports, from below, the first receiving tray 12 whose receiving surface has become horizontal. A leg portion 131 supports, from below, the second receiving tray 13 whose receiving surface has become horizontal. The base 2 on which the object 3 has been placed may be conveyed on the plane that is formed by the receiving surfaces of the first receiving tray 12 and the second receiving tray 13. Hereinafter, a path section along which the base 2 is conveyed on the plane that is formed by the receiving surfaces of the first receiving tray 12 and the second receiving tray 13 is referred to as a conveyance path 103 (refer to FIG. 6, FIG. 7, and the like).

Figure 3:
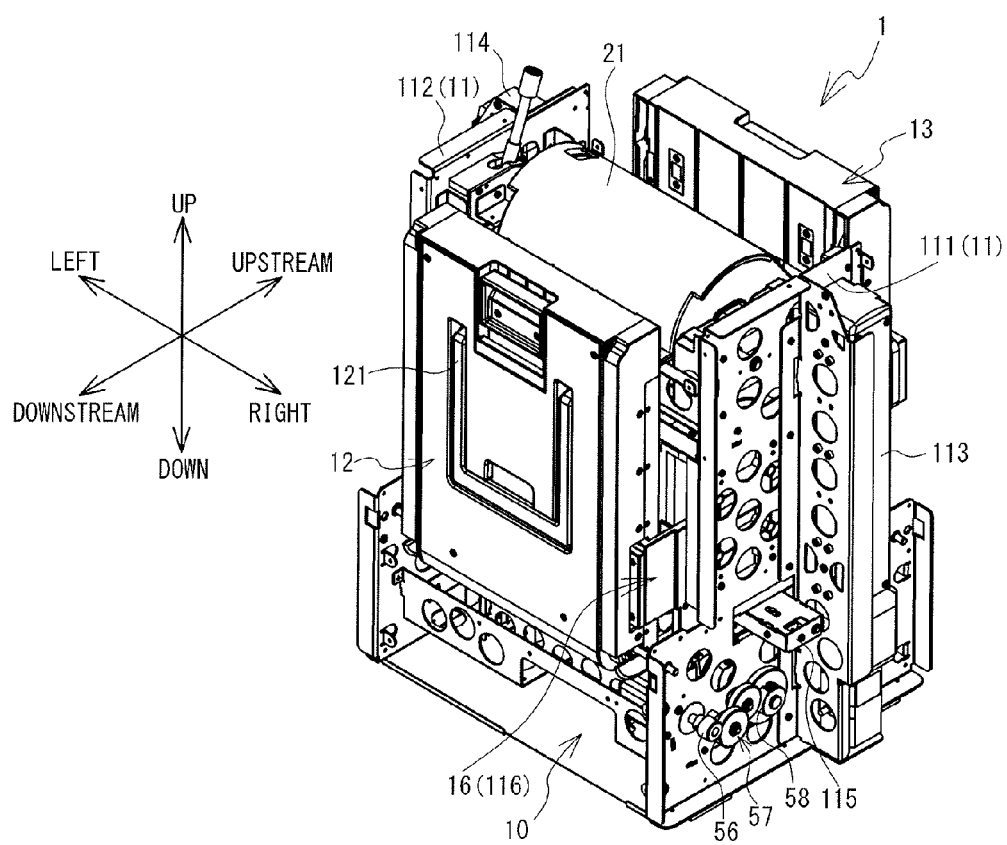
FIG. 3 is an oblique view of the packaging device in a state in which the first receiving tray and the second receiving tray are closed.

By manually swinging the first receiving tray 12 and the second receiving tray 13 downward, thereby switching the receiving surfaces to a substantially horizontal orientation, a user may put the packaging device 1 into a state in which the packaging device 1 can package the base 2 and the object 3 with the film 24. In this state, the receiving surfaces of the first receiving tray 12 and the second receiving tray 13 form the same plane. Therefore, the packaging device 1 is able to convey the base 2 smoothly. On the other hand, as shown in FIG. 3, the user can also switch the receiving surfaces to a vertical orientation by manually swinging the first receiving tray 12 and the second receiving tray 13 upward. In this state, the first receiving tray 12 and the second receiving tray 13 block the opening between the side plate portions 111 and 112. Thus, it is possible to reduce the space necessary to install the packaging device 1. Further, in this state, the packaging device 1 can easily be carried around.

Endless belts 511 and 512 are respectively provided on the right edges and the left edges of the first receiving tray 12 and the second receiving tray 13. The belt 511 is routed around pulleys 521, 523, 524, 525, and 527 (refer to FIG. 17). The belt 512 is routed around pulleys 531, 533, 534, 535, and 537 (refer to FIG. 17). Hereinafter, the belts 511 and 512 are also collectively called belts 51. The belts 51 may be made of a composite material of fiber and urethane rubber or the like, for example, and the belts 51 are elastically deformable. Sections of the belts 51 that are positioned on the side surfaces of the first receiving tray 12 are covered by a pair of covers 122 from both the left and right sides. Sections of the belts 51 that are positioned on side surfaces of the second receiving tray 13 are covered by a pair of covers 132 from both the left and right sides.

Figure 31:
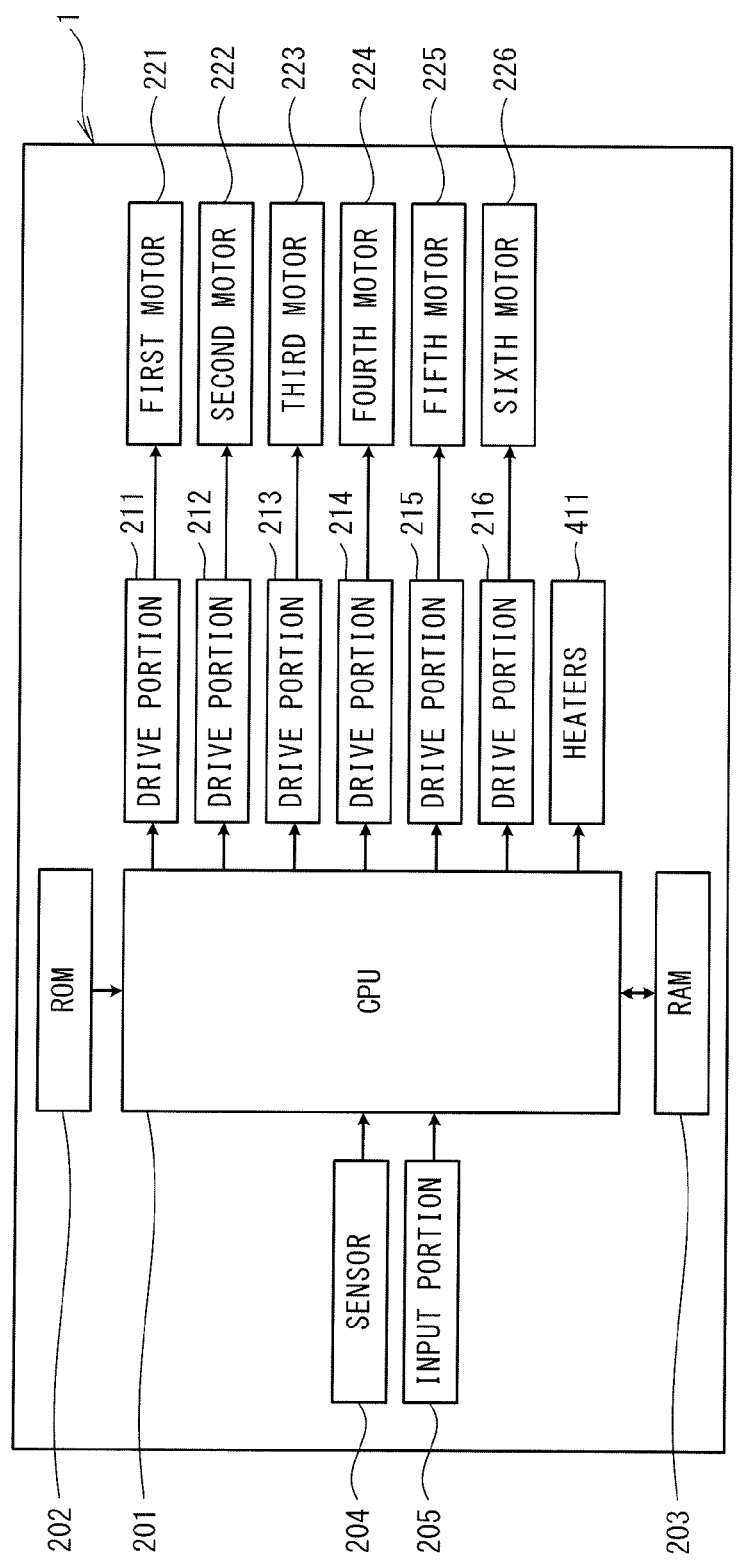
FIG. 31 is a block diagram showing an electrical configuration of the packaging device.

The belts 51 may be rotated by a second motor 222 (refer to FIG. 31). Conveyance portions 60 (refer to FIG. 17) of the belts 51 are configured to convey the base 2. The conveyance portions 60 are provided on the outer side surfaces of the belts 51. Hereinafter, the belts 51, the conveyance portions 60 and the second motor 222 will also be collectively called a conveyance mechanism 50 (refer to FIG. 17). The conveyance mechanism 50 will be described in detail later.

Figure 4:
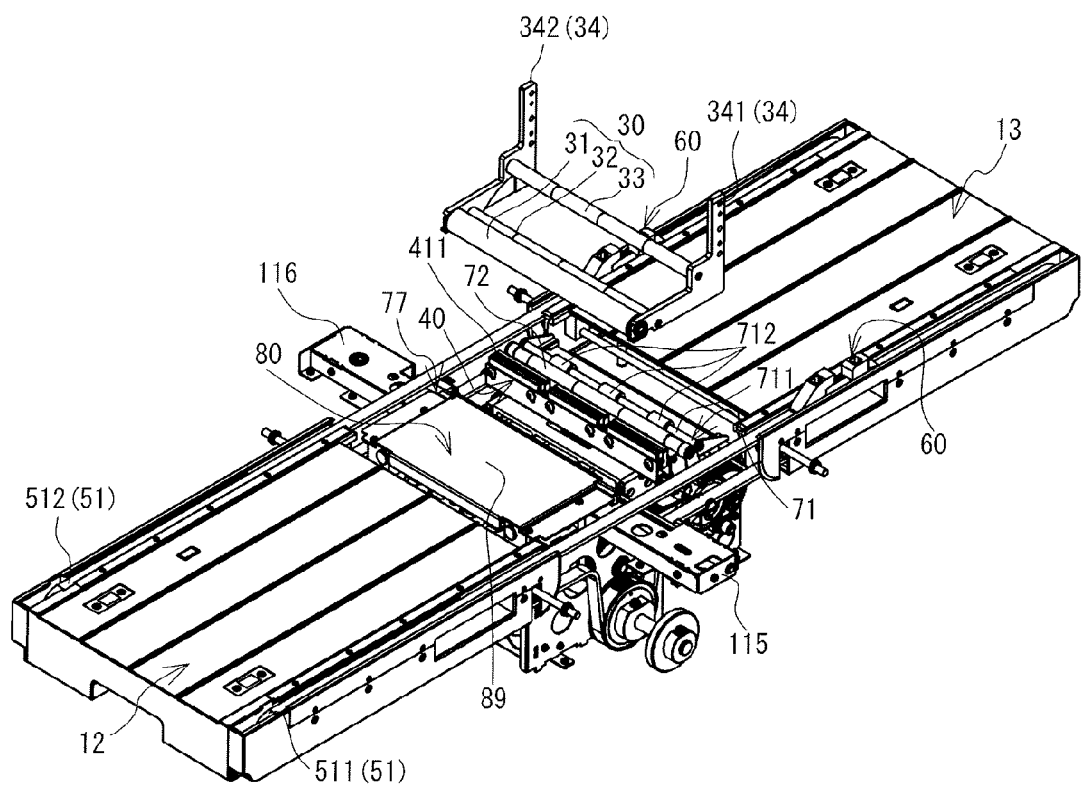
FIG. 4 is an oblique view of a support portion, a heating portion, and a rotation inhibiting portion.
Figure 5:
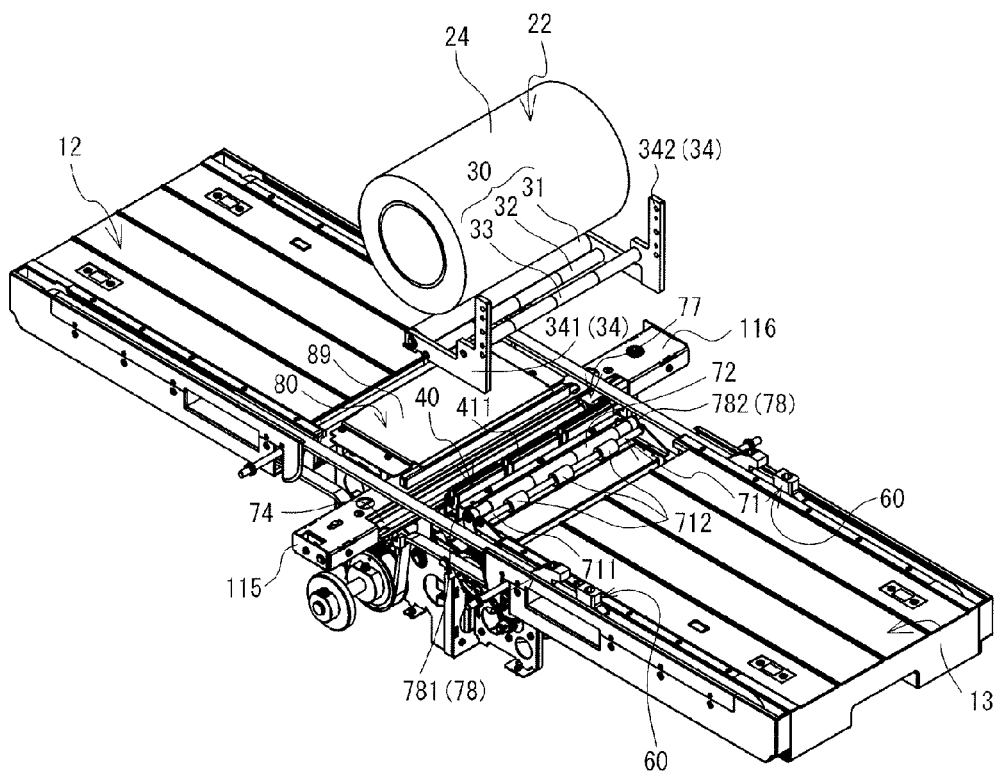
FIG. 5 is another oblique view of the support portion, the heating portion, and the rotation inhibiting portion.

The internal structure of the packaging device 1 will be explained with reference to FIG. 4 to FIG. 7. In FIG. 4, the film roll 22 is omitted in order to facilitate understanding. As shown in FIG. 4 and FIG. 5, the packaging device 1 also includes a base guide roller 71. The base guide roller 71 is provided on the upstream side of the section between the side plate portions 111 and 112 (refer to FIG. 1) and below the conveyance path 103. The base guide roller 71 includes a shaft portion 711 and a plurality of roller portions 712. The shaft portion 711 extends in the left-right direction. The plurality of roller portions 712 are provided at equal intervals in the axial direction of the shaft portion 711. The plurality of roller portions 712 are in contact with the conveyance path 103 from below. As the base 2 is conveyed along the conveyance path 103, the base guide roller 71 supports the base 2 from below between the first receiving tray 12 and the second receiving tray 13, and guides the base 2 from the second receiving tray 13 to the first receiving tray 12.

Figure 6:
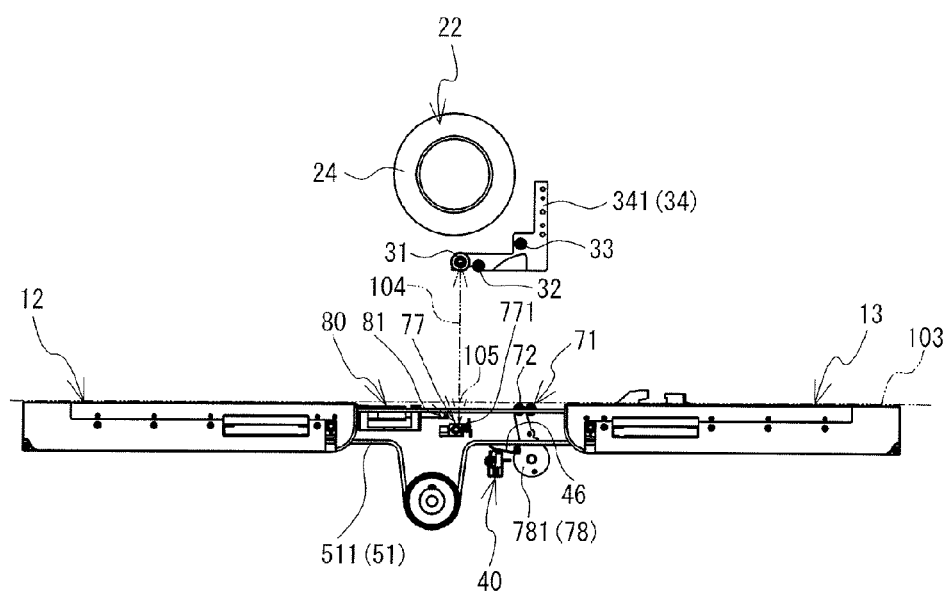
FIG. 6 is a right side view showing a state in which the support portion is located at its highest position.
Figure 7:
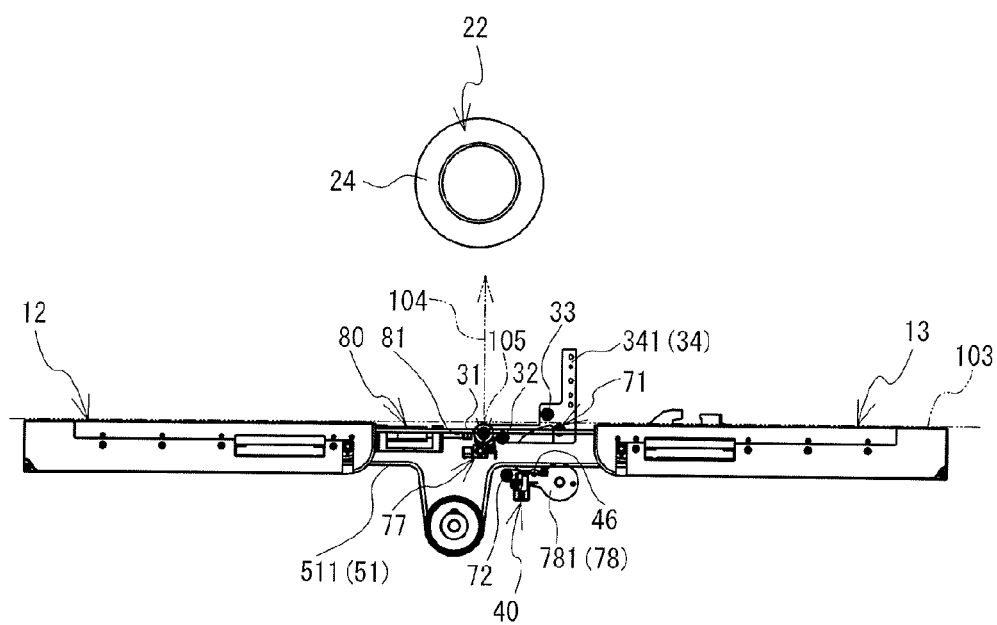
FIG. 7 is a right side view showing a state in which the support portion is located at its lowest position.

The packaging device 1 also includes a cylinder-shaped holding roller 72. The holding roller 72 extends in the left-right direction. The right end of the holding roller 72 is rotatably supported by a holding portion 781. The left end of the holding roller 72 is rotatably supported by a holding portion 782. Hereinafter, the holding portions 781 and 782 will also be collectively called holding portions 78. The holding portions 78 may be rotated by a sixth motor 226 (refer to FIG. 31). As shown in FIG. 6 and FIG. 7, the rotation of the holding portions 78 switches the holding roller 72 between a state in which the holding roller 72 is positioned close to the downstream side of the base guide roller 71 (refer to FIG. 6) and a state in which the holding roller 72 has been moved downward, away from the base guide roller 71 (refer to FIG. 7). As shown in FIG. 6, when the holding roller 72 is positioned close to the downstream side of the base guide roller 71, the holding roller 72 is in contact with the conveyance path 103 from below. In this state, the holding roller 72 can hold the film 24 that has been fed out from the film cassette 21 such that the film 24 is clamped between the holding roller 72 and the base guide roller 71.

As shown in FIG. 4 and FIG. 5, the packaging device 1 also includes a heating portion 40. The heating portion 40 includes heaters 411 on its top. The heating portion 40 is configured to be moved up and down by a third motor 223 (refer to FIG. 31). FIG. 4 and FIG. 5 show a state in which the heating portion 40 has been moved upward. In a state in which the heating portion 40 has been moved upward and the holding roller 72 is positioned on the downstream side of the base guide roller 71, the heating portion 40 is positioned on the downstream side of the holding roller 72. In the state in which the heating portion 40 has been moved upward, the heaters 411 come close to the conveyance path 103 from below. In this state, the heaters 411 may heat and melt the film 24 that has been fed out from the film cassette 21, thus bonding the film 24 to the base 2. FIG. 6 and FIG. 7 show a state in which the heating portion 40 has been moved downward. In a state in which the heating portion 40 has been moved downward and the holding roller 72 has been moved downward, away from the base guide roller 71, the heating portion 40 is positioned on the upstream side of the holding roller 72. In this state, a lid portion 46, which is pivotally provided, covers the heaters 411 from above. The heating portion 40 will be described in more detail later.

The packaging device 1 also includes the cutting portion 77. The cutting portion 77 is provided with a blade portion 771 (refer to FIG. 39) that protrudes upward from the top surface of the cutting portion 77. The blade portion 771 extends in the left-right direction. As shown in FIG. 5, a guide rail 74 passes through the cutting portion 77. The guide rail 74 extends in the left-right direction on the downstream side of the heating portion 40 that has been moved upward. The cutting portion 77 is configured to move to the left and to the right along the guide rail 74. The right end and the left end of the guide rail 74 are respectively positioned inside the protruding portions 115 and 116. The carriage (not shown in the drawings) is positioned on the downstream side of the guide rail 74. The carriage may be driven by the fifth motor 225 (refer to FIG. 31) that is provided inside the protruding portion 115. The carriage is connected to the cutting portion 77. When the fifth motor 225 drives the carriage, the cutting portion 77 moves in the left-right direction along the guide rail 74. When the cutting portion 77 is moving in the left-right direction along the guide rail 74, the blade portion 771 cuts the film 24 in the width direction of the film 24.

The packaging device 1 also includes a sensor 204 (refer to FIG. 31) on the inner side of the side plate portion 111. The sensor 204 is a non-contact type position sensor that is configured to detect a reflecting plate that is provided on the outer side surface of the belt 51. The sensor 204 is positioned below the belt 51 and emits light upward. The sensor 204 is configured to detect the reflecting plate by detecting the light that is reflected by the reflecting plate. Note that when the sensor 204 has detected the reflecting plate, the conveyance portions 60 (refer to FIG. 17, described later) that are provided on the belts 51 are in a state in which the conveyance portions 60 protrude upward higher than the receiving surface of the second receiving tray 13 (refer to FIG. 17).

The packaging device 1 also includes a guide roller 31, a first auxiliary roller 32, and a second auxiliary roller 33. Hereinafter, the guide roller 31, the first auxiliary roller 32, and the second auxiliary roller 33 will also be collectively called movable rollers 30. The movable rollers 30 have a cylindrical shape. The movable rollers 30 extend in the left-right direction. The length of the movable rollers 30 in the left-right direction is substantially the same as the lengths of the first receiving tray 12 and the second receiving tray 13 in the left-right direction. The movable rollers 30 each have a cylindrical portion and a shaft portion. The shaft portion extends in the left-right direction. The cylindrical portion is provided around a peripheral wall of the shaft portion. The cylindrical portion of the guide roller 31 is made of rubber and is affixed to the shaft portion. The cylindrical portions of the first auxiliary roller 32 and the second auxiliary roller 33 can rotate in relation to the shaft portions. The diameters of the cylindrical portions of the first auxiliary roller 32 and the second auxiliary roller 33 are substantially the same. The diameter of the cylindrical portion of the guide roller 31 is larger than the diameter of the cylindrical portion of each of the first auxiliary roller 32 and the second auxiliary roller 33.

The packaging device 1 also includes the support portions 341 and 342. Hereinafter, the support portions 341 and 342 will also be collectively called support portions 34. The support portions 341 and 342 respectively support the right end and the left end of each of the movable rollers 30. The shaft portion of the guide roller 31 can rotate with respect to the support portions 34. The shaft portions of the first auxiliary roller 32 and the second auxiliary roller 33 are affixed to the support portions 34. The support portions 34 are plate-shaped members having a reverse L shape in a right side view. The guide roller 31 is supported by each of the support portions 341 and 342 at the downstream end of the section of each of the support portions 341 and 342 that extends in the conveyance direction. The first auxiliary roller 32 is supported by each of the support portions 341 and 342 close to and on the upstream side of the position where the guide roller 31 is supported. The second auxiliary roller 33 is supported by each of the support portions 341 and 342 at a position where the section of each of the support portions 341 and 342 that extends in the conveyance direction intersects the section that extends in the up-down direction. Therefore, as shown in FIG. 6 and FIG. 7, the guide roller 31, the first auxiliary roller 32, and the second auxiliary roller 33 are disposed in that order from the downstream side toward the upstream side. The positions in the up-down direction of the lower edges of the cylindrical portions of the guide roller 31 and the first auxiliary roller 32 are substantially the same. The position in the up-down direction of the lower edge of the cylindrical portion of the second auxiliary roller 33 is higher than the positions in the up-down direction of the upper edges of the cylindrical portions of the guide roller 31 and the first auxiliary roller 32.

A plurality of holes that are aligned in the up-down direction are provided in the section of each of the support portions 341 and 342 that extends in the up-down direction. The support plate portion 351 is affixed by screws to the holes that are provided in the section of the support portion 341 that extends in the up-down direction, as shown in FIG. 2. The support plate portion 351 extends to the right from the right side surface of the support portion 341. The support plate portion 352 is affixed by screws to the holes that are provided in the section of the support portion 342 that extends in the up-down direction. The support plate portion 352 extends to the left from the left side surface of the support portion 342. As described above, the support plate portions 351 and 352 are respectively connected to the carriages that are provided inside the protruding portions 113 and 114. The carriages may move up and down by being driven by the first motor 221 (refer to FIG. 31), thereby moving the support plate portions 351 and 352 up and down. Thus the support portions 34 may be moved up and down.

FIG. 6 shows a state in which the support portions 34 are located at the highest position. In this state, the section of each of the support portions 341 and 342 that extends in the up-down direction is positioned close to and on the upstream side of the film cassette 21 (refer to FIG. 1) that contains the film roll 22. The section of each of the support portions 341 and 342 that extends in the conveyance direction is positioned below the film cassette 21. The movable rollers 30 are positioned below the film cassette 21.

FIG. 7 shows a state in which the support portions 341 and 342 are located at the lowest position. In this state, the section of each of the support portions 341 and 342 that extends in the conveyance direction is positioned below the conveyance path 103. The guide roller 31 is positioned above the guide rail 74 that passes through the cutting portion 77. The blade portion 771 that extends upward from the cutting portion 77 is positioned between the guide roller 31 and the first auxiliary roller 32. The cylindrical portion of the guide roller 31 is in contact with the conveyance path 103 from below. The second auxiliary roller 33 is positioned close to and above the base guide roller 71. The first auxiliary roller 32 and the second auxiliary roller 33 are positioned close to and on the upstream side of a position at which the conveyance path 103 intersects a movement path 104 of the guide roller 31.

The movement path 104 is the path along which the guide roller 31 is moved up and down by the movement of the support portions 34. When the guide roller 31 has moved to the lowest position along the movement path 104, the guide roller 31 is positioned below the conveyance path 103. The conveyance path 103 and the movement path 104 intersect. The position at which the conveyance path 103 and the movement path 104 intersect will be called an intersection position 105.

The orientation of the movement path 104 may also be changed. For example, the support portions 34 may be moved in a direction that is inclined with respect to a line that is perpendicular to the conveyance path 103. In that case, the movement path 104 extends at an angle that is inclined with respect to a line that is orthogonal to the conveyance path 103. The position of the guide roller 31 in relation to the film roll 22 may also be a position other than the position below the film roll 22. For example, the guide roller 31 may be provided below and on the upstream side of the film roll 22, or may be provided below and on the downstream side of the film roll 22.

The material of the cylindrical portions of the first auxiliary roller 32 and the second auxiliary roller 33 may be rubber. The cylindrical portions of the first auxiliary roller 32 and the second auxiliary roller 33 may be affixed to the shaft portions. In that case, the support portions 34 may rotatably support the first auxiliary roller 32 and the second auxiliary roller 33. The shaft portions of the guide roller 31, the first auxiliary roller 32, and the second auxiliary roller 33 may also be arranged such that the shaft portions occupy the same substantially horizontal plane.

The packaging device 1 also includes a rotation inhibiting portion 80. In a state in which the support portions 34 are located at the lowest position, the rotation inhibiting portion 80 is located on the downstream side of the guide roller 31 that is supported by the support portions 34 and on the upstream side of the first receiving tray 12. The rotation inhibiting portion 80 includes a stopper 81. The stopper 81 is configured to be moved in the conveyance direction by being driven by a fourth motor 224 (refer to FIG. 31). When the stopper 81 has been moved to the upstream side in a state in which the support portions 34 are located at the lowest position, the stopper 81 is located at a position where the stopper 81 is in contact with the guide roller 31 that is supported by the support portions 34. The stopper 81 is configured to inhibit the guide roller 31 from rotating. The rotation inhibiting portion 80 will be described in detail later.

The heating portion 40 will be explained in detail with reference to FIG. 8 and FIG. 9. The heating portion 40 includes three heating units 41, a holding portion 42, and a base portion 43. The heating units 41 are configured to contact with the film 24 and to heat the film 24. The holding portion 42 holds the three heating units 41. The base portion 43 supports the holding portion 42 from below. The base portion 43 is configured to transmit the driving force of the third motor 223 to the holding portion 42 and to move the entire heating portion 40 in the up-down direction.

Figure 8:
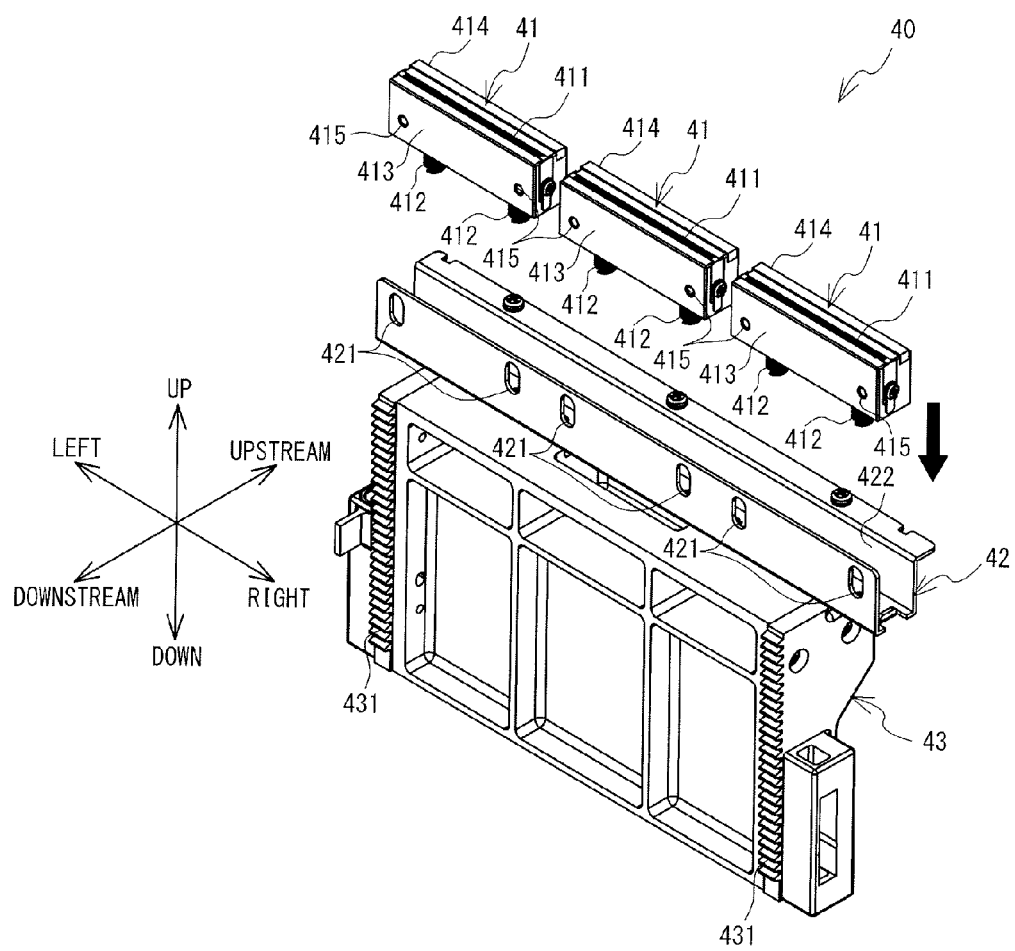
FIG. 8 is an exploded oblique view of the heating portion.

As shown in FIG. 8, the heating unit 41 has a main body 413 whose three-dimensional shape is substantially rectangular. The heater 411 is provided on the top surface of the main body 413. The heater 411 is made from a metal plate. The heater 411 is a resistance heating type heater that generates heat by being supplied with an electric current. The heater 411 extends in a straight line in the left-right direction through a section that is approximately in the middle of the top surface of the main body 413 in the conveyance direction. A support portion 414 is provided on the top surface of the main body 413, on the upstream side of the heater 411. The support portion 414 extends in a straight line in the left-right direction along the upstream edge of the top surface of the main body 413. The support portion 414 protrudes upward slightly higher than the top surface of the main body 413. Two springs 412 are provided on the bottom surface of the main body 413. The springs 412 are compression coil springs. The two springs 412 are respectively connected to the right end and the left end of the bottom surface of the main body 413. The two springs 412 are lined up in the left-right direction. Two holes 415 are provided in the downstream side surface of the main body 413.

The holding portion 42 is a plate-shaped member that is bent in a substantially U shape in a side view. A groove 422 that extends in the left-right direction is formed in the holding portion 42. The distance between a plate-shaped portion on the upstream side of the holding portion 42 and a plate-shaped portion on the downstream side of the holding portion 42 is slightly longer than the length in the conveyance direction of the main body 413 of the heating unit 41. The length in the up-down direction of the plate-shaped portions on the upstream side and the downstream side of the holding portion 42 is shorter than the length in the up-down direction of the main body 413 of the heating unit 41. Six slotted holes 421 that is longer in the up-down direction are provided in the plate-shaped portion on the downstream side of the holding portion 42.

Figure 9:
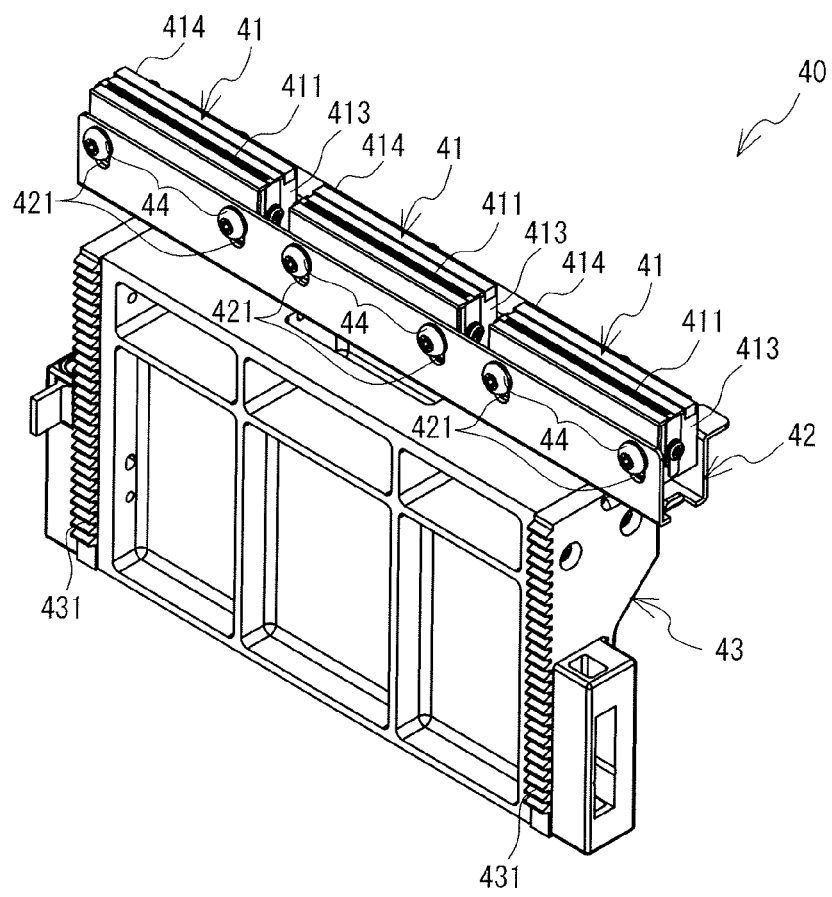
FIG. 9 is an oblique view of the heating portion.

As shown in FIG. 9, the three heating units 41 are arranged in the groove 422 of the holding portion 42. The three heating units 41 are arranged in a straight line in the left-right direction. Screws 44 are screwed into the holes 415 of the main body 413 of each of the heating units 41 from the downstream side through the slotted holes 421 of the holding portion 42. The heating units 41 can move up and down over the length, in the up-down direction, of the slotted holes 421. The springs 412 contact with the plate-shaped portion on the lower side of the holding portion 42 and urge the main body 413 upward. The top surface of the main body 413 of each of the three heating units 41 protrudes farther upward than the upper edges of the plate-shaped portions on the upstream side and the downstream side of the holding portion 42. The top surface of the main body 413 of each of the three heating units 41 is parallel to the conveyance path 103. The springs 412 that are provided on the main bodies 413 are arrayed in a straight line in the left-right direction. More specifically, the springs 412 are arrayed in a direction that is orthogonal to the conveyance direction and in a direction that is parallel to the conveyance path 103.

The base portion 43 is provided below the holding portion 42. The base portion 43 supports the holding portion 42 from below. A rack gear 431 is provided on the downstream edge of each of the left and right side surfaces of the base portion 43. Each of the rack gears 431 extends in the up-down direction such that its teeth face downstream. The third motor 223 (refer to FIG. 31) is provided above the bottom portion 10 (refer to FIG. 1), in the section between the side plate portions 111 and 112, and pinion gears are provided that transmit the rotational driving force of the third motor 223. Each one of the pinion gears engages with one of the rack gears 431. The base portion 43 may be moved in the up-down direction by the turning of the third motor 223. Thus the holding portion 42 that is provided above the base portion 43, as well as the three heating units 41 (that is, the heating portion 40) that are held by the holding portion 42, may also be moved in the up-down direction.

In a state in which the heating portion 40 has been located at its highest position by the third motor 223, the top surface of the main body 413 of each of the three heating units 41 is close to the conveyance path 103. Specifically, in a state in which the heating portion 40 has been moved by the third motor 223 and is located at its highest position, the top surface of the main body 413 of each of the three heating units 41 is positioned slightly above the conveyance path 103. The top surface of the support portion 414 is positioned farther above the top surface 413 of the main body 413. On the other hand, in a state in which the heating portion 40 has been moved by the third motor 223 and is located at its lowest position, the top surface of the main body 413 of each of the three heating units 41 is set apart from the conveyance path 103.

Figure 10:
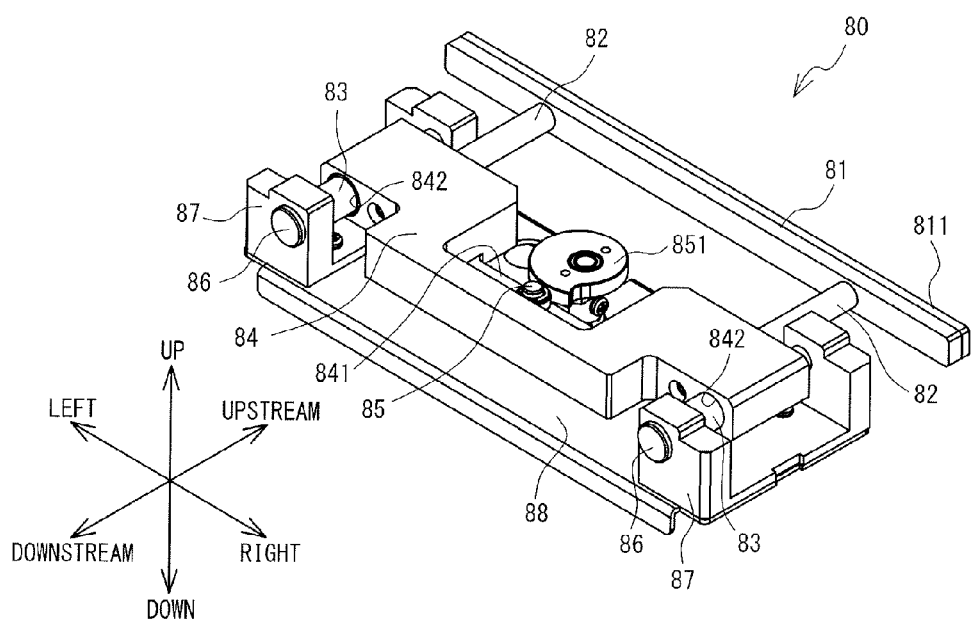
FIG. 10 is an oblique view of the rotation inhibiting portion.

The rotation inhibiting portion 80 will be explained in detail with reference to FIG. 10 to FIG. 12. The rotation inhibiting portion 80 includes a base portion 88. The base portion 88 is a plate-shaped member that is rectangular in a plan view, and whose long sides extend the left-right direction. The base portion 88 is provided above the bottom portion 10 (refer to FIG. 1) and is fixed in place in the section between the side plate portions 111 and 112 (refer to FIG. 1). A support portion 84 and two shaft support portions 87 are provided on the top surface of the base portion 88. The top surface of the support portion 84 and the top surfaces of the two shaft support portions 87 are covered by a top plate 89 (refer to FIG. 1, FIG. 4 and FIG. 5).

The support portion 84 is a box-shaped body that extends in the left-right direction. The central section of the support portion 84 in the left-right direction is recessed toward the downstream side. A plate 841 extends parallel to the bottom surface of the support portion 84 and extends across the recessed section on its downstream side. A cylindrical protruding portion 85 protrudes upward from the central section of the support portion 84 in the left-right direction. Holes 842 that extend through the support portion 84 in the conveyance direction are respectively provided in the left end and the right end of the support portion 84. Two support rods 82 extend in the upstream direction from the upstream side surfaces of the support portion 84 at positions that are respectively located to the left of the position where the right side hole 842 is provided and to the right of the position where the left side hole 842 is provided. The stopper 81 is attached to the upstream ends of the two support rods 82. The stopper 81 has a rod shape whose cross-sectional shape is square. The stopper 81 extends in the left-right direction. The length of the stopper 81 in the left-right direction is substantially the same as the length of the support portion 84 in the left-right direction. A rubber strip 811 is provided on the upstream side surface of the stopper 81.

The two shaft support portions 87 are respectively provided on the left and right ends of the base portion 88. Plate-shaped portions that extend upward are respectively provided on the upstream side and the downstream side of each of the two shaft support portions 87. Each of the plate-shaped portions supports one of an upstream end and a downstream end of one of two shafts 86 that extend in the conveyance direction. Each of the two shafts 86 passes through one of the holes 842 that are provided in the support portion 84. The support portion 84 is configured to move in the conveyance direction along the two left and right shafts 86. Springs 83 are respectively interposed between the support portion 84 and the plate-shaped portions on the downstream side of the shaft support portions 87. The springs 83 are compression coil springs. The springs 83 urge the support portion 84 toward the upstream side.

A cam 851 is provided on the base portion 88. The fourth motor 224 (refer to FIG. 31) is provided below the base portion 88. The cam 851 is connected to a rotating shaft that extends upward from the fourth motor 224. The cam 851 is arranged on the upstream side of the plate 841, in the section of the support portion 84 that is recessed toward the downstream side. The outer circumferential surface of the cam 851 contacts with the protruding portion 85 that protrudes upward from the plate 841.

The position of the support portion 84 may be switched between the upstream side (refer to FIG. 11) and the downstream side (refer to FIG. 12) by the rotating of the cam 851 in conjunction with the operation of the fourth motor 224. Specifically, the switching may be performed as hereinafter described.

Figure 11:
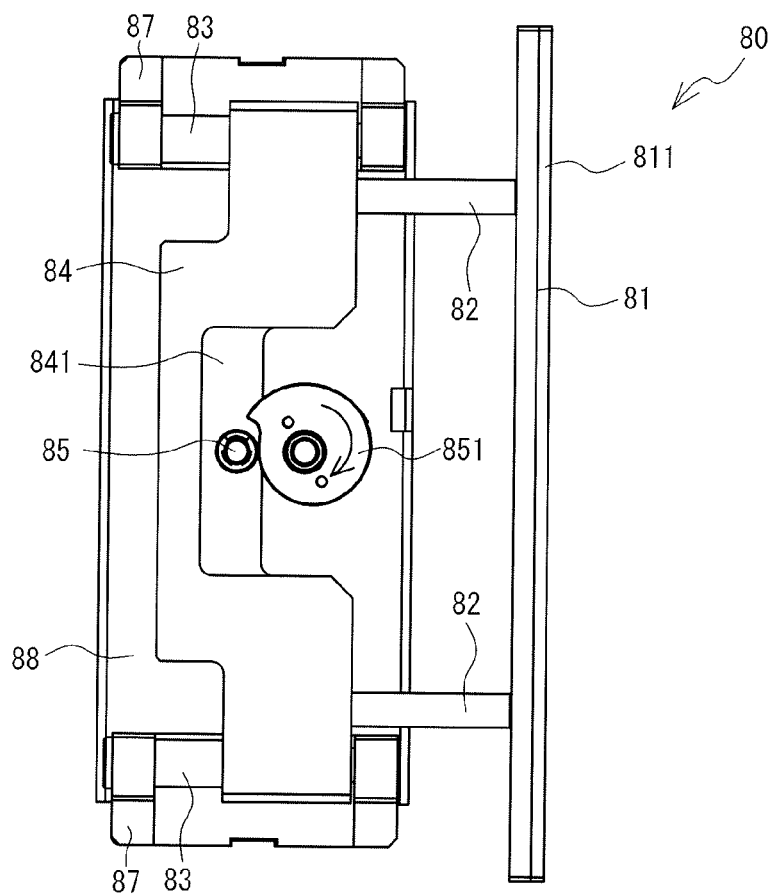
FIG. 11 is a plan view of the rotation inhibiting portion in a state in which a stopper has moved to an upstream side.

As shown in FIG. 11, in a state in which a section of the outer circumferential surface of the cam 851 where the distance from the center to the circumference is short is in contact with the protruding portion 85, the support portion 84 is positioned on the upstream side by the urging force of the springs 83. The stopper 81 that is connected to the support portion 84 is positioned toward the upstream side. From this state, the fourth motor 224 rotates in the clockwise direction in a plan view. When a section of the outer circumferential surface of the cam 851 where the distance from the center to the circumference is long comes into contact with the protruding portion 85, as shown in FIG. 12, the support portion 84 has moved toward the downstream side against the urging force of the springs 83. The stopper 81 that is connected to the support portion 84 is thus positioned toward the downstream side. The stopper 81 may move in such a way that the stopper 81 remains parallel to the left-right direction.

When the fourth motor 224 rotates farther in the clockwise direction, the section of the outer circumferential surface of the cam 851 where the distance from the center to the circumference is short comes into contact with the protruding portion 85. In conjunction with this, the support portion 84 is moved toward the upstream side by the urging force of the springs 83 (refer to FIG. 11).

Figure 13:
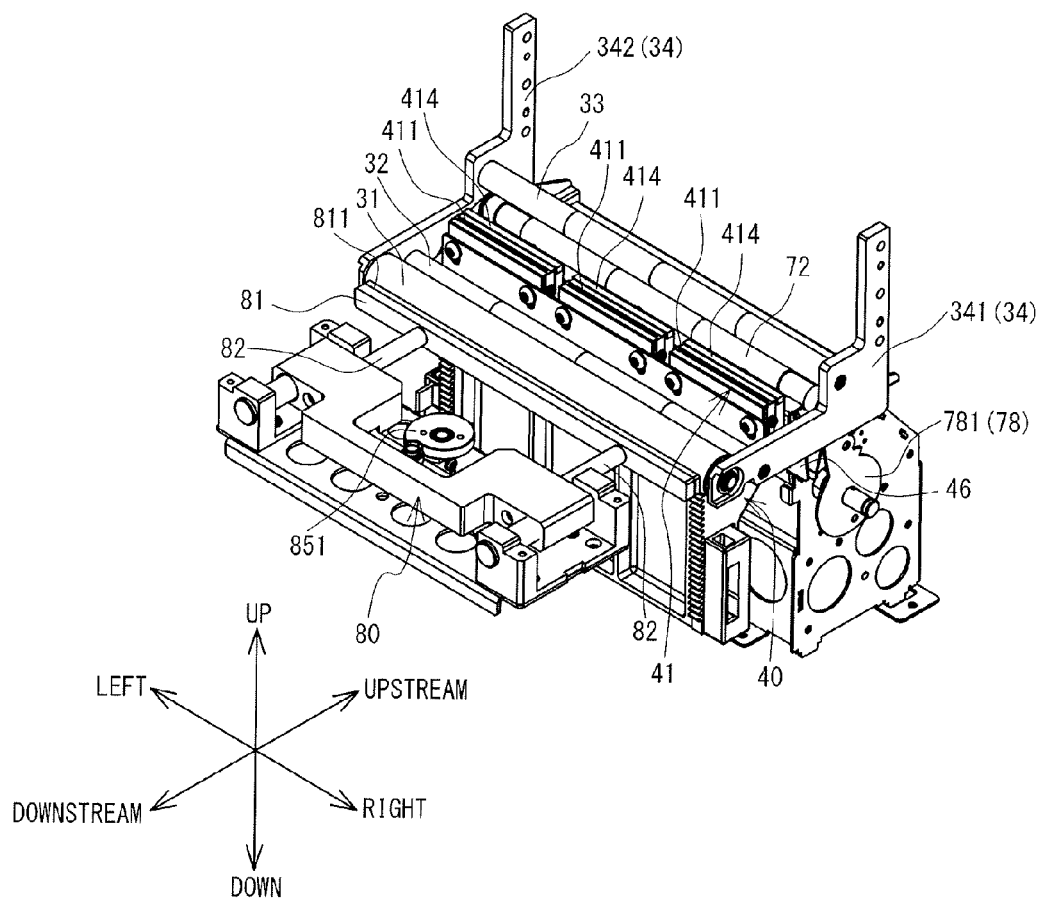
FIG. 13 is an enlarged oblique view of the heating portion, a lid portion, and the rotation inhibiting portion.

As shown in FIG. 13, in a state in which the support portions 34 are located at their lowest position and the stopper 81 is positioned toward the upstream side (refer to FIG. 11), the rubber strip 811 of the stopper 81 is located in a position where the rubber strip 811 can contact with the cylindrical portion of the guide roller 31. The rubber strip 811 of the stopper 81 may be pressed strongly against the guide roller 31 by the urging of the support portion 84 toward the upstream side by the springs 83. The direction in which the stopper 81 extends is the same as the direction in which the shaft portion of the guide roller 31 extends, so the rubber strip 811 of the stopper 81 can be pressed evenly against the entire length of the guide roller 31. The rubber strip 811 has a large coefficient of friction, so the rotation of the guide roller 31 can be inhibited by the frictional force between the rubber 81 and the guide roller 31. The rotation of the guide roller 31 is also inhibited by the pressing of the shaft portion of the guide roller 31 against the support portions 34.

On the other hand, in a state in which the stopper 81 is positioned toward the downstream side (refer to FIG. 12), the rubber strip 811 of the stopper 81 separates from the cylindrical portion of the guide roller 31. Therefore, the guide roller 31 is can rotate freely in this state.

Figure 14:
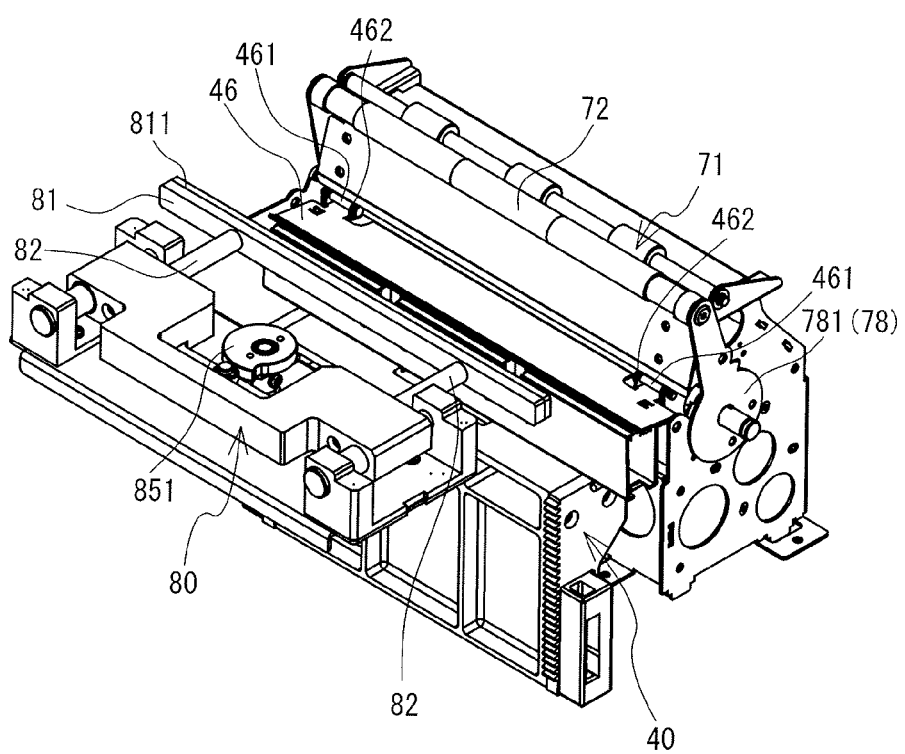
FIG. 14 is another enlarged oblique view of the heating portion, the lid portion, and the rotation inhibiting portion.

The lid portion 46 that covers the top surface of the heating portion 40 will be explained. FIG. 14 shows the arrangement of the heating portion 40, the lid portion 46 and the rotation inhibiting portion 80. In FIG. 14, the heating portion 40 is located at its lowest position, and the stopper 81 of the rotation inhibiting portion 80 is positioned toward the downstream side. When the holding portions 78 is swung, and the holding roller 72 comes close to the base guide roller 71. The lid portion 46 covers the top surfaces of the three heating units 41 (refer to FIG. 9) when the heating portion 40 is located at its lowest position. The lid portion 46 is a plate-shaped member having a substantially rectangular shape whose long sides extend in the left-right direction. In a state in which the lid portion 46 covers the top surfaces of the heating units 41, a flat surface of the lid portion 46 becomes substantially horizontal.

A pivot shaft 461 is provided on each of the left and right ends of the lid portion 46, on the upstream side of the lid portion 46 when the lid portion 46 is in a substantially horizontal state. The pivot shafts 461 axially support the lid portion 46 such that the lid portion 46 can swing in relation to a plate-shaped member that extends in the up-down direction on the upstream side of the heating portion 40. The pivot shafts 461 extend in the left-right direction. The pivot shafts 461 support the lid portion 46 such that the opposite side of the lid portion 46 from the side that is axially supported by the pivot shafts 461 (in other words, the edge of the lid portion 46 that is on the downstream side in the conveyance direction) moves up and down.

A spring 462 is provided on each of the pivot shafts 461. When the lid portion 46 is in a substantially horizontal state, the springs 462 downwardly urge the downstream edge of the lid portion 46. The lid portion 46 is pressed against the top surfaces of the three heating units 41 of the heating portion 40 when the heating portion 40 is located at its lowest position. The position in the up-down direction of the pivot shafts 461 of the lid portion 46 is substantially the same as the position of the top surfaces of the three heating units 41 of the heating portion 40 when the heating portion 40 is located at its lowest position. Therefore, in a state in which the top surfaces of the heating units 41 are covered by the lid portion 46, the flat surface of the lid portion 46 becomes substantially horizontal. When the lid portion 46 is in a substantially horizontal state, the edge of the lid portion 46 that is on the downstream side in the conveyance direction (hereinafter called the downstream edge) is bent slightly upward at an angle.

As shown in FIG. 8 and FIG. 9, the support portion 414 is provided on the top surface of the main body 413 of each of the three heating units 41, and protrudes slightly upward with respect to the heater 411. Therefore, when the heating portion 40 is located at its lowest position and the lid portion 46 is pressed against the top surface of each of the three heating units 41, the lid portion 46 comes into contact with the support portions 414. The lid portion 46 does not directly come into contact with the heaters 411.

Figure 15:
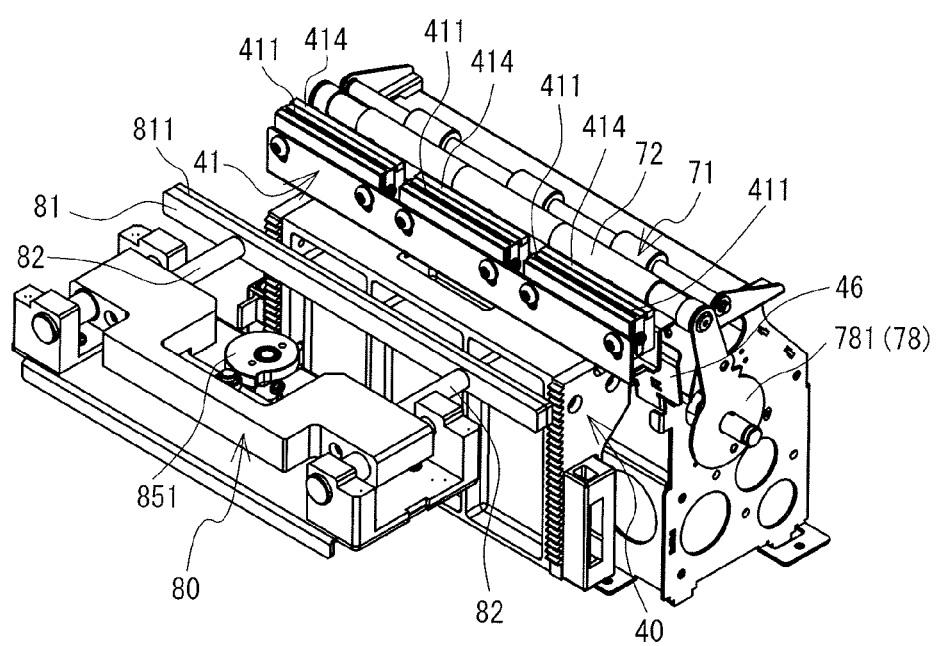
FIG. 15 is yet another enlarged oblique view of the heating portion, the lid portion, and the rotation inhibiting portion.
Figure 16:
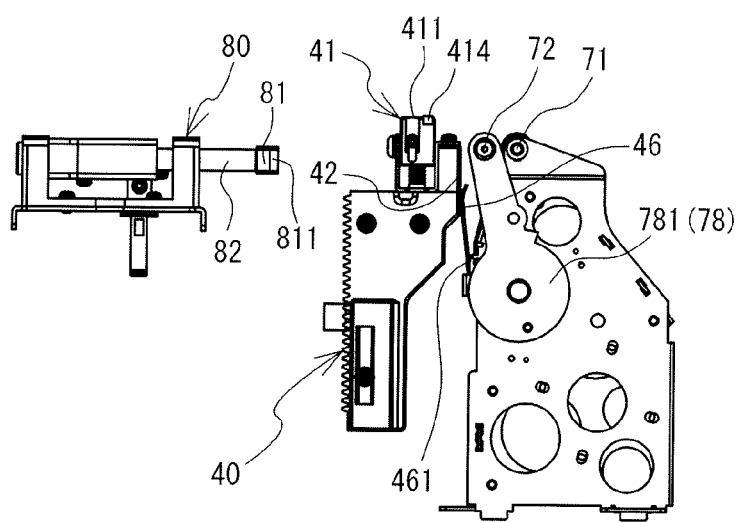
FIG. 16 is a right side view of the heating portion, the lid portion, and the rotation inhibiting portion.

FIG. 15 and FIG. 16 show the relative positions of the heating portion 40 and the rotation inhibiting portion 80 when the heating portion 40 has moved upward and is located at its highest position. In the process in which the heating portion 40 moves upward to its highest position, the lid portion 46 (refer to FIG. 14), which is substantially horizontal when the heating portion 40 is located at its lowest position, is pressed upward from below by the support portions 414 on the top surfaces of the heating units 41. The lid portion 46 pivots about the pivot shafts 461 against the urging force of the springs 462. The downstream edge of the lid portion 46 moves upward. The downstream edge of the lid portion 46 is in contact, from the side, with the plate-shaped member that is provided on the upstream side of the holding portion 42 of the heating portion 40. The lid portion 46 becomes substantially vertical. The lid portion 46 moves away from the top surfaces of the heating units 41 and does not cover the heaters 411.

In the process in which the heating portion 40 moves downward from its highest position and is located at its lowest position, the lid portion 46 is returned to the substantially horizontal state by the urging force of the springs 462. In this state, the lid portion 46 covers the top surfaces of the heating units 41. The downstream edge of the lid portion 46 is bent.

Therefore, in the process in which the heating portion 40 moves downward and is located at its lowest position, the downstream edge of the lid portion 46 does not get caught by the surface of the plate-shaped member on the upstream side of the holding portion 42 and does not hinder the downward movement of the heating portion 40.

The conveyance mechanism 50 will be explained in detail with reference to FIG. 17 to FIG. 21. The conveyance mechanism 50 includes the belts 51, the conveyance portions 60 and a drive portion 55. The drive portion 55 is configured to drive the belts 51. The conveyance portions 60 are connected to the corresponding belts 51. The conveyance portions 60 are configured to convey the base 2 in conjunction with the rotation of the belts 51.

Figure 17:
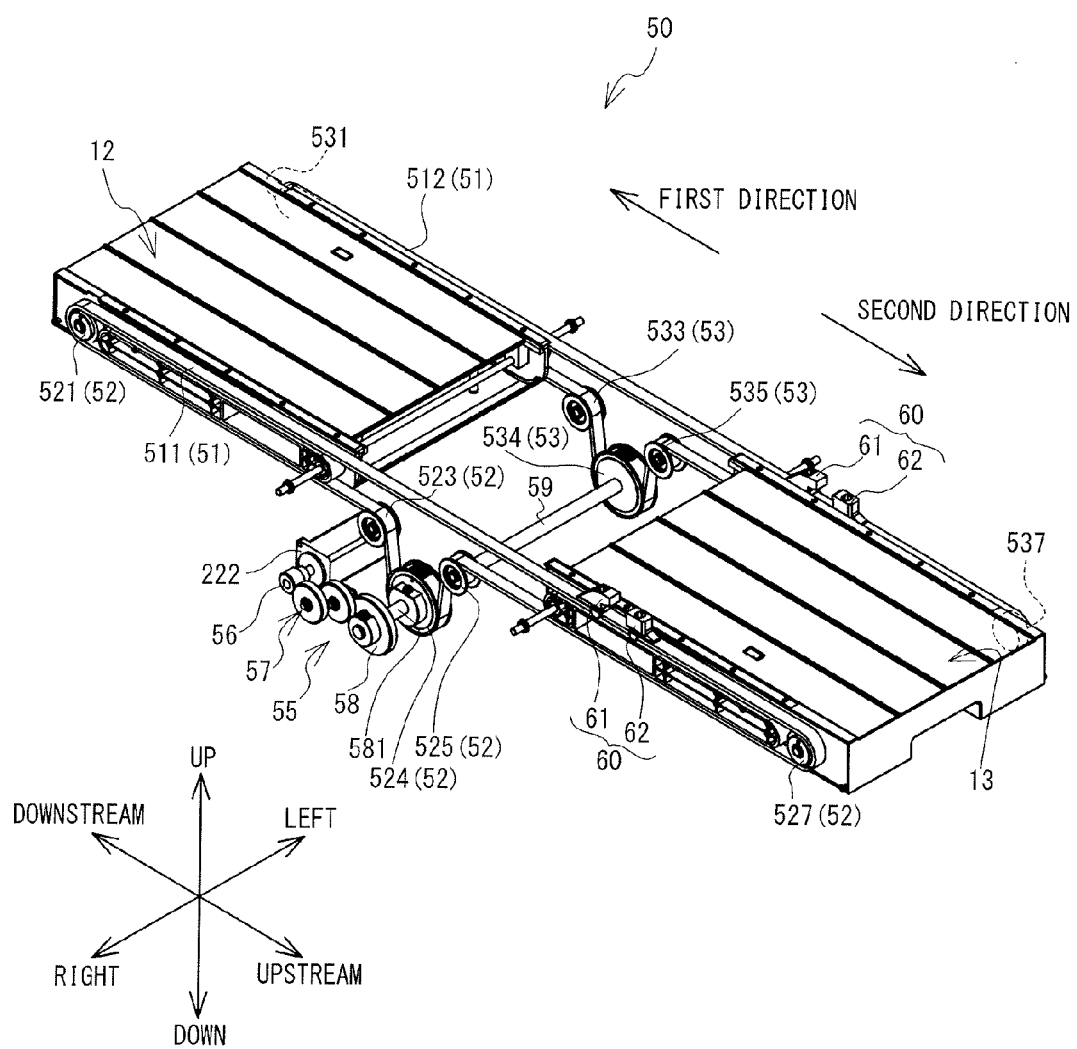
FIG. 17 is an oblique view of a conveyance mechanism.
Figure 18:
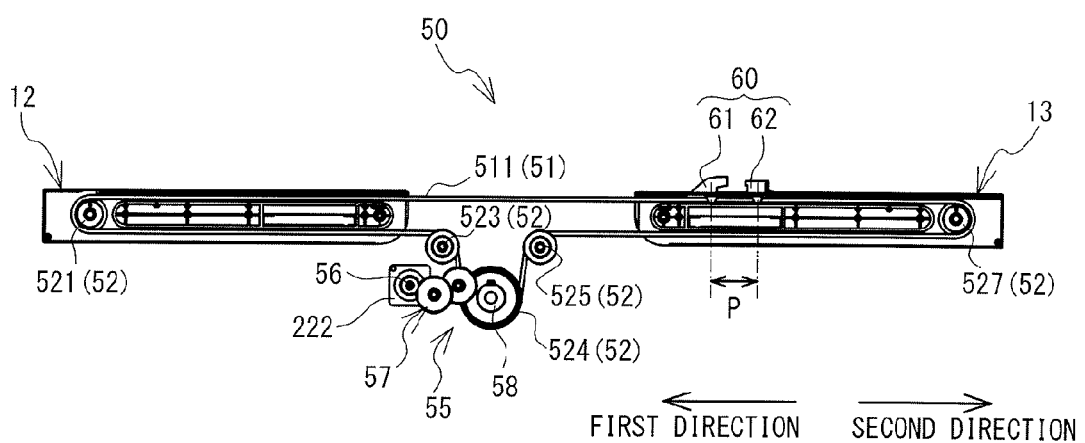
FIG. 18 is a right side view of the conveyance mechanism.

As shown in FIG. 17 and FIG. 18, the belts 51 are endless and have teeth on their inner side surfaces. The belts 51 include the belt 511, which is provided along the right side surface of the first receiving tray 12 and the second receiving tray 13, and the belt 512, which is provided along the left side surface of the first receiving tray 12 and the second receiving tray 13. The belt 511 is routed around pulleys 52 (the pulleys 521, 523, 524, 525, and 527), and the belt 512 is routed around pulleys 53 (the pulleys 531, 533, 534, 535, and 537). In FIG. 17, the covers 122 and 132 (refer to FIG. 1) that cover the belts 51 are omitted. Sections of the covers 122 and 132 are open on the receiving surface sides. The openings expose the receiving surface sides of the belts 51. Hereinafter, the sections of the belts 51 that are exposed through the openings in the covers 122 and 132 will be called exposed sections of the belts 51.

The pulley 521 is provided on the downstream side of the right side surface of the first receiving tray 12. The pulley 527 is provided on the upstream side of the right side surface of the second receiving tray 13. The pulleys 523, 524, and 525 are respectively provided on the downstream side of the left side surface of the side plate portion 111 (refer to FIG. 1), approximately in the center of the left side surface of the side plate portion 111 in the conveyance direction, and on the upstream side of the left side surface of the side plate portion 111. The pulley 524 has teeth on its outer side surface that are configured to engage with the teeth that are provided on the inner side surface of the belt 511.

In a state in which the receiving surfaces of the first receiving tray 12 and the second receiving tray 13 are substantially horizontal, the positions of the axes of the pulleys 521 and 527 in the up-down direction are the same. The section of the belt 511 that extends between the pulleys 521 and 527 is parallel to the conveyance path 103. The axes of the pulleys 523 and 525 are located lower than the axes of the pulleys 521 and 527. The axis of the pulley 524 is located below the axes of the pulleys 523 and 525. The pulleys 521, 524, and 527 are each in contact with the inner side surface of the belt 511, and the pulleys 523 and 525 are each in contact with the outer side surface of the belt 511.

The pulley 531 is provided on the downstream side of the left side surface of the first receiving tray 12. The pulley 537 is provided on the upstream side of the left side surface of the second receiving tray 13. The pulleys 533, 534, and 535 are respectively provided on the downstream side of the right side surface of the side plate portion 112 (refer to FIG. 1), approximately in the center of the right side surface of the side plate portion 112 in the conveyance direction, and on the upstream side of the right side surface of the side plate portion 112. The pulley 534 has teeth on its outer side surface that are configured to engage with teeth that are provided on the inner side surface of the belt 512.

In a state in which the receiving surfaces of the first receiving tray 12 and the second receiving tray 13 are substantially horizontal, the positions of the axes of the pulleys 531 and 537 in the up-down direction are the same. The section of the belt 512 that extends between the pulleys 521 and 527 is parallel to the conveyance path 103. The axes of the pulleys 533 and 535 are located lower than the axes of the pulleys 531 and 537. The axis of the pulley 534 is located lower than the axes of the pulleys 533 and 535. The pulleys 531, 534, and 537 are each in contact with the inner side surface of the belt 512, and the pulleys 533 and 535 are each in contact with the outer side surface of the belt 512.

The drive portion 55 includes the second motor 222, spur gears 56 and 58, and a transmission portion 57. The axis of each of the pulleys 52 and 53 extends in the left-right direction. The axes of the pulleys 52 and 53 are parallel to each other and are orthogonal to the conveyance direction. The pulleys 524 and 534 are connected by a shaft 59 that extends in the left-right direction. A shaft 581 extends to the right from the right side surface of the pulley 524. The spur gear 58 is provided on the outer end of the shaft 581. The second motor 222 is provided below the upstream side section of the first receiving tray 12. The rotating shaft of the second motor 222 extends to the right. The spur gear 56 is provided on the outer end of the rotating shaft of the second motor 222. The transmission portion 57, which is formed by a plurality of spur gears, is provided between the spur gears 56 and 58. The transmission portion 57 is configured to transmit the rotational driving force of the spur gear 56 to the spur gear 58.

The drive portion 55 may cause the pulley 524 to rotate by transmitting the rotational driving force of the second motor 222 to the pulley 524 via the spur gears 56 and 58 and the transmission portion 57. Note that the pulleys 524 and 534 are connected by the shaft 59, so when the pulley 524 rotates, the pulley 534 also rotates. The pulleys 524 and the 534 respectively rotate the belts 511 and 512. The belts 51 can convey the base 2 from the upstream side toward the downstream side by rotating in the counterclockwise direction in a right side view. Hereinafter, the direction in which the exposed sections of the belts 51 move (the direction from the upstream side toward the downstream side) when the base 2 is conveyed from the upstream side toward the downstream side will be called a first direction. Hereinafter, the opposite direction from the first direction (the direction from the downstream side toward the upstream side) will be called a second direction.

The conveyance portions 60 are respectively provided on the outer side surfaces of the belts 511 and 512. The conveyance portions 60 are configured to convey the base 2 by moving in conjunction with the rotation of the belts 51. Each of the conveyance portions 60 includes a first conveyance portion 61 and a second conveyance portion 62. In the explanation that follows, a state will be described in which the first conveyance portion 61 and the second conveyance portion 62 are provided on each of the exposed sections of the belts 51.

Figure 19:
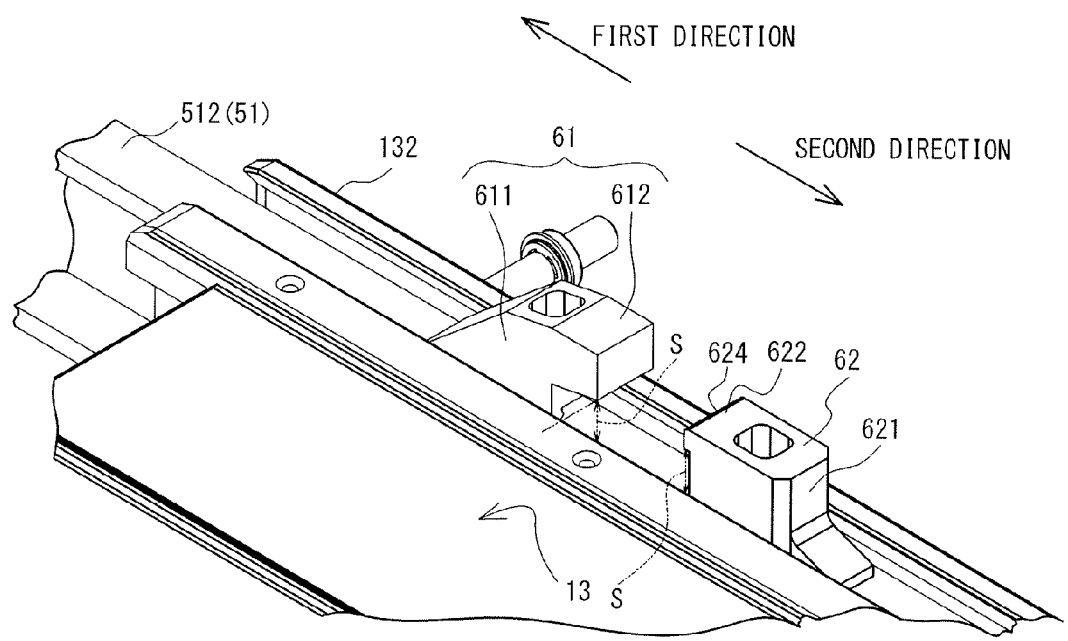
FIG. 19 is an enlarged oblique view of a first conveyance portion and a second conveyance portion.

As shown in FIG. 19, the first conveyance portion 61 and the second conveyance portion 62 are separated from each other in the direction in which the belt 51 extends, that is, in the conveyance direction. The first conveyance portion 61 is positioned on the first direction side with respect to the second conveyance portion 62. The first conveyance portion 61 includes a first protruding portion 611, a first extending portion 612, and a claw portion 613 (refer to FIG. 20). The first protruding portion 611 protrudes vertically and outwardly with respect to the outer side surface of the belt 51. The surface on the first direction side of the first protruding portion 611 is inclined obliquely downward in the first direction. The first extending portion 612 extends from an end portion of the first protruding portion 611 that is on the opposite side from the side on which the first protruding portion 611 is connected to the belt 51, extending in the second direction from the surface on the second direction side of the first protruding portion 611 (that is, the side of the first protruding portion 611 that faces the second conveyance portion 62). The extending portion 612 extends parallel to the belt 51. A bottomed hole is provided in an end face of the first protruding portion 611 that is on the opposite side from the side on which the first protruding portion 611 is connected to the belt 51. A through hole is provided in the bottom surface of the bottomed hole. The claw portion 613 (described later) is fixed in place by a screw that passes through the through hole.

A space is formed between the belt 51 and the first extending portion 612. A section of the surface of the first conveyance portion 61 on the second direction side that is close to the belt 51 has a shape that is recessed in the first direction. The length of the first protruding portion 611 and the first extending portion 612 in the left-right direction is substantially the same as the length of the belt 51 in the left-right direction. A length S between the edge on the belt 51 side of the first extending portion 612 and a plane (the conveyance path 103) that is parallel to the receiving surface is slightly greater than the thickness of a plate-shaped portion 90 (described later; refer to FIG. 23) of the base 2.

Figure 20:
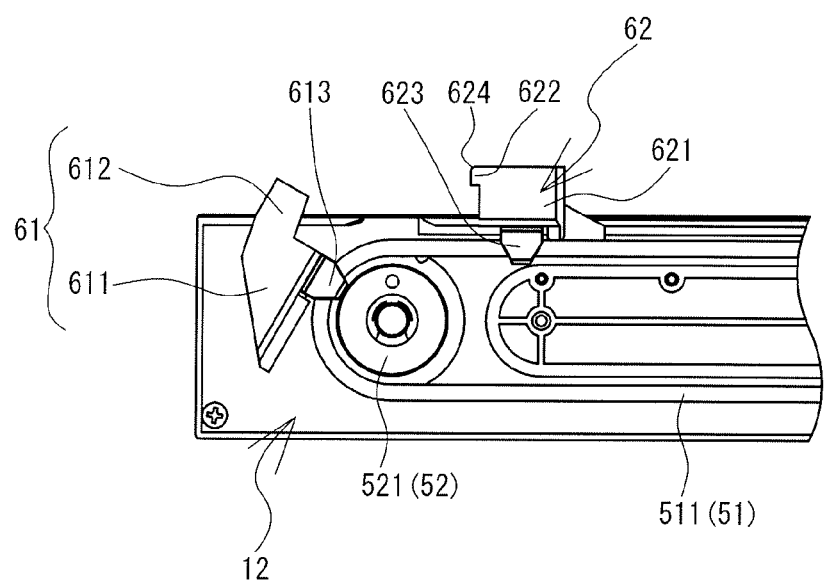
FIG. 20 is an enlarged right side view of a downstream side of the conveyance mechanism.

As shown in FIG. 20, the claw portion 613 is provided on a section of the first protruding portion 611 that is on the side on which the first protruding portion 611 contacts with the belt 51. The claw portion 613 has two first claw portions and two second claw portions. The first claw portions extend toward the belt 51 on the left and right sides from the second direction side of the surface (hereinafter called the bottom surface) of the first protruding portion 611 that contacts with the belt 51. The first claw portions are located to the outside of the belt 51 on the left and right sides. The second claw portions extend from leading ends of the corresponding first claw portions toward the inner side in the width direction of the belt 51 and engage with the teeth of the belt 51. The claw portion 613 secures the first conveyance portion 61 to the belt 51 by clamping the belt 51 between the bottom surface of the first protruding portion 611 and the second claw portions.

The first protruding portion 611 is secured to the belt 51 in a state in which the bottom surface of the first protruding portion 611 extends in the same direction as a tangential direction of the belt 51. Therefore, when the section of the belt 51 to which the first conveyance portion 61 is secured by the claw portion 613 winds around the pulley 521 and bends, the first direction side of the bottom surface of the first protruding portion 611 separates from the belt 51.

Figure 21:
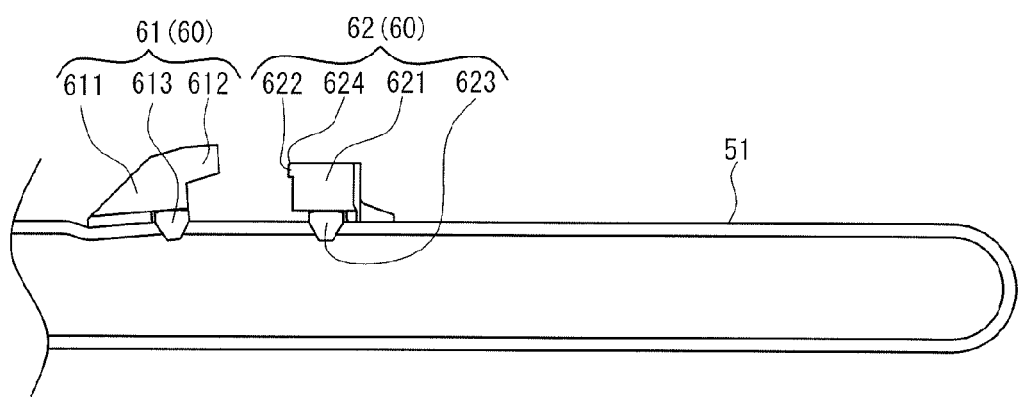
FIG. 21 is a side view of the first conveyance portion and the second conveyance portion.

As explained previously, the belts 51 is made of a composite material of fiber and urethane rubber or the like, and the belts 51 are elastically deformable. Therefore, in a case where a force toward the belt 51 is applied to the end portion on the first direction side of the first conveyance portion 61, as shown in FIG. 21, the section of the belt 51 that is in contact with the end portion on the first direction side of the first conveyance portion 61 is deflected downward. The downward deflecting of the belt 51 causes the direction in which the first protruding portion 611 protrudes in relation to the plane (the conveyance path 103) that is parallel to the receiving surface to tilt toward the first direction side with respect to the direction that is vertical to the plane.

As shown in FIG. 19, the second conveyance portion 62 includes a second protruding portion 621, a second extending portion 622, and a claw portion 623 (refer to FIG. 20). The second protruding portion 621 protrudes vertically and outwardly with respect to the outer side surface of the belt 51.

The second protruding portion 621 is provided in a position on the belt 51 that is separated from the first protruding portion 611 of the first conveyance portion 61 by a predetermined first distance P (refer to FIG. 18) in the second direction. The first distance P is slightly longer than the distance between a side 901 of the base 2 and one of bottom surface portions 92 (described later; refer to FIG. 22) that is close to the side 901. More specifically, the first distance P is slightly longer than the distance between the side 901 of the base 2 and one of a pair of first bottom surface cuts 921 that is closer to the side 901. The second extending portion 622 extends from an end portion of the second protruding portion 621 that is on the opposite side from the side on which the second protruding portion 621 is connected to the belt 51, extending in the first direction from the surface on the first direction side of the second protruding portion 621 (that is, the side that faces the first conveyance portion 61). The second extending portion 622 extends parallel to the belt 51. A corner portion 624, where the end face on the opposite side of the second extending portion 622 from the side that is close to the belt 51 intersects the side surface on the first direction side, curves in an arc shape.

A space is formed between the belt 51 and the second extending portion 622. A section of the surface of the second conveyance portion 62 on the first direction side that is close to the belt 51 has a shape that is recessed in the second direction. The length of the second protruding portion 621 and the second extending portion 622 in the left-right direction is substantially the same as the length of the belt 51 in the left-right direction. A length S between the edge on the belt 51 side of the second extending portion 622 and the plane that is parallel to the receiving surface is the same as the length S between the edge on the belt 51 side of the first extending portion 612 and the plane that is parallel to the receiving surface.

A bottomed hole is provided in an end face of the second protruding portion 621 that is on the opposite side from the side on which the second protruding portion 621 is connected to the belt 51. A through hole is provided in the bottom surface of the bottomed hole. The claw portion 623 (described later) is fixed in place by a screw that passes through the through hole.

As shown in FIG. 20, the claw portion 623 is provided on a section of the second protruding portion 621 that is in contact with the belt 51. The claw portion 623 has two first claw portions and two second claw portions. The first claw portions extend toward the belt 51 on the left and right sides from the bottom surface of the second protruding portion 621, which contacts with the belt 51. The shapes of the first claw portions and the second claw portions are the same as the shapes of the first claw portions and the second claw portions of the claw portion 613 of the first conveyance portion 61, so explanations thereof will be omitted. The claw portion 623 secures the second conveyance portion 62 to the belt 51 by clamping the belt 51 between the bottom surface of the second protruding portion 621 and the second claw portions.

The base 2, on which may be placed the object 3 that is packaged by the packaging device 1, will be explained with reference to FIG. 22 to FIG. 27. The base 2 is formed by folding the plate-shaped portion 90, which is a substantially rectangular-shaped plate, at folding portions 911 and 912. The base 2 is, for example, a corrugated cardboard base.

Figure 22:
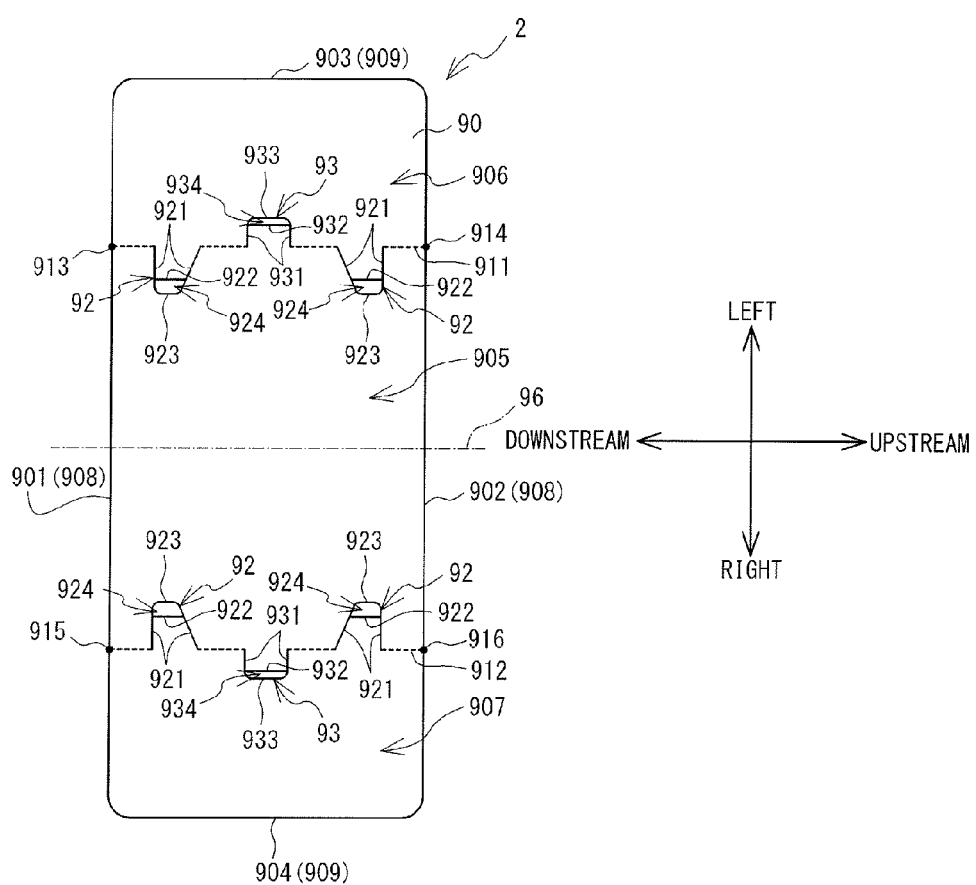
FIG. 22 is a plan view of a base in an unbent state.

As shown in FIG. 22, the plate-shaped portion 90 has four sides, that is, the sides 901, 902, 903, and 904. The sides 901 and 902 are a set of opposing sides that extend in the longitudinal direction of the plate-shaped portion 90. The sides 903 and 904 are another set of opposing sides that extend in the shorter side direction of the plate-shaped portion 90. Hereinafter, the set of the sides 901 and 902 will also be called a first set 908. The set of the sides 903 and 904 will also be called a second set 909. The folding portions 911 and 912 extend linearly between the opposing sides 901 and 902. Among three virtual dividing lines that equally divide, in the longitudinal direction of the plate-shaped portion 90, the plate-shaped portion 90 into four sections, the folding portion 911 is arranged on the dividing line that is closest to the side 903. The folding portion 911 intersects the sides 901 and 902 at intersection points 913 and 914, respectively. The folding portion 912 is arranged on the dividing line that is closest to the side 904. The folding portion 912 intersects the sides 901 and 902 at intersection points 915 and 916, respectively. The folding portion 911 and the folding portion 912 extend parallel to one another. The distance between the folding portions 911 and 912 is slightly greater than the width of the first receiving tray 12 and the width of the second receiving tray 13 in the left-right direction.

Hereinafter, the shorter side direction of the plate-shaped portion 90 will be called the conveyance direction, and the longitudinal direction of the plate-shaped portion 90 will be called the left-right direction. The side of the plate-shaped portion 90 on the side 901 will be called the downstream side, and the side on the side 902 will be called the upstream side, the side on the side 903 will be called the left side, and the side on the side 904 will be called the right side. The section of the plate-shaped portion 90 between the folding portions 911 and 912 will be called a first plate-shaped portion 905, and the section between the folding portion 911 and the side 903 and the section between the folding portion 912 and the side 904 will be called second plate-shaped portions 906 and 907, respectively.

The plate-shaped portion 90 is recessed in sections of the folding portions 911 and 912. If the user applies a force inward in the left-right direction while holding each of the sides 903 and 904 of the plate-shaped portion 90, the user can easily fold the plate-shaped portion 90 along the folding portions 911 and 912.

One of the bottom surface portions 92, a side surface portion 93, and another one of the bottom surface portions 92 are provided in that order from the downstream side toward the upstream side of each of the folding portions 911 and 912, respectively, at positions that divide the each of the folding portions 911 and 912 into four approximately equal sections in the conveyance direction. The two bottom surface portions 92 that are connected to the folding portion 911 are close to the intersection points 913 and 914, respectively. The two bottom surface portions 92 that are connected to the folding portion 912 are close to the intersection points 915 and 916, respectively. The side surface portion 93 that is connected to the folding portion 911 and the side surface portion 93 that is connected to the folding portion 912 are located approximately in the center of plate-shaped portion 90 in the conveyance direction.

Each one of the bottom surface portions 92 includes a plurality of cuts (the pair of the first bottom surface cuts 921, a second bottom surface cut 922 and a third bottom surface cut 923) and a hole 924. Each one of the pairs of the first bottom surface cuts 921 extends inward in the left-right direction from the corresponding one of the folding portions 911 and 912. The distance between the pair of the first bottom surface cuts 921 gradually decreases toward the inner side in the left-right direction. Within each of the pairs of the first bottom surface cuts 921, the cut that is provided on the outer side in the conveyance direction, that is, the cut on the side that is closer to the corresponding one of the intersection points 913 to 916, extends in a direction that is orthogonal to the corresponding one of the folding portions 911 and 912.

The second bottom surface cut 922 and the third bottom surface cut 923 each extend in the conveyance direction between the corresponding pair of the first bottom surface cuts 921. The third bottom surface cut 923 is a cut that extends between the ends of the pair of the first bottom surface cuts 921 that are on the inner side in the left-right direction. The second bottom surface cut 922 is a cut that extends between the pair of the first bottom surface cuts 921 on the outer side in the left-right direction from the third bottom surface cut 923. The hole 924 is provided in a section that is bounded by the pair of the first bottom surface cuts 921, the second bottom surface cut 922, and the third bottom surface cut 923.

Each one of the plurality of side surface portions 93 includes a plurality of cuts (a pair of first side surface cuts 931, a second side surface cut 932 and a third side surface cut 933) and a hole 934. Each one of the pair of the first side surface cuts 931 extends outward in the left-right direction from the corresponding one of the folding portions 911 and 912. The pair of first side surface cuts 931 extend substantially parallel to one another. Each one of the pair of the first side surface cuts 931 extends in the direction that is orthogonal to the corresponding one of the folding portions 911 and 912.

The second side surface cut 932 and the third side surface cut 933 each extend in the conveyance direction between the corresponding pair of the first side surface cuts 931. The third side surface cut 933 is a cut that extends between the ends of the pair of the first side surface cuts 931 that are on the outer side in the left-right direction. The second side surface cut 932 is a cut that extends between the pair of the first side surface cuts 931 on the inner side in the left-right direction from the third side surface cut 933. The hole 934 is provided in a section that is bounded by the pair of the first side surface cuts 931, the second side surface cut 932, and the third side surface cut 933.

The bottom surface portions 92 and the side surface portion 93 that are connected to the folding portion 911, and the bottom surface portions 92 and the side surface portion 93 that are connected to the folding portion 912 are line-symmetrical with respect to a line 96. The line 96 is a virtual straight line that is set in a position where the distance from the dividing line on which the folding portion 911 is provided is equal to the distance from the dividing line on which the folding portion 912 is provided. In other words, the line 96 is a straight line that extends in the conveyance direction in the center of the plate-shaped portion 90 in the left-right direction.

Figure 23:
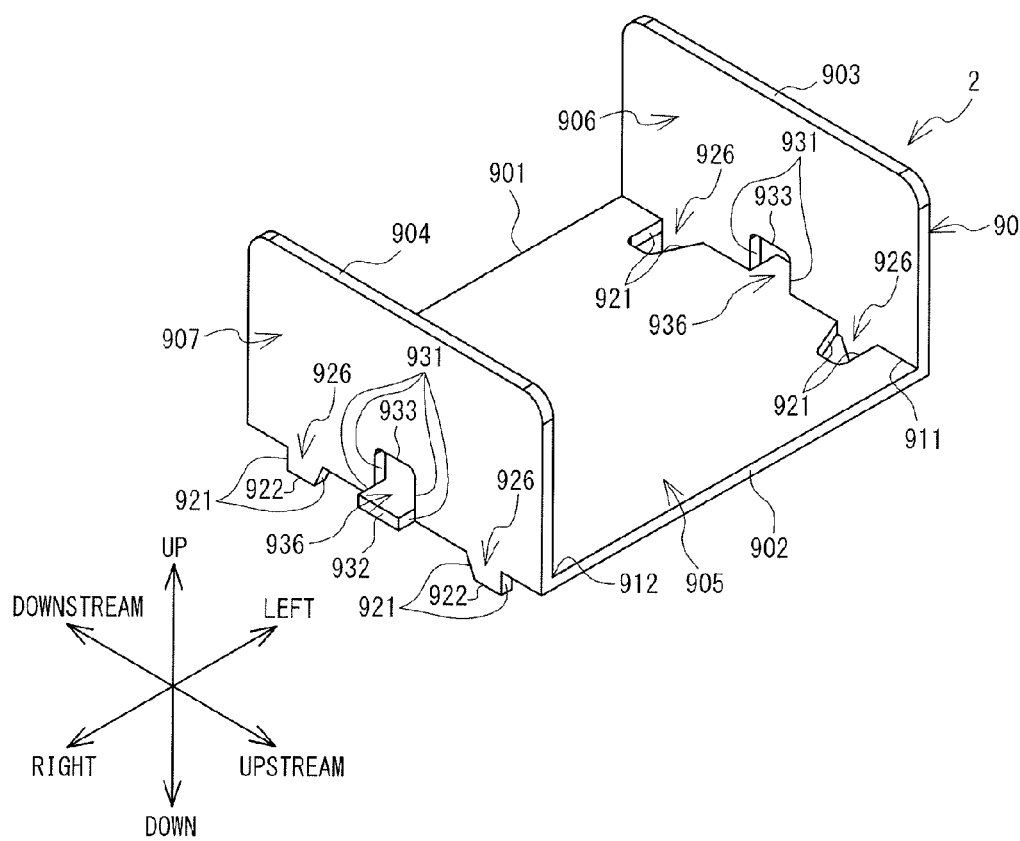
FIG. 23 is an oblique view of the base in a bent state.
Figure 24:
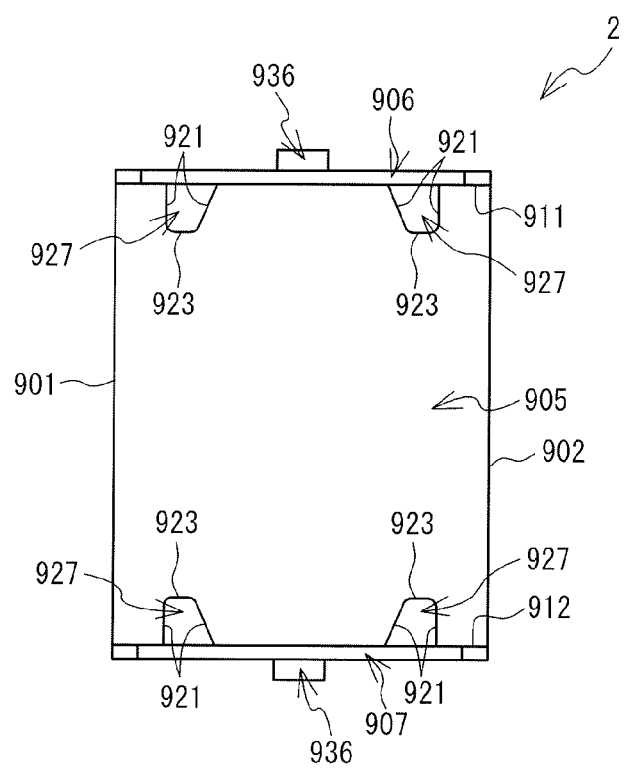
FIG. 24 is a plan view of the base in the bent state.
Figure 25:
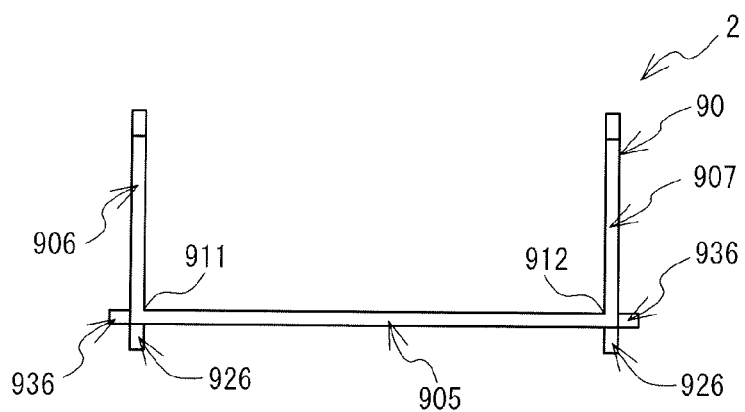
FIG. 25 is a front view of the base in the bent state.

FIG. 23 to FIG. 25 show the base 2 in a state in which the plate-shaped portion 90 has been folded in the same direction at the folding portions 911 and 912, such that the angle that is formed between the first plate-shaped portion 905 and the second plate-shaped portion 906 and the angle that is formed between the first plate-shaped portion 905 and the second plate-shaped portion 907 are each 90 degrees. As shown in FIG. 25, the first plate-shaped portion 905 and the second plate-shaped portion 906 are orthogonal to each other at the folding portion 911, and the first plate-shaped portion 905 and the second plate-shaped portion 907 are orthogonal to each other at the folding portion 912. Hereinafter, the direction that is orthogonal to the first plate-shaped portion 905 will be called the up-down direction. The side on which the sides 903 and 904 are positioned will be called the upper side, and the opposite side will be called the lower side.

As shown in FIG. 23, a section of the bottom surface portion 92 that is bounded by the pair of the first bottom surface cuts 921 and the second bottom surface cut 922 is disposed on the same plane as the corresponding one of the second plate-shaped portions 906 and 907, and is orthogonal to the first plate-shaped portion 905. Hereinafter, the section of the bottom surface portion 92 that is bounded by the pair of the first bottom surface cuts 921 and the second bottom surface cut 922 will be called a bottom surface protruding portion 926. The bottom surface protruding portion 926 protrudes downward with respect to the first plate-shaped portion 905. A section of the side surface portion 93 that is bounded by the pair of the first side surface cuts 931 and the second side surface cut 932 is disposed on the same plane as the first plate-shaped portion 905, and is orthogonal to the corresponding one of the second plate-shaped portions 906 and 907. Hereinafter, the section that is bounded by the pair of the first side surface cuts 931 and the second side surface cut 932 will be called a side surface protruding portion 936. The side surface protruding portion 936 protrudes to the left with respect to the second plate-shaped portion 906 and protrudes to the right with respect to the second plate-shaped portion 907.

As shown in FIG. 24, holes 927 are formed in the first plate-shaped portion 905. Each one of the holes 927 is bounded by one of the dividing lines on which the folding portions 911 and 912 are respectively provided, by the corresponding pair of the first bottom surface cuts 921, and by the corresponding one of the third bottom surface cuts 923.

Figure 26:
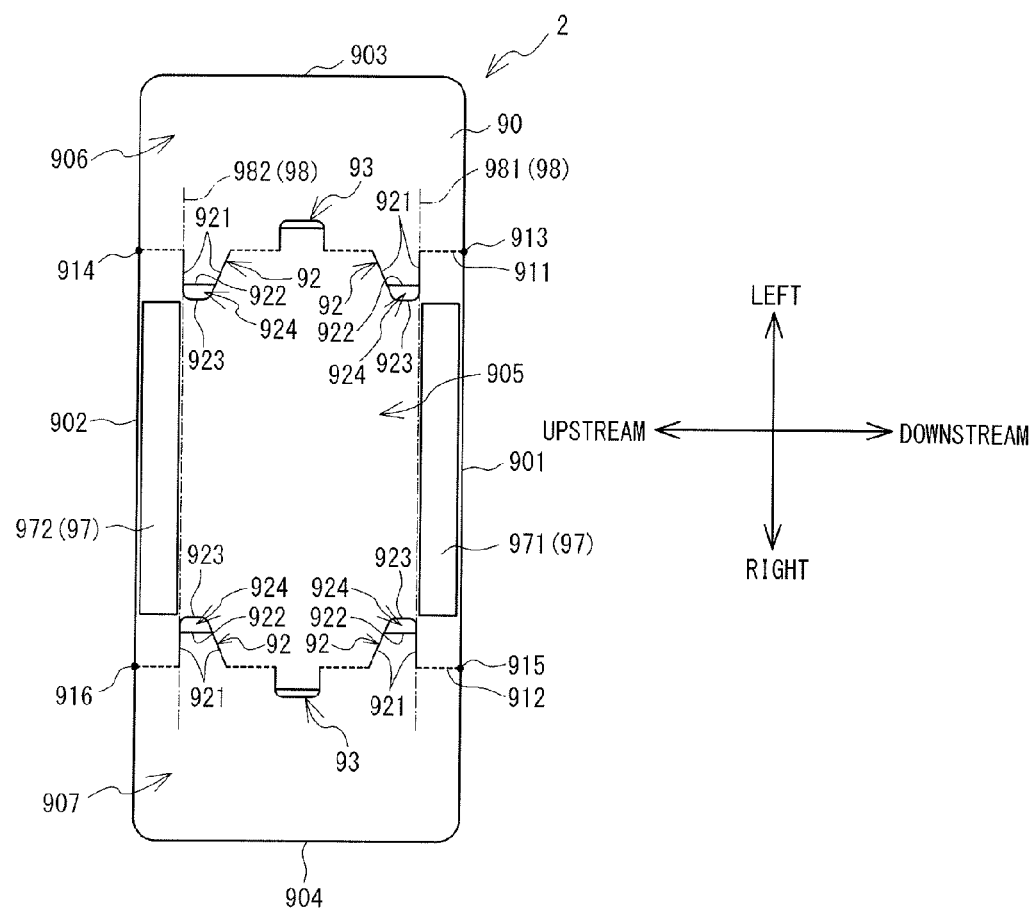
FIG. 26 is a plan view of a base in an unbent state.
Figure 27:
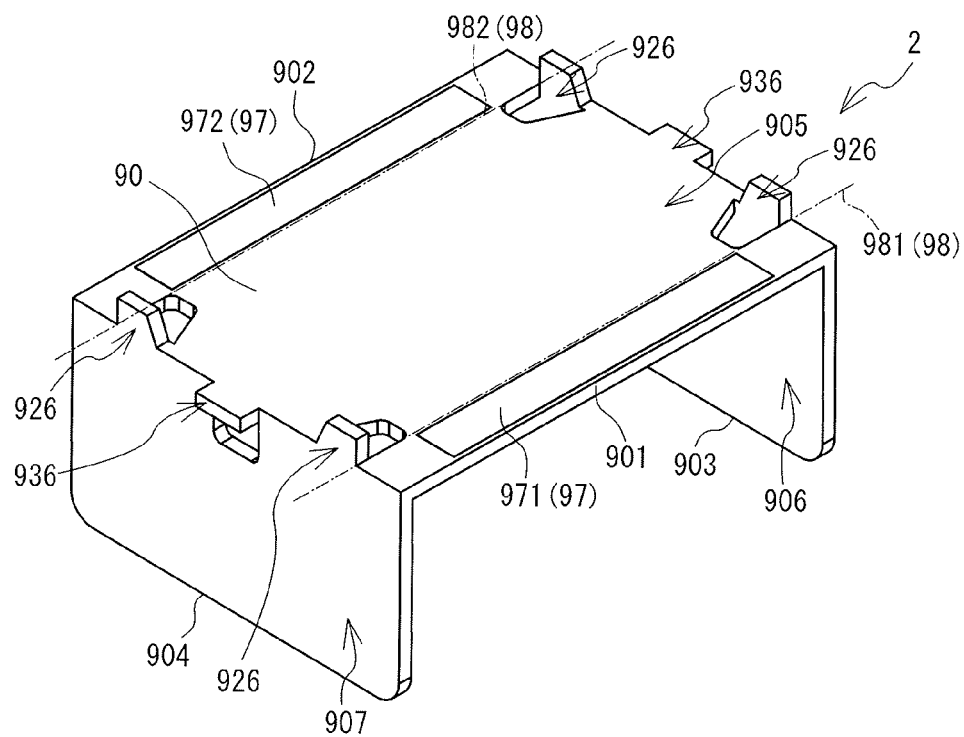
FIG. 27 is an oblique view of the base in the bent state.

As shown in FIG. 26 and FIG. 27, films 97 are affixed to the lower side surface of the first plate-shaped portion 905 of the plate-shaped portion 90. The films 97 include a first film 971 and a second film 972. In a plan view, the first film 971 and the second film 972 have rectangular shapes whose long sides extend in the left-right direction.

The first film 971 is affixed to a section of the first plate-shaped portion 905 of the plate-shaped portion 90 that is located between the side 901 and a first line 981. The first line 981 is a straight line that links the first bottom surface cut 921 that is positioned closest to the intersection point 913, of the pair of the first bottom surface cuts 921 in the bottom surface portion 92 that is closest to the intersection point 913, and the first bottom surface cut 921 that is positioned closest to the intersection point 915, of the pair of the first bottom surface cuts 921 in the bottom surface portion 92 that is closest to the intersection point 915. The first film 971 extends in the left-right direction, from the vicinity of the downstream edge of the third bottom surface cut 923 in the bottom surface portion 92 that is closest to the intersection point 913, to the vicinity of the downstream edge of the third bottom surface cut 923 in the bottom surface portion 92 that is closest to the intersection point 915. The upstream edge of the first film 971 is disposed on the downstream side of the first line 981. The first film 971 is positioned away from the cuts in the bottom surface portions 92 (the first bottom surface cuts 921, the second bottom surface cuts 922 and the third bottom surface cuts 923) and does not contact with those cuts.

The second film 972 is affixed to a section of the first plate-shaped portion 905 of the plate-shaped portion 90 that is located between the side 902 and a second line 982. The second line 982 is a straight line that links the first bottom surface cut 921 that is positioned closest to the intersection point 914, of the pair of the first bottom surface cuts 921 in the bottom surface portion 92 that is closest to the intersection point 914, and the first bottom surface cut 921 that is positioned closest to the intersection point 916, of the pair of the first bottom surface cuts 921 in the bottom surface portion 92 that is closest to the intersection point 916. The second film 972 extends in the left-right direction, from the vicinity of the upstream edge of the third bottom surface cut 923 in the bottom surface portion 92 that is closest to the intersection point 914, to the vicinity of the upstream edge of the third bottom surface cut 923 in the bottom surface portion 92 that is closest to the intersection point 916. The downstream edge of the second film 972 is disposed on the upstream side of the second line 982. The second film 972 is positioned away from the cuts in the bottom surface portions 92 (the first bottom surface cuts 921, the second bottom surface cuts 922 and the third bottom surface cuts 923) and does not contact with those cuts.

The first film 971 and the second film 972 are positioned to the inner side in the left-right direction with respect to the folding portions 911 and 912, respectively. The first film 971 and the second film 972 are positioned away from the folding portions 911 and 912 and do not contact with the folding portions 911 and 912.

Hereinafter, the first film 971 and the second film 972 will also be collectively called films 97. The films 97 are resin films. The films 97 are affixed to the plate-shaped portion 90 using an adhesive. The films 97 may melt when the films 97 are heated by the heaters 411 of the heating portion 40.

Figure 28:
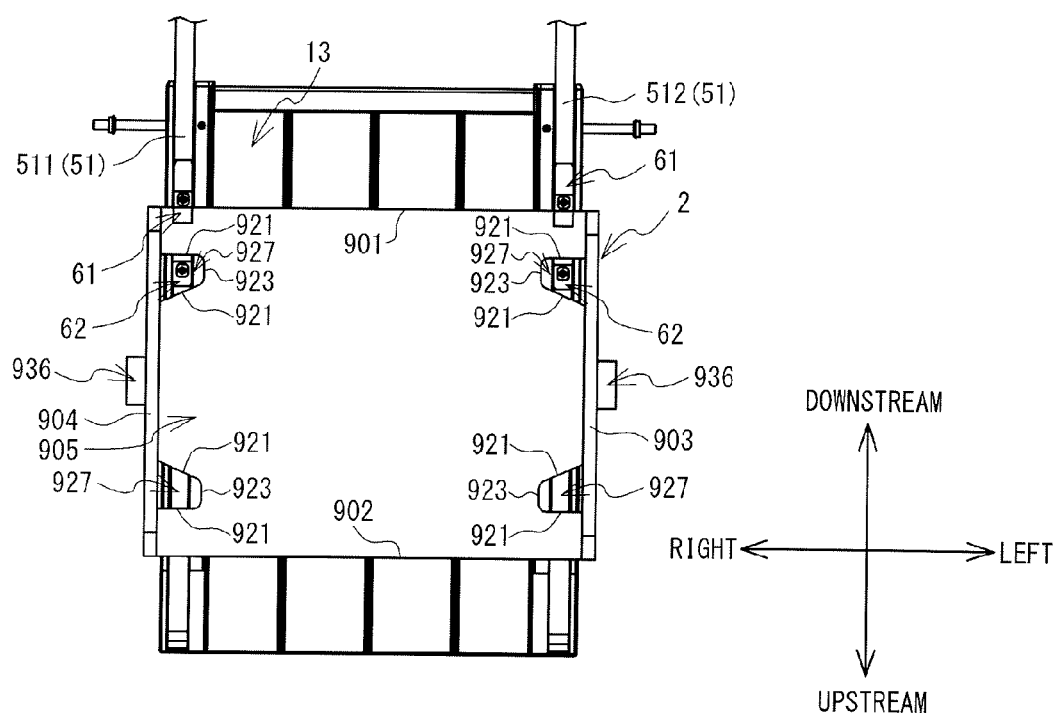
FIG. 28 is a plan view of the base when it has been placed on the second receiving tray.
Figure 29:
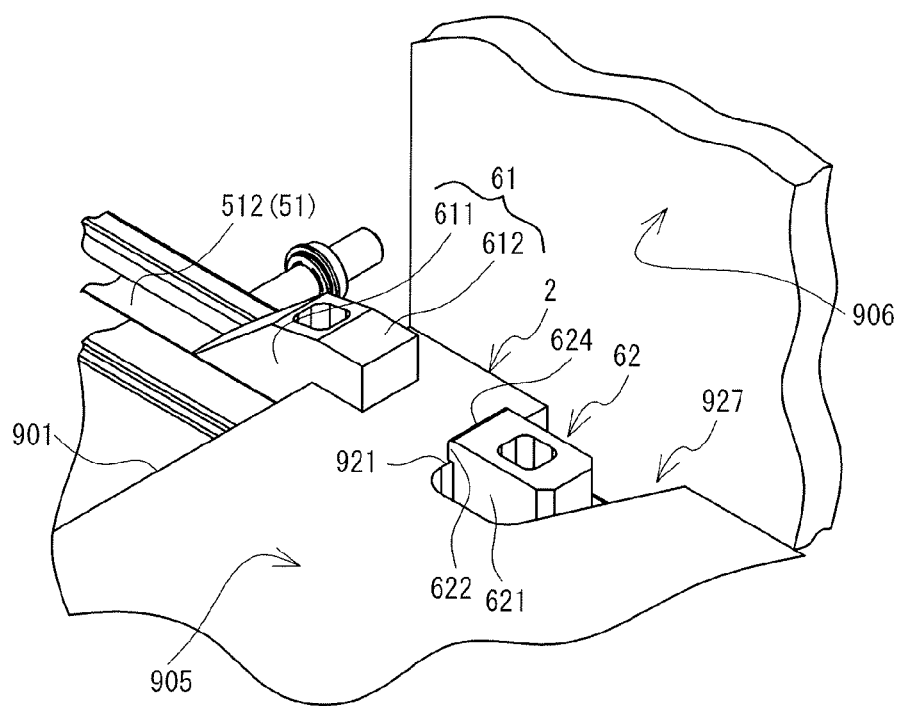
FIG. 29 is an enlarged oblique view of the first conveyance portion and the second conveyance portion in a state in which the base has been placed on the second receiving tray.
Figure 30:
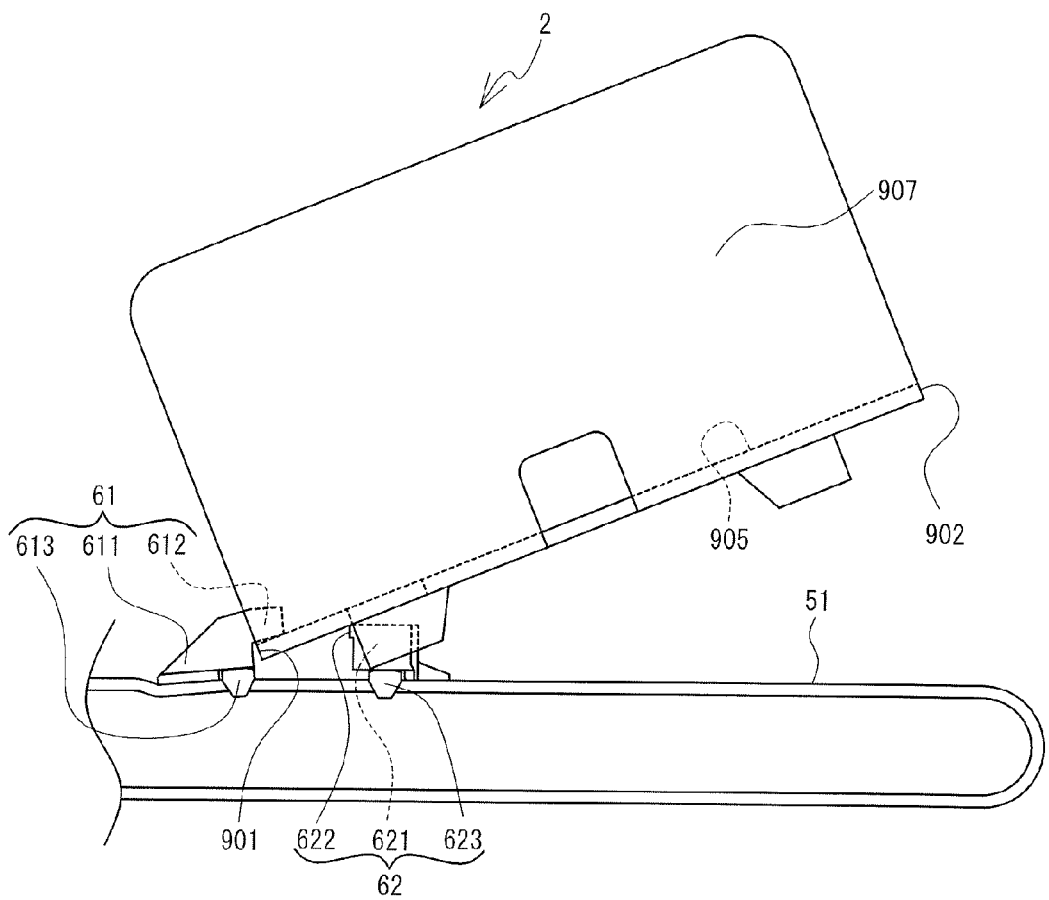
FIG. 30 is a side view showing the state of the first conveyance portion when the base is set on the second receiving tray.

FIG. 28 and FIG. 29 show the base 2 in a state in which the base 2 has been placed on the second receiving tray 13. The user may move the base 2 obliquely downward from the upstream side toward the downstream side in order to fit the side 901 of the first plate-shaped portion 905 of the base 2 into the space between the first extending portion 612 of the first conveyance portion 61 and the belt 51. The side 901 may move obliquely downward from the upstream side toward the downstream side and enter the space between the first extending portion 612 and the belt 51. As shown in FIG. 30, the side 901 may contact with the first protruding portion 611 and apply a force to the first protruding portion 611 in the downstream direction. In addition, the first plate-shaped portion 905 may contact with the first extending portion 612 from below and apply a force to the first extending portion 612 in the upward direction. The direction in which the first protruding portion 611 protrudes may tilt toward the downstream side, with the claw portion 613 serving as a pivot point. The downstream end portion of the first protruding portion 611 may move toward the inner side of the belt 51 and press on the belt 51. The belt 51 may deform elastically and may be deflected toward the inner side. The length S between the edge of the first extending portion 612 on the side toward the belt 51 and the plane that is parallel to the receiving surface (the conveyance path 103) may increase. Therefore, the first plate-shaped portion 905 may smoothly enter the space between the first extending portion 612 and the belt 51. When the side 902 of the base 2 is pressed downward, the first plate-shaped portion 905 may become parallel to the receiving surface. The corner portion 624 of the second extending portion 622 of the second conveyance portion 62 is curved in an arc shape. Therefore, the first plate-shaped portion 905 of the base 2 may be pressed down smoothly, without getting caught on the corner portion 624.

As shown in FIG. 29, the side 901 of the base 2 may be fitted into the space between the first extending portion 612 and the belt 51. The first extending portion 612 may be put into a state in which the first extending portion 612 covers the side 901 of the first plate-shaped portion 905 from above. The first conveyance portions 61 are provided on the belts 51 that are provided on both the left and right side surfaces of the second receiving tray 13. Therefore, the side 901 of the first plate-shaped portion 905 of the base 2 may be held on both the left and right sides in the space between the first extending portion 612 and the belt 51.

The distance (the first distance P, refer to FIG. 18) between the first protruding portion 611 of the first conveyance portion 61 and the second protruding portion 621 of the second conveyance portion 62 is slightly longer than the distance between the side 901 of the base 2 and the bottom surface portion 92 that is closer to the side 901. The second protruding portion 621 may be fitted into the hole 927 that is bounded by the cuts in the bottom surface portion 92 of the base 2 (the pair of the first bottom surface cuts 921 and the third bottom surface cut 923). The base 2 may move horizontally slightly toward the upstream side along the plane that is parallel to the receiving surface. The first bottom surface cut 921 on the downstream side of the pair of the first bottom surface cuts 921 may enter the space between the second extending portion 622 and the belt 51. The first bottom surface cut 921 on the downstream side of the pair of the first bottom surface cuts 921 may be fitted into that space. The second extending portion 622 may be put into a state in which the second extending portion 622 covers the first bottom surface cut 921 on the downstream side of the pair of the first bottom surface cuts 921 from above.

The base 2 may be held by the first protruding portions 611 and the second protruding portions 621 from the downstream side and the upstream side of the conveyance direction, respectively. The second conveyance portions 62 are provided on the belts 51 that are provided on both the left and right side surfaces of the second receiving tray 13. Therefore, the base 2 may be held on both the left and right sides in the space between the first protruding portion 611 and the second protruding portion 621.

The first plate-shaped portion 905 of the base 2 may be put into a state in which the first plate-shaped portion 905 is in contact with the receiving surface of the second receiving tray 13, although this is not shown in the drawings. Therefore, the bottom surface protruding portions 926 that protrude downward from the first plate-shaped portion 905 may protrude downward from both the left and right sides of the receiving surface of the second receiving tray 13 and may be positioned to the outside of the left and right side surfaces of the second receiving tray 13.

An electrical configuration of the packaging device 1 will be explained with reference to FIG. 31. The packaging device 1 includes a CPU 201, a ROM 202, a RAM 203, the sensor 204, an input portion 205, and the heaters 411. The CPU 201 performs overall control of the packaging device 1. The CPU 201 may perform packaging processing by executing a program that is stored in the ROM 202. The packaging processing is processing that packages, with the film 24, the object 3 that has been placed on the base 2. The ROM 202 may store the program for the packaging processing that is executed by the CPU 201. The RAM 203 may store temporary data. The sensor 204 is configured to detect the reflecting plate provided on the outer side surface of the belt 51. The input portion 205 includes a plurality of input buttons that can be used by the user to perform an input operation with respect to the packaging device 1. The packaging device 1 also includes drive portions 211 to 216, the first motor 221, the second motor 222, the third motor 223, the fourth motor 224, the fifth motor 225, and the sixth motor 226. The drive portions 211 to 216 are respectively configured to drive the first motor 221 to the sixth motor 226. The CPU 201 is electrically connected to the ROM 202, the RAM 203, the sensor 204, the heaters 411, and the drive portions 211 to 216. The drive portions 211 to 216 are respectively electrically connected to the first motor 221 to the sixth motor 226.

The packaging processing that is performed by the CPU 201 of the packaging device 1 will be explained with reference to FIG. 32 to FIG. 43. Before the user performs an operation, using the packaging device 1, to package the base 2 and the object 3 with the film 24, the user swings the first receiving tray 12 and the second receiving tray 13 down such that the receiving surfaces of the first receiving tray 12 and the second receiving tray 13 (refer to FIG. 1) become horizontal. The receiving surface of the first receiving tray 12 and the receiving surface of the second receiving tray 13 form the conveyance path 103. The user then turns on the power supply of the packaging device 1. When the power supply of the packaging device 1 is turned on, the CPU 201 starts the packaging processing by reading and executing the program that is stored in the ROM 202.

Figure 32:
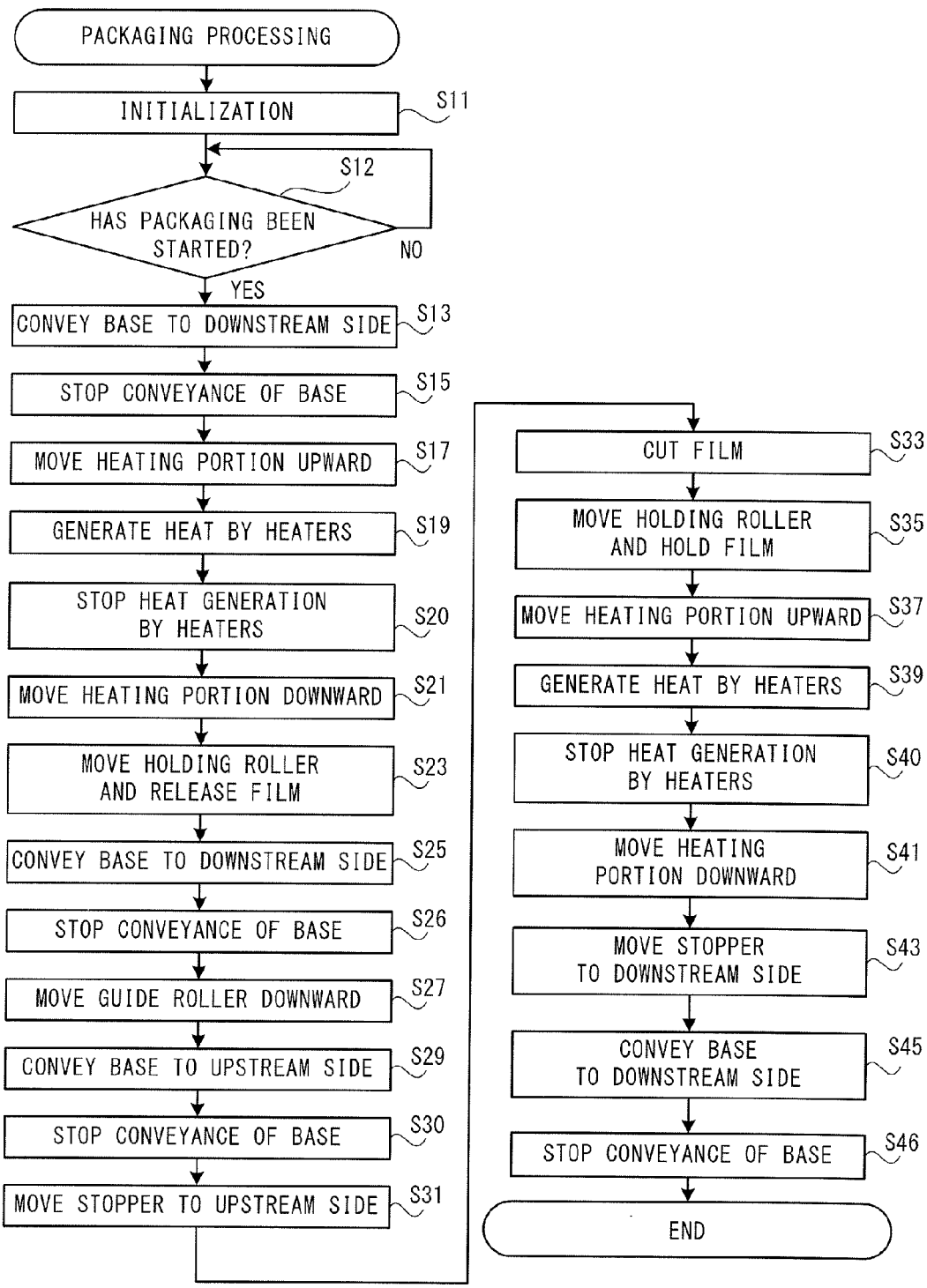
FIG. 32 is a flowchart of packaging processing.

As shown in FIG. 32, first, the CPU 201 initializes the state of the packaging device 1 (Step S11). Specifically, the initialization is performed as will now be explained. The CPU 201 drives the first motor 221 by controlling the drive portion 211, thus causing the support portions 34 to move upward and be positioned at their highest positions. That causes the movable rollers 30 (the guide roller 31, the first auxiliary roller 32, and the second auxiliary roller 33) that are supported by the support portions 34 to be positioned at their highest positions (refer to FIG. 33). The CPU 201 drives the second motor 222 by controlling the drive portion 212, thus causing the belts 51 (refer to FIG. 17) of the conveyance mechanism 50 to rotate. When the sensor 204 detects the reflecting plate, the CPU 201 stops the driving of the second motor 222 by controlling the drive portion 212. That makes the conveyance portions 60 (the first conveyance portion 61 and the second conveyance portion 62) to protrude upward higher than the receiving surface of the second receiving tray 13 (refer to FIG. 17). The packaging device 1 is put into a state in which the user can set the base 2 on the receiving surface of the second receiving tray 13.

The CPU 201 drives the third motor 223 by controlling the drive portion 213, thus moving the heating portion 40 downward such that the heating portion 40 is positioned at its lowest position. That causes the heaters 411 (refer to FIG. 8) that are located on the top surfaces of the heating units 41 to move away from the conveyance path 103 (refer to FIG. 33). The lid portion 46 is pivoted by the springs 462 and comes into contact with the support portions 414 on the top surfaces of the heating units 41. The lid portion 46 is put into a substantially horizontal state and covers the heaters 411 from above. Therefore, even when the user attempts to touch the inside of the packaging device 1 for the purpose of maintenance, for example, the user is not able to touch the heaters 411 directly.

Figure 12:
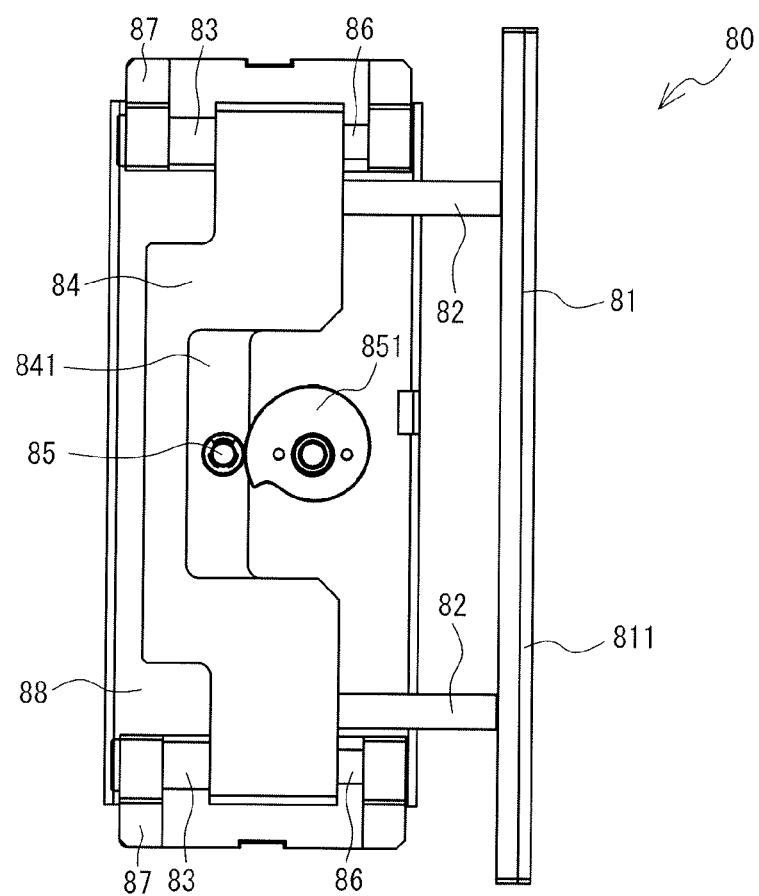
FIG. 12 is a plan view of the rotation inhibiting portion in a state in which the stopper has moved to a downstream side.

The CPU 201 drives the fourth motor 224 by controlling the drive portion 214, thus moving the stopper 81 toward the downstream side (refer to FIG. 12). The CPU 201 drives the fifth motor 225 by controlling the drive portion 215, thus moving the cutting portion 77 to the left (refer to FIG. 4). In this state, the position in the left-right direction of the blade portion 771 of the cutting portion 77 is located to the left of the left end of the film 24 that is contained in the film cassette 21. The CPU 201 drives the sixth motor 226 by controlling the drive portion 216, thus causing the holding portions 78 to rotate. The holding roller 72 moves downward, away from the base guide roller 71 (refer to FIG. 7).

The CPU 201 determines whether or not a command to start the packaging of the base 2 and the object 3 with the film 24 is input via the input portion 205 (refer to FIG. 31) (Step S12). In a case where the command to start the packaging is not input (NO at Step S12), the processing returns to Step S12. The CPU 201 continues to wait for the input of the start command.

After the packaging device 1 has been initialized at Step S11, the user manually pulls down the film 24 that has been discharged from the discharge opening of the film cassette 21, through the upstream side of the second auxiliary roller 33. Since the film 24 comes into contact with the upstream side of the second auxiliary roller 33, the film 24 is guided slightly to the upstream side. The user pulls the pulled-down leading edge of the film 24 until the leading edge is below the conveyance path 103 and is positioned on the downstream side of the base guide roller 71 (refer to FIG. 33).

Figure 33:
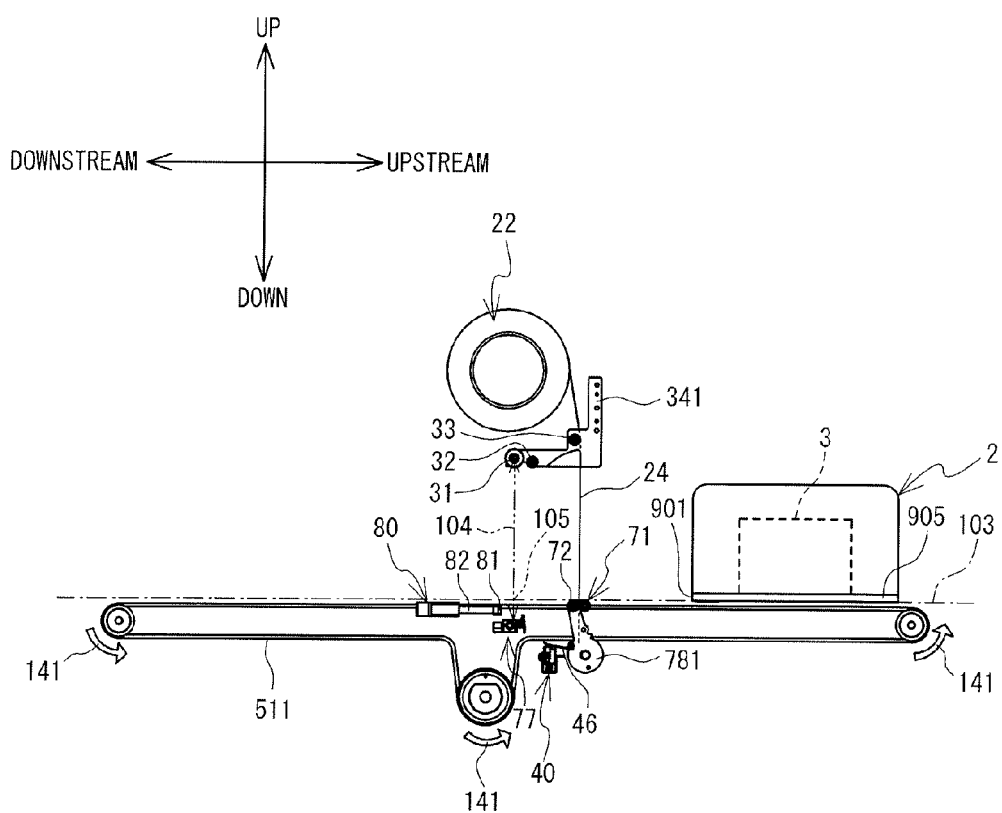
FIG. 33 is a figure that shows a packaging step in the packaging processing.

The user performs an input operation via the input portion 205 in order to notify the packaging device 1 that the film 24 has been prepared. The CPU 201 drives the sixth motor 226 by controlling the drive portion 216, thus causing the holding portions 78 to rotate. The rotating of the holding portions 78 positions the holding roller 72 on the downstream side of the base guide roller 71, as shown in FIG. 33. The leading edge of the film 24 that has been pulled out from the film cassette 21 is clamped by the base guide roller 71 and the holding roller 72 from both the upstream side and the downstream side in the conveyance direction. The film 24 and the conveyance path 103 intersect in the vicinity of the leading edge of the film 24. As the clutch spring applies torque to the film roll 22, tension is exerted on the film 24. The film 24 is put into a state in which the film 24 extends straight in the up-down direction between the upstream side of the second auxiliary roller 33 and the section that is clamped by the base guide roller 71 and the holding roller 72.

The user places the base 2 on the second receiving tray 13 (refer to FIG. 28 to FIG. 30). The base 2 is positioned by the conveyance portion 60, and the position of the base 2 is fixed with respect to the conveyance portion 60. The side 901 of the base 2 is positioned on the downstream side in the conveyance direction, and the side 902 is positioned on the upstream side. The base 2 is put into a state in which the base 2 can be conveyed in the conveyance direction by the conveyance portion 60. The user places the object 3 on the first plate-shaped portion 905 of the base 2 that has been placed on the second receiving tray 13. The user performs an input operation, via the input portion 205, that issues a command to start the packaging of the base 2 and the object 3 with the film 24.

As shown in FIG. 32, in a case where the command to start the packaging is input (YES at Step S12), the CPU 201 drives the second motor 222 by controlling the drive portion 212. By controlling the drive portion 212, the CPU 201 adjusts the rotation direction of the second motor 222 such that the belts 51 rotate in the direction in which the base 2 is conveyed from the upstream side toward the downstream side. The second motor 222 rotates the belts 51 via the drive portion 55 (refer to FIG. 17). The belts 51 rotate in the direction (the direction of the arrow 141 in FIG. 33) in which the conveyance portions 60 (the first conveyance portions 61 and the second conveyance portions 62) that protrude upward higher than the receiving surface of the second receiving tray 13 move from the upstream side toward the downstream side. The conveyance portions 60 convey the base 2 along the conveyance path 103 from the upstream side toward the downstream side (Step S13).

The first protruding portion 611 of the first conveyance portion 61 and the second protruding portion 621 of the second conveyance portion 62 respectively hold the section of the first plate-shaped portion 905 that is located between the side 901 and the hole 927 that is closer to the side 901 from the downstream side and the upstream side in the conveyance direction. Therefore, the conveyance portions 60 can appropriately convey the base 2 toward the downstream side.

Hereinafter, the rotation direction of the second motor 222 and the belts 51 when the base 2 is conveyed from the upstream side toward the downstream side will be called a forward direction. The rotation direction of the second motor 222 and the belts 51 that is the opposite of the forward direction will be called a reverse direction.

As shown in FIG. 33, the downstream edge of the first plate-shaped portion 905 gradually approaches the film 24 that is extending in the up-down direction. The downstream edge (the side 901) of the first plate-shaped portion 905 comes into contact with the film 24 and then passes over the holding roller 72. The CPU 201 continues to drive the second motor 222 by controlling the drive portion 212, thus causing the belts 51 to continue to rotate in the forward direction. The base 2 continues to be conveyed toward the downstream side.

Figure 34:
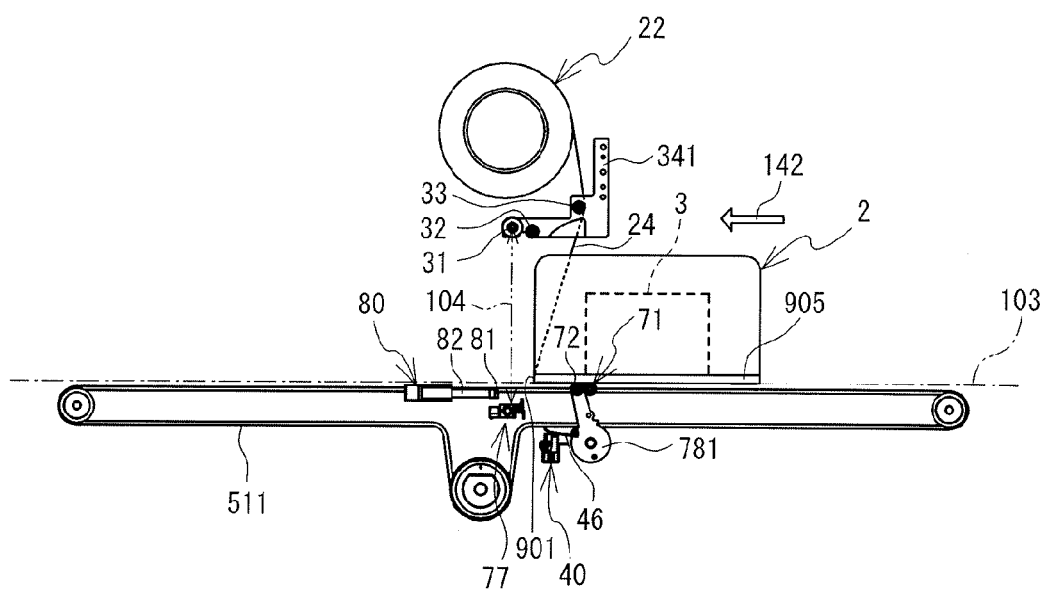
FIG. 34 is a figure that shows a packaging step in the packaging processing.

As shown in FIG. 34, the moving of the base 2 toward the downstream side (the arrow 142) causes the side 901 of the first plate-shaped portion 905 to push the film 24 toward the downstream side. The base 2 moves farther toward the downstream side. The side 901 approaches the movement path 104 from the upstream side. The base 2 moves farther toward the downstream side, and the side 901 passes above the heating portion 40. The leading edge of the film 24 is clamped by the base guide roller 71 and the holding roller 72. When the film 24 is pushed toward the downstream side by the side 901 of the first plate-shaped portion 905, the leading edge of the film 24 is moved around to the lower surface of the first plate-shaped portion 905 of the base 2.

Based on the number of revolutions of the second motor 222 since the conveyance of the base 2 toward the downstream side was started at Step S13 (refer to FIG. 32), the CPU 201 detects whether the side 901 of the first plate-shaped portion 905 has been moved toward the downstream side by a predetermined distance in relation to the position above the heating portion 40. The predetermined distance is set to be approximately the same as the distance from the side 901 of the first plate-shaped portion 905 to the first line 981 (refer to FIG. 27). When the side 901 has been moved farther toward the downstream side than the position above the heating portion 40 by the predetermined distance, the CPU 201 stops the driving of the second motor 222 by controlling the drive portion 212, thus stopping the conveyance of the base 2 toward the downstream side, as shown in FIG. 32 (Step S15).

Figure 35:
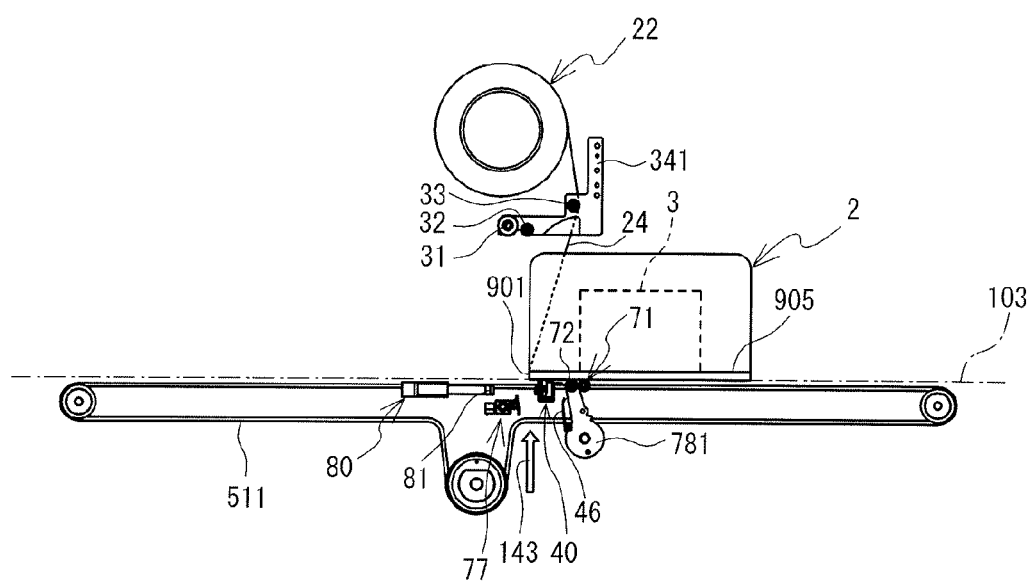
FIG. 35 is a figure that shows a packaging step in the packaging processing.

The CPU 201 drives the third motor 223 by controlling the drive portion 213, thus causing the heating portion 40 to move upward (Step S17). After the heating portion 40 has reached its highest position, the CPU 201 stops the driving of the third motor 223 by controlling the drive portion 213, thus stopping the upward movement of the heating portion 40. As shown in FIG. 35, when the heating portion 40 has been moved upward (the arrow 143) to its highest position, the top surfaces of the heating units 41 (refer to FIG. 8) of the heating portion 40 have come close to the conveyance path 103 from below. The film 24 is sandwiched between the support portions 414 and the base 2, and the support portions 414 fix the positions of the heaters 411 in relation to the film 24. In conjunction with the upward movement of the heating portion 40, the lid portion 46 pivots around the pivot shafts 461 against the urging force of the springs 462. The lid portion 46 becomes substantially vertical. The edge of the lid portion 46 on the opposite side from the pivot shafts 461 comes into contact with the plate-shaped portion on the upstream side of the holding portion 42 of the heating portion 40. The lid portion 46 moves away from the top surfaces of the heating units 41.

The side 901 of the first plate-shaped portion 905 has been moved farther toward the downstream side than the position above the heating portion 40 by the predetermined distance.

The film 24 has been moved around to the lower surface of the first plate-shaped portion 905. Therefore, when the heating portion 40 is located at its highest position, the film 24 is sandwiched between the top surfaces of the heating units 41 and the lower surface of the first plate-shaped portion 905 of the base 2. At this time, as shown in FIG. 27, the first film 971 is affixed to the section of the lower surface of the first plate-shaped portion 905 that is between the side 901 and the first line 981. Therefore, a state is created in which the film 24 is sandwiched between the top surfaces of the heating units 41 of the heating portion 40, which has been moved to its highest position, and the first film 971, which is affixed to the base 2.

As shown in FIG. 32, the CPU 201 causes the heaters 411 of the heating portion 40 to generate heat (Step S19). The heaters 411 heat the film 24, thereby melting the film 24. At the same time, the heat from the heaters 411 passes through the film 24 and heats the first film 971 that is affixed to the base 2, thereby melting the first film 971 as well. The melted film 24 and the melted first film 971 bond together well. The portion of the film 24 that is close to the leading edge is thus bonded, through the first film 971, to the part of the lower surface of the first plate-shaped portion 905 that is close to the side 901 (Step S19).

Figure 36:
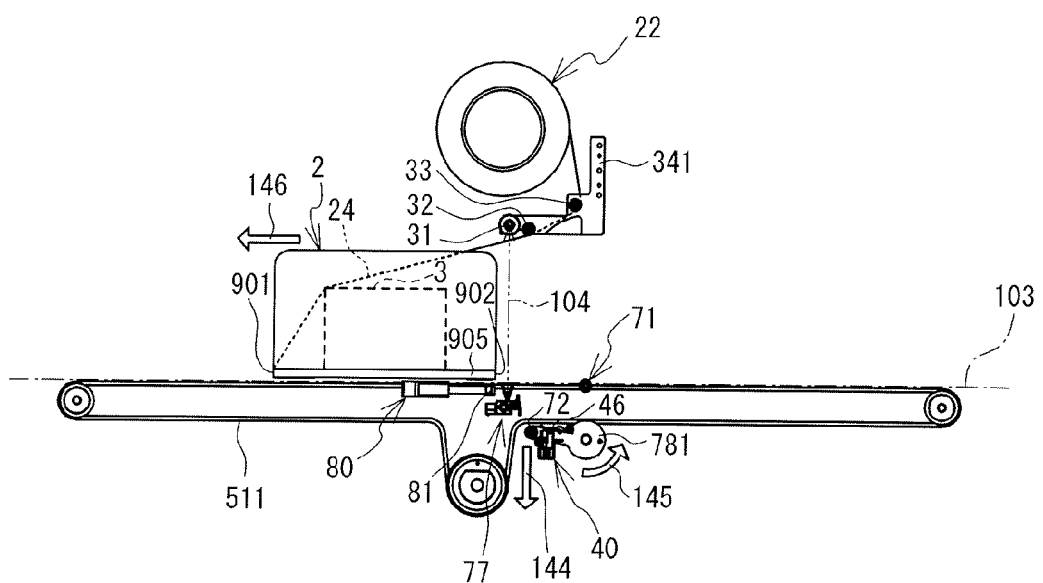
FIG. 36 is a figure that shows a packaging step in the packaging processing.

The CPU 201 stops the heat generation of the heaters 411 after a predetermined time period has elapsed from when the heat generation of the heaters 411 was started at Step S19 (Step S20). The predetermined time period is a time period that is necessary for the heaters 411 to heat the film 24 and the first film 971 to their melting points. The CPU 201 drives the third motor 223 by controlling the drive portion 213, thus causing the heating portion 40 to move downward (Step S21). The top surfaces of the heating units 41 of the heating portion 40 move away from the conveyance path 103. After the heating portion 40 has reached its lowest position, the CPU 201 stops the driving of the third motor 223 by controlling the drive portion 213, thus stopping the downward movement of the heating portion 40. As shown in FIG. 36, when the heating portion 40 has been moved downward (the arrow 144) to its lowest position, the lid portion 46 is pivoted around the pivot shafts 461 by the urging force of the springs 462 and becomes substantially horizontal. The top surfaces of the heating units 41 are covered by the lid portion 46.

As shown in FIG. 32, the CPU 201 drives the sixth motor 226 by controlling the drive portion 216, thus causing the holding portions 78 to rotate (Step S23). As shown in FIG. 36, the rotating of the holding portions 78 in the direction indicated by the arrow 145 moves the holding roller 72 downward, away from the base guide roller 71. The base guide roller 71 and the holding roller 72 release the leading edge of the film 24 that had been clamped. The portion of the film 24 that is close to the leading edge, which was melted by being heated by the heaters 411 at Step S19, is in a state in which the portion is bonded to the lower surface of the base 2. As shown in FIG. 32, the CPU 201 drives the second motor 222 by controlling the drive portion 212, thus causing the belts 51 to rotate in the forward direction such that the base 2 is conveyed toward the downstream side (Step S25).

As shown in FIG. 36, the conveyance portions 60 move along the conveyance path 103 from the upstream side toward the downstream side (the arrow 146) and convey the base 2 toward the downstream side. The leading edge of the film 24 has been released from the base guide roller 71 and the holding roller 72. Accordingly, in the state in which the portion of the film 24 that is close to the leading edge is bonded to the lower surface of the base 2, the film 24 moves toward the downstream side in conjunction with the movement of the base 2. The side 901 of the first plate-shaped portion 905, in moving from the upstream side toward the downstream side, traverses the position (the intersection position 105) at which the conveyance path 103 and the movement path 104 intersect. The base 2 moves farther toward the downstream side (the arrow 146). The side 901 of the first plate-shaped portion 905 and the downstream edge of the object 3 are pressed against the film 24 by the movement of the base 2 toward the downstream side. The film 24 is bent at the points where the film 24 is in contact with the side 901 and the object 3. The film 24 is fed out from the film roll 22 little by little. The film 24 is pressed strongly against the base 2 and the object 3 by the torque that is applied to the film roll 22. The film 24 is firmly affixed to the base 2 and the object 3 in the positions where the film 24 covers the first plate-shaped portion 905 of the base 2 and the downstream side of the object 3.

The CPU 201 continuously drives the second motor 222 by controlling the drive portion 212, thus causing the belts 51 to continuously rotate in the forward direction. The base 2 is continuously conveyed to the first receiving tray 12 on the downstream side. The clutch spring applies torque to the film roll 22 such that tension is exerted on the film 24. Therefore, in conjunction with the conveyance of the base 2 toward the downstream side, an upward force is exerted on the downstream side of the first plate-shaped portion 905, to which the portion of the film 24 that is close to the leading edge is bonded. In the same manner, an upward force is also exerted on the first receiving tray 12, which supports, via the pulleys 52 and 53, the belts 51 on which the conveyance portions 60 that convey the base 2 are provided. To address this, the upstream edges of the guide portions 16 contact with the downstream edges of the side plate portions 111 and 112, thus inhibiting the base 2 and the first receiving tray 12 from lifting upward.

The base 2 is continuously conveyed toward the downstream side, and the film 24 is disposed in a position where the film 24 covers the first plate-shaped portion 905 and the upper side of the object 3. The film 24 is firmly affixed to the top surface of the object 3 by the torque that is applied to the film roll 22. The upstream edge (the side 902) of the first plate-shaped portion 905 passes over the base guide roller 71. The base 2 is conveyed farther toward the downstream side (the arrow 146). The side 902 of the first plate-shaped portion 905 traverses the intersection position 105 from the upstream side toward the downstream side. The film 24 that extends from the film roll 22 comes into contact with the upstream side of the second auxiliary roller 33 and is guided slightly to the upstream side, where the film 24 comes into contact with the upstream side and the lower side of the second auxiliary roller 33 and extends toward the downstream side. The film 24 also comes into contact with the lower side of the first auxiliary roller 32 and extends farther toward the downstream side, eventually reaching the downstream side of the side 901 of the first plate-shaped portion 905 and the object 3. The guide roller 31 is disposed above the film 24 that extends between the first auxiliary roller 32 and the base 2 and the object 3.

As shown in FIG. 32, the CPU 201 detects whether the side 902 of the first plate-shaped portion 905 has been moved farther toward the downstream side than the intersection position 105, based on the number of revolutions of the second motor 222 since the conveyance of the base 2 toward the downstream side was started at Step S25. When the side 902 has been moved farther toward the downstream side than the intersection position 105, the CPU 201 stops the driving of the second motor 222 by controlling the drive portion 212, thus stopping the conveyance of the base 2 (Step S26).

The packaging device 1 may also include a position sensor in the vicinity of the intersection position 105. In that case, the CPU 201 may determine that the side 902 has been moved farther toward the downstream side than the intersection position 105 when the position sensor detects the side 902 of the first plate-shaped portion 90.

The CPU 201 drives the first motor 221 by controlling the drive portion 211, thus causing the support portions 34 to move downward. The movable rollers 30 that are supported by the support portions 34 move from their highest positions to their lowest positions. The guide roller 31 moves downward from its highest position to its lowest position along the movement path 104 (Step S27). The guide roller 31 comes into contact from above with the film 24 that is disposed below, and the guide roller 31 guides the film 24 downward along the movement path 104.

Figure 37:
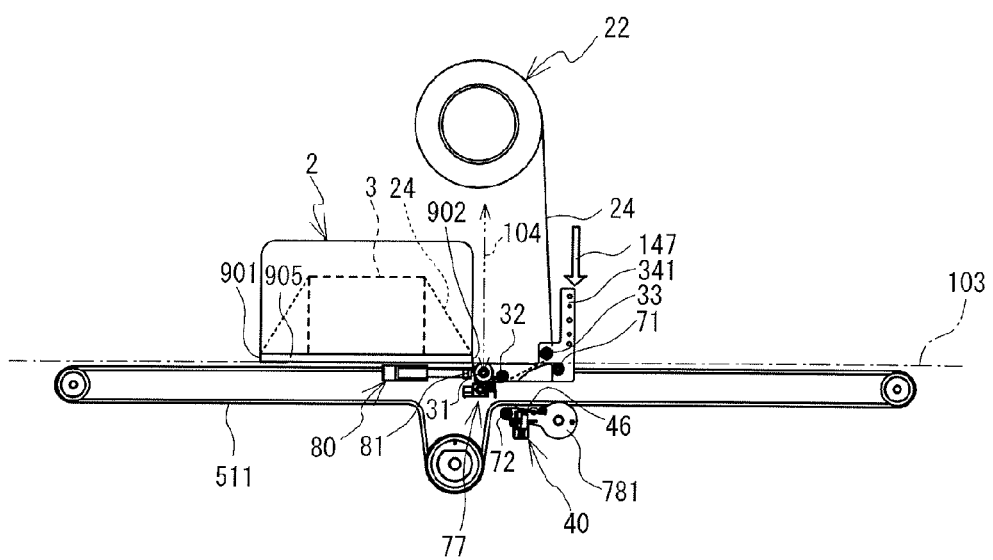
FIG. 37 is a figure that shows a packaging step in the packaging processing.

As shown in FIG. 37, the guide roller 31 moves downward (the arrow 147) along the movement path 104 and reaches its lowest position. The guide roller 31 comes into contact with the conveyance path 103 from below. The film 24 is disposed in a position where the film 24 covers the first plate-shaped portion 905 and the upstream side of the object 3. The film 24 extends toward the guide roller 31 from the portion where the film 24 contacts with the side 902 of the first plate-shaped portion 905, then comes into contact with the downstream side and the lower side of the guide roller 31 and extends toward the upstream side. The film 24 also comes into contact with the lower side of the first auxiliary roller 32 and extends farther toward the upstream side, then comes into contact with the lower side and the upstream side of the second auxiliary roller 33 and reaches the film roll 22. The section of the film 24 that is located between the portion that is in contact with the lower side of the guide roller 31 and the portion that is in contact with the lower edge of the first auxiliary roller 32 extends substantially in the horizontal direction and is disposed below the upper edge of the blade portion 771 that extends upward from the cutting portion 77. When the packaging device 1 has been initialized (refer to Step S11), the cutting portion 77 has been moved to the left side. Therefore, the film 24 does not come into contact with the blade portion 771 at this point in time.

As shown in FIG. 32, the CPU 201 drives the second motor 222 by controlling the drive portion 212, thus causing the belts 51 to rotate in the reverse direction. The conveyance portions 60 move from the downstream side toward the upstream side and convey the base 2 toward the upstream side along the conveyance path 103 (Step S29). The base 2 is conveyed in the reverse direction (the direction from the downstream side toward the upstream side). The first protruding portion 611 of the first conveyance portion 61 and the second protruding portion 621 of the second conveyance portion 62 respectively hold the section of the first plate-shaped portion 905 that is located between the side 901 and the hole 927 that is closer to the side 901 from the downstream side and the upstream side in the conveyance direction. Therefore, the conveyance portions 60 can appropriately convey the base 2 toward the upstream side.

Figure 38:
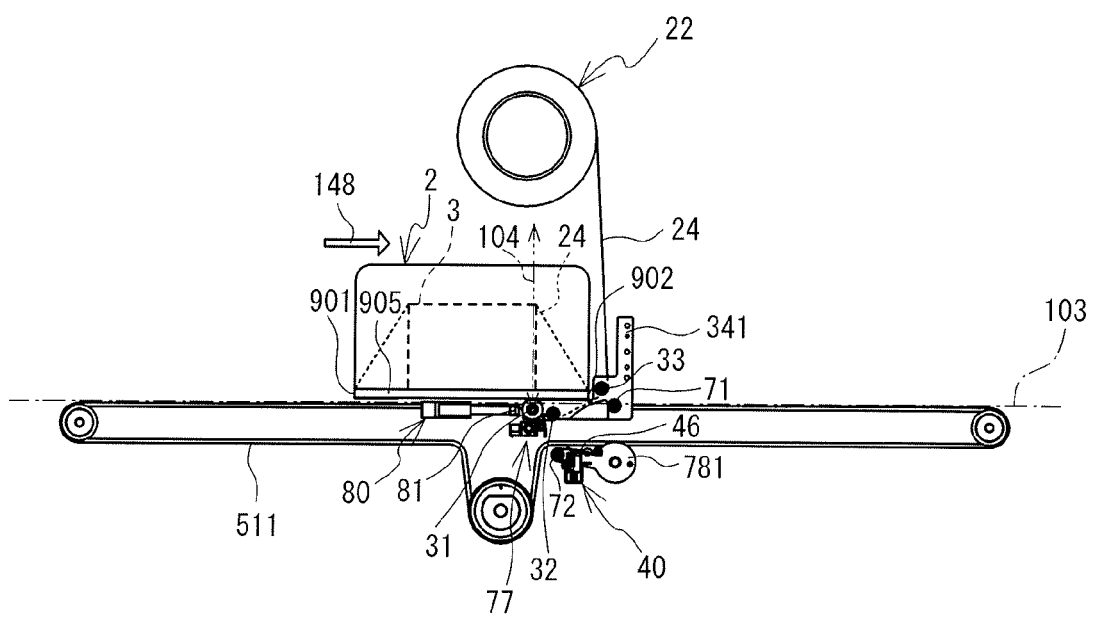
FIG. 38 is a figure that shows a packaging step in the packaging processing.

As shown in FIG. 38, the base 2 moves from the downstream side toward the upstream side (the arrow 148), thus causing the side 902 of the first plate-shaped portion 905 to approach the intersection position 105 from the downstream side. The side 902 traverses the intersection position 105 from the downstream side toward the upstream side. The side 902 passes through the position above the heating portion 40 and moves toward the upstream side. In a state in which the guide roller 31 is in contact with the lower surface of the first plate-shaped portion 905 from below, the guide roller 31 moves from the side 902 toward the downstream side in relation to the first plate-shaped portion 905. The film 24 is sandwiched between the lower surface of the first plate-shaped portion 905 and the guide roller 31.

Figure 39:
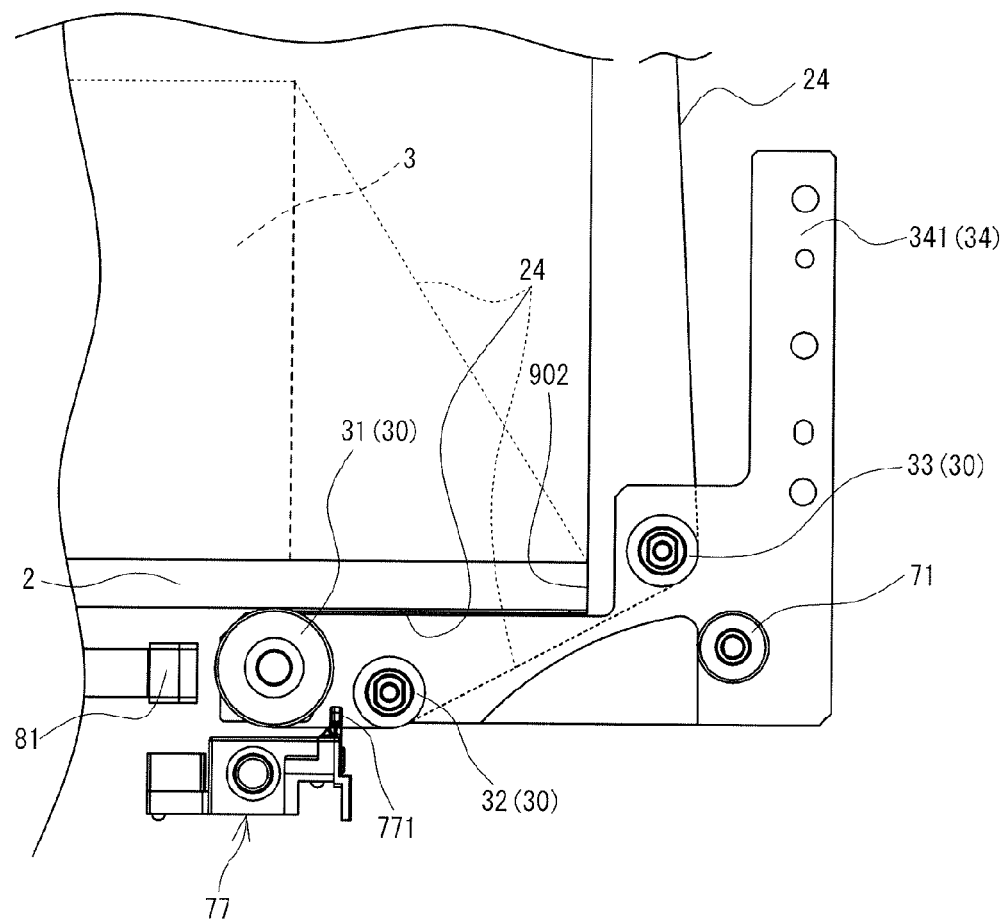
FIG. 39 is a figure that shows a packaging step in the packaging processing.

As shown in FIG. 39, the film 24 extends along the lower surface of the first plate-shaped portion 905 toward the downstream side from the portion where the film 24 contacts with the side 902 of the first plate-shaped portion 905. The film 24 is wound around the guide roller 31 from above, and then extends toward the upstream side from the lower side of the guide roller 31. The film 24 also comes into contact with the lower side of the first auxiliary roller 32 and extends farther toward the upstream side, eventually coming into contact with the lower side and the upstream side of the second auxiliary roller 33 and reaching the film roll 22.

As shown in FIG. 32, based on the number of revolutions of the second motor 222 since the conveyance of the base 2 toward the upstream side was started at Step S29, the CPU 201 detects whether the side 902 of the first plate-shaped portion 905 has been moved toward the upstream side by a predetermined distance in relation to the position above the heating portion 40. The predetermined distance is set to be approximately the same as the distance from the side 902 of the first plate-shaped portion 905 to the second line 982 (refer to FIG. 27). When the side 902 has been moved farther toward the upstream side than the position above the heating portion 40 by the predetermined distance, the CPU 201 stops the driving of the second motor 222 by controlling the drive portion 212, thus stopping the conveyance of the base 2 (Step S30).

The film 24 that extends from the guide roller 31 to the film roll 22 via the first auxiliary roller 32 and the second auxiliary roller 33 is positioned close to and below the side 902 of the first plate-shaped portion 905, by being supported by the first auxiliary roller 32 and the second auxiliary roller 33 on the lower sides of the first auxiliary roller 32 and the second auxiliary roller 33. Therefore, even when the base 2 has been moved toward the upstream side at Step S29 and Step S30, the film 24 does not come into contact with the base 2. The first auxiliary roller 32 and the second auxiliary roller 33 can thus inhibit the film 24 from coming into contact with the base 2 when the base 2 is conveyed from the downstream side toward the upstream side, In this state, the film 24 extends along the lower surface of the first plate-shaped portion 905 from the side 902 toward the downstream side (refer to FIG. 39). At this time, as shown in FIG. 27, the second film 972 is affixed to the section of the lower surface of the first plate-shaped portion 905 that is between the side 902 and the second line 982. Therefore, the section of the film 24 that extends along the lower surface of the first plate-shaped portion 905 from the side 902 toward the downstream side overlaps with the lower side of the second film 972 that is affixed to the lower surface of the first plate-shaped portion 905.

Figure 40:
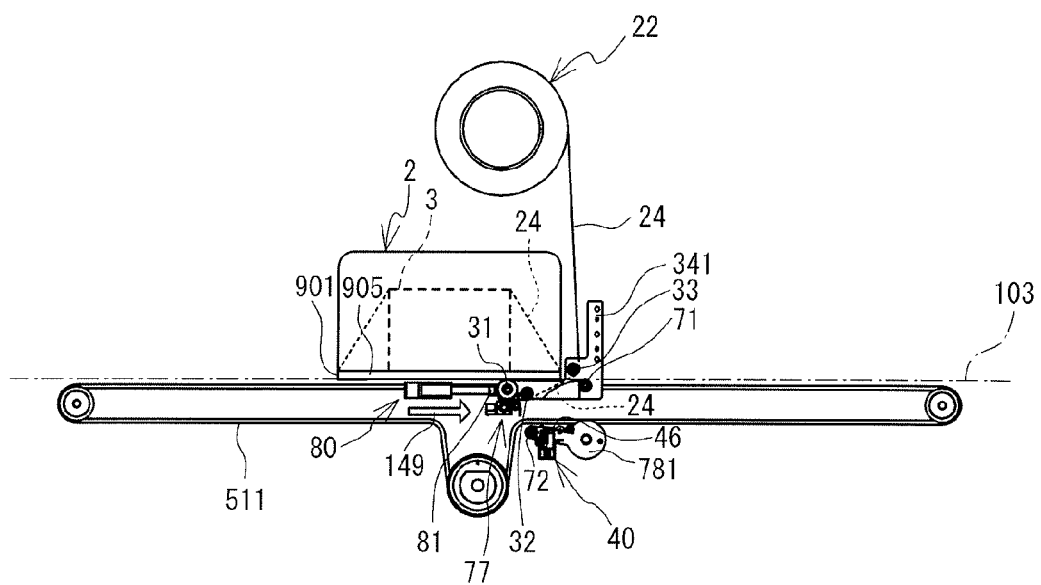
FIG. 40 is a figure that shows a packaging step in the packaging processing.

As shown in FIG. 32, the CPU 201 drives the fourth motor 224 by controlling the drive portion 214, thus causing the stopper 81 of the rotation inhibiting portion 80 to move toward the upstream side (Step S31). As shown in FIG. 40, the guide roller 31, which is located at its lowest position, is positioned on the upstream side of the stopper 81 of the rotation inhibiting portion 80. The movement of the stopper 81 toward the upstream side (the arrow 149) causes the rubber strip 811 (refer to FIG. 11) that is provided on the stopper 81 to come close to the guide roller 31 (refer to FIG. 39), such that the film 24 that has been wound around the guide roller 31 is clamped between the rubber strip 811 and the guide roller 31. The springs 83 (refer to FIG. 11) of the rotation inhibiting portion 80 urge the stopper 81 toward the upstream side, thus causing the rubber strip 811 of the stopper 81 to push the guide roller 31 toward the upstream side through the film 24. The guide roller 31 is thus inhibited from rotating, and the film 24 is clamped between the guide roller 31 and the rubber strip 811 of the stopper 81.

The CPU 201 drives the fifth motor 225 by controlling the drive portion 215, thus moving the cutting portion 77 from the left to the right along the guide rail 74 (refer to FIG. 5) (Step S33). As shown in FIG. 39, the upper edge of the blade portion 771 of the cutting portion 77 is positioned higher than the film 24 that extends substantially horizontally between the lower side of the guide roller 31 and the lower side of the first auxiliary roller 32. Therefore, the movement of the cutting portion 77 to the right causes the film 24 to be cut by the blade portion 771, in the section of the film 24 that extends between the guide roller 31 and the first auxiliary roller 32. The cutting portion 77 cuts the section of the film 24 that covers the first plate-shaped portion 905 of the base 2 and the object 3 away from the section of the film 24 that is wound around the film roll 22.

Because the torque is applied to the film roll 22, tension is exerted on the section of the film 24 that extends substantially horizontally between the guide roller 31 and the first auxiliary roller 32. The first auxiliary roller 32 presses down the film 24 that extends between the guide roller 31 and the second auxiliary roller 33, causing an even stronger tension to be exerted on the film 24. Therefore, when the cutting portion 77 moves to the right, the film 24 does not cling to the blade portion 771, and the blade portion 771 can cut the film 24 appropriately.

When the blade portion 771 cuts the film 24 by moving to the right in a state in which the blade portion 771 is in contact with the film 24, a force is applied that guides the film 24 to the right. However, the rotation of the guide roller 31 is inhibited by the stopper 81. The film 24 is also clamped between the stopper 81 and the guide roller 31. Therefore, the position of the film 24 is fixed with respect to the guide roller 31, and the film 24 is not moved to the right by the cutting portion 771. The film 24 can therefore be cut appropriately by the blade portion 771. After the film 24 is cut, the guide roller 31 and the stopper 81 maintain the state in which the film 24 is clamped between the guide roller 31 and the stopper 81. It is therefore possible to inhibit the film 24 from shifting in relation to the object 3 after the film 24 has been cut by the cutting portion 771.

Figure 41:
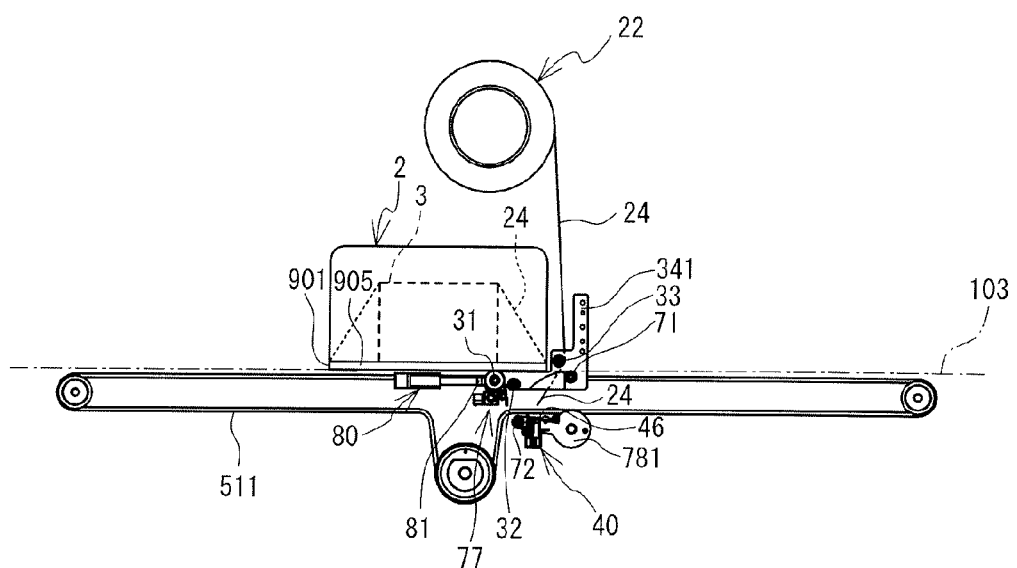
FIG. 41 is a figure that shows a packaging step in the packaging processing.

As shown in FIG. 41, after the film 24 has been cut, the cut end of the film 24 that extends from the film roll 22 hangs down below the base guide roller 71.

Figure 42:
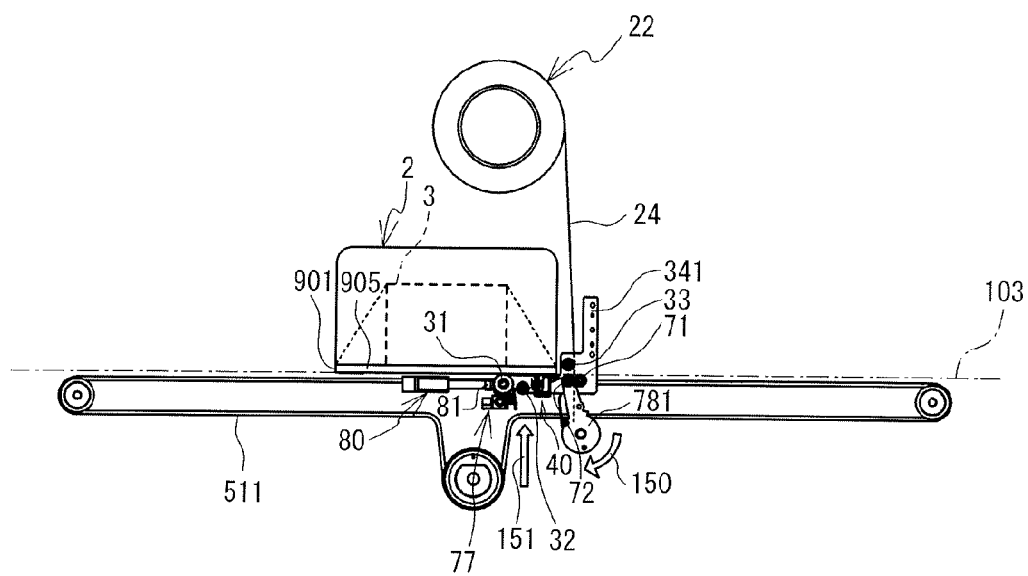
FIG. 42 is a figure that shows a packaging step in the packaging processing.
Figure 43:
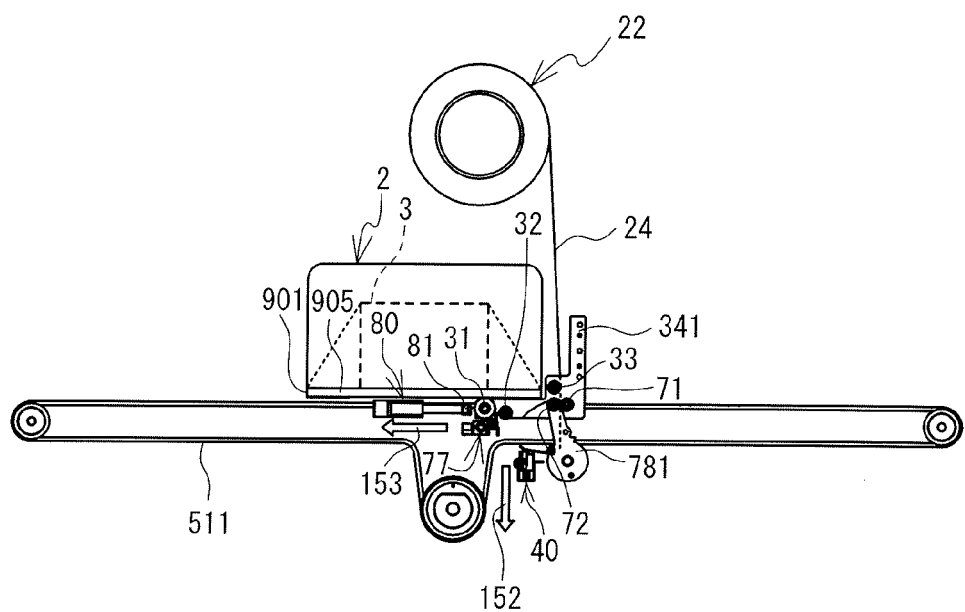
FIG. 43 is a figure that shows a packaging step in the packaging processing.

As shown in FIG. 32, the CPU 201 drives the sixth motor 226 by controlling the drive portion 216, thus causing the holding portions 78 to rotate (Step S35). As shown in FIG. 42, the holding portions 78 rotate in the direction of the arrow 150. The holding roller 72 is moved closer to the downstream side of the base guide roller 71. The end of the film 24 that has been cut by the cutting portion 77 is clamped by the base guide roller 71 and the holding roller 72.

The CPU 201 drives the third motor 223 by controlling the drive portion 213, thus causing the heating portion 40 to move upward (Step S37). After the heating portion 40 has reached its highest position, the CPU 201 stops the driving of the third motor 223 by controlling the drive portion 213, thus stopping the upward movement of the heating portion 40. As shown in FIG. 42, in the state in which the heating portion 40 has been moved upward (the arrow 151) to its highest position, the top surfaces of the heating units 41 (refer to FIG. 8) of the heating portion 40 are close to the conveyance path 103 from below. The film 24 is sandwiched between the support portions 414 and the base 2, and the support portions 414 fix the positions of the heaters 411 in relation to the film 24.

The side 902 of the first plate-shaped portion 905 has been moved farther toward the upstream side than the position above the heating portion 40 by the predetermined distance. The film 24, which has been guided by the guide roller 31, is positioned along the lower surface of the first plate-shaped portion 905, close to the side 902. As shown in FIG. 27, the second film 972 is affixed to the lower surface of the first plate-shaped portion 905 between the side 902 and the second line 982. Therefore, the film 24 that is positioned along the lower surface of the first plate-shaped portion 905 overlaps with the second film 972. Therefore, when the heating portion 40 has been moved upward and is located at its highest position, the film 24 and the second film 972 are sandwiched between the top surfaces of the heating units 41 and the base 2.

As shown in FIG. 32, the CPU 201 causes the heaters 411 of the heating portion 40 to generate heat (Step S39). The heaters 411 heat the film 24, thereby melting the film 24. At the same time, the heat from the heaters 411 passes through the film 24 and heats the second film 972 that is affixed to the base 2, thereby melting the second film 972 as well. The melted film 24 and the melted second film 972 are bonded. The end portion of the film 24 that was cut by the cutting portion 77 is thus bonded, through the second film 972, to the part of the lower surface of the first plate-shaped portion 905 that is close to the side 902 (Step S39). The film 24 that was cut away from the film roll 22 is put into a state in which the film 24 covers the base 2 and the object 3.

The CPU 201 stops the heat generation of the heaters 411 after a predetermined time period has elapsed from when the heat generation of the heaters 411 is started at Step S39 (Step S40). The CPU 201 drives the third motor 223 by controlling the drive portion 213, thus causing the heating portion 40 to move downward (Step S41, the arrow 152 (refer to FIG. 43)). The top surfaces of the heating units 41 move away from the conveyance path 103 (refer to FIG. 43). After the heating portion 40 has reached its lowest position, the CPU 201 stops the rotation of the third motor 223 by controlling the drive portion 213.

The CPU 201 drives the fourth motor 224 by controlling the drive portion 214, thus causing the stopper 81 of the rotation inhibiting portion 80 to move toward the downstream side (Step S43, the arrow 153 (refer to FIG. 43)). The stopper 81 moves toward the downstream side, and the rubber strip 811 that is provided on the stopper 81 separates from the guide roller 31 (refer to FIG. 43). The guide roller 31 is put into a rotatable state.

The CPU 201 drives the second motor 222 by controlling the drive portion 212, thus causing the belts 51 to rotate in the forward direction such that the base 2 is conveyed toward the downstream side (Step S45). The base 2 and the object 3, for which the packaging has been completed, are conveyed toward the downstream side and are placed on the first receiving tray 12. The rotation of the belts 51 in the forward direction moves the conveyance portions 60 toward the downstream side. As shown in FIG. 20, when the first conveyance portion 61 that is affixed to the belt 51 has reached the downstream edge of the first receiving tray 12, the belt 51 winds around the pulley 521 and bends, causing the first direction side of the bottom surface of the first protruding portion 611 to separate from the belt 51. The first protruding portion 611 is put into a state in which the first protruding portion 611 extends obliquely upward toward the downstream side.

The CPU 201 detects whether the first conveyance portion 61 has been moved toward the downstream side and has reached the downstream edge of the first receiving tray 12, based on the number of revolutions of the second motor 222 since the conveyance of the base 2 toward the downstream side was started at Step S45 (refer to FIG. 32). When the first conveyance portion 61 has been moved toward the downstream side and has reached the downstream edge of the first receiving tray 12, the CPU 201 stops the driving of the second motor 222 by controlling the drive portion 212, thus stopping the conveyance of the base 2, as shown in FIG. 32 (Step S46). The first protruding portion 611 is put into a state in which the first protruding portion 611 extends obliquely upward toward the downstream side. Therefore, the first protruding portion 611 moves away from the side 901 of the first plate-shaped portion 905 of the base 2. The distance between the upstream side end of the first extending portion 612 and the second protruding portion 621 of the second conveyance portion 62 also increases. Therefore, the user can easily remove the base 2 from the conveyance portion 60. The packaging processing is terminated.

At Step S35, the holding portions 78 are rotated, thus causing the end of the film 24 that has been cut by the cutting portion 77 to be clamped by the base guide roller 71 and the holding roller 72. Therefore, the user can continue to use the film 24 to package the next base 2 and the next object 3, without performing the operation of pulling the film 24 out from the film cassette 21 and clamping the leading edge of the film 24 between the base guide roller 71 and the holding roller 72. In a case where the user continues to perform the packaging operation, the CPU 201, after terminating the packaging processing, drives the second motor 222 by controlling the drive portion 212, thus causing the belts 51 to rotate in the reverse direction. The CPU 201 causes the conveyance portions 60 to move from the downstream side toward the upstream side and positions the conveyance portions 60 on the second receiving tray 13. At the same time, the CPU 201 resets the support portions 34 and the cutting portion 77 to the state immediately after the initialization (Step S11).

Figure 44:
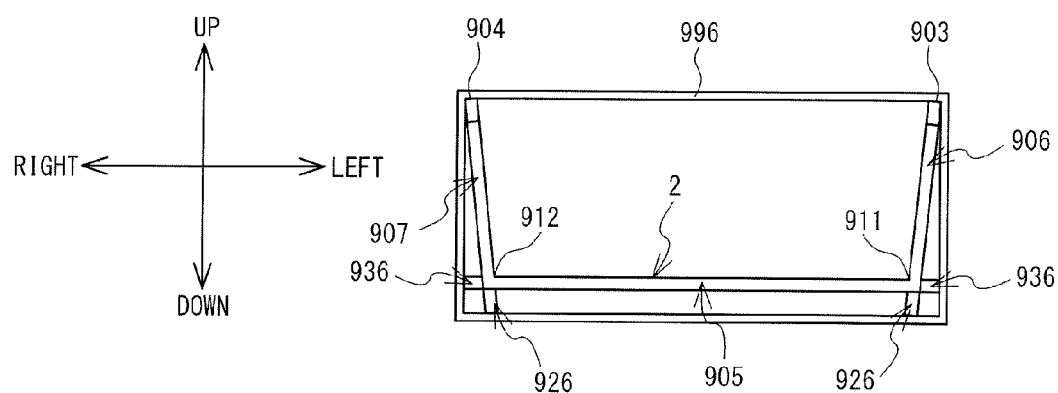
FIG. 44 is a front view of the base in a state in which it has been placed in a packing box.

FIG. 44 shows a state in which the base 2 that has been packaged by the packaging device 1 is contained in a packaging box 996. Note that the object 3 is omitted in FIG. 44. The upper side, the lower side, the left side, and the right side in FIG. 44 respectively indicate the upper side, the lower side, the right side, and the left side of the packaging box 996 and the base 2. The sides 903 and 904 of the base 2 each come into contact with a position where a side wall and an upper wall of the packaging box 996 intersect. The second plate-shaped portions 906 and 907 are slightly inclined such that their lower edges are shifted toward the inside in the left-right direction. The left end and the right end of the side surface protruding portions 936 contact with the left and right side walls of the packaging box 996. The lower ends of the bottom surface protruding portions 926 contact with the bottom wall of the packaging box 996.

The first plate-shaped portion 905 is supported by the bottom surface protruding portions 926, which protrude downward from the left and right edges of the first plate-shaped portion 905. The first plate-shaped portion 905 is above and not in contact with the bottom wall of the packaging box 996. Further, the side surface protruding portion 936 that protrudes to the right is disposed between the right side wall of the packaging box 996 and the second plate-shaped portion 907, and the side surface protruding portion 936 that protrudes to the left is disposed between the left side wall of the packaging box 996 and the second plate-shaped portion 906. A space is thus provided between the packaging box 996 and the second plate-shaped portions 906 and 907. The object 3 is packaged by the film 24 in a state in which the object 3 is placed on the first plate-shaped portion 905 of the base 2. The first plate-shaped portion 905 is stably fixed inside the packaging box 996 such that the first plate-shaped portion 905 is separated from the packaging box 996. Therefore, an impact on the packaging box 996 from the outside is less likely to be transmitted to the object 3 that is affixed on the first plate-shaped portion 905. The object 3 is thus protected.

As explained above, in the packaging device 1, the conveyance portions 60 (the first conveyance portion 61 and the second conveyance portion 62) of the conveyance mechanism 50 convey the base 2. Specifically, when the base 2 is conveyed from the upstream side toward the downstream side, the second protruding portion 621 of the second conveyance portion 62 pushes the base 2 toward the downstream side. Therefore, the base 2 can be conveyed in a stable manner, even in a case where, while the base 2 is being conveyed, a load is imposed on the base 2 in the opposite direction from the conveyance direction. Further, the first extending portion 612 of the first conveyance portion 61 and the second extending portion 622 of the second conveyance portion 62 restrict the upward movement of the base 2. Therefore, the base 2 on which the object 3 has been placed can be conveyed more stably, even in a case where an upward load is imposed on the side 901 of the first plate-shaped portion 905. In particular, in the packaging device 1, the base 2 moves toward the downstream side in a state in which the portion of the film 24 that is close to the leading edge has been affixed to the lower surface of the base 2 on the downstream side, so the film 24 tends to impose a strong upward load on the downstream side of the base 2. The packaging device 1 counters this by using the first extending portion 612 and the second extending portion 622 to appropriately restrict the upward movement of the downstream side of the base 2. Therefore, the packaging device 1 is able to convey the base 2 in a stable manner and perform the packaging of the object 3 appropriately.

When the user sets the base 2 into the conveyance portion 60, the user moves the base 2 obliquely downward from above, from the upstream side toward the downstream side, in relation to the first conveyance portion 61. In this case, as the belt 51 deforms elastically, the direction in which the first protruding portion 611 of the first conveyance portion 61 protrudes can be changed, and the length S between the edge of the first extending portion 612 on the side toward the belt 51 and the plane that is parallel to the receiving surface (the conveyance path 103) can be increased. It is therefore possible for the user to smoothly put the side 901 of the first plate-shaped portion 905 of the base 2 into the space between the first extending portion 612 and the belt 51, and to set the base 2 into the conveyance portion 60 easily.

Furthermore, because the packaging device 1 includes the sensor 204, the packaging device 1 can operate the second motor 222 to cause the belt 51 to rotate such that the conveyance portion 60 is positioned above the second receiving tray 13. Therefore, the packaging device 1 can automatically adjust the state of the conveyance portion 60 to make it easier for the user to set the base 2. The user can be spared the time and effort of positioning the conveyance portion 60 above the second receiving tray 13 by moving the conveyance portion 60 manually.

Various types of modifications can be made to the embodiment that is described above. A plate-shaped member on which the base 2 may be placed may be provided between the belts 511 and 512. The plate-shaped member may also be provided in the form of a plurality of plate-shaped members in the conveyance direction. The rotating shaft of the second motor 222 may also be connected directly to pulleys 524 and 534. The belts 51 may also be configured in the form of only one of the belt 511 and the belt 512. The belts 51 may also be provided independently of one or both of the first receiving tray 12 and the second receiving tray 13. In that case, the belts 51 may be driven independently by two second drive motors 222.

The configuration of the conveyance portion 60 may also be changed. The first protruding portion 611 of the first conveyance portion 61 and the second protruding portion 621 of the second conveyance portion 62 may each be affixed to the belt 51 by something other than the claw portions 613 and 623, respectively. For example, the first protruding portion 611 and the second protruding portion 621 may also be formed as integral parts of the belt 51. The corner portion where the end face on the side of the first extending portion 612 that is close to the belt 51 intersects the end face on the second direction side may also be curved.

The second conveyance portion 62 may also be configured to be movable in relation to the first conveyance portion 61. Specifically, the second protruding portion 621 of the second conveyance portion 62 may be configured to be switched between a state in which the second protruding portion 621 is separated from the first protruding portion 611 of the first conveyance portion 61 by a distance in the second direction that is shorter than the first distance P and a state in which the second protruding portion 621 is separated from the first protruding portion 611 by a distance in the second direction that is longer than the first distance P.

First Modified Example

Figure 45:
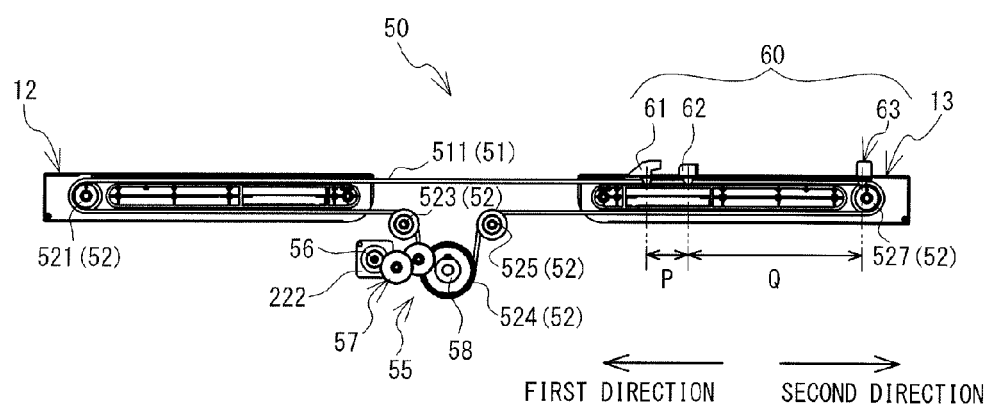
FIG. 45 is a right side view of the conveyance mechanism in a first modified example.
Figure 46:
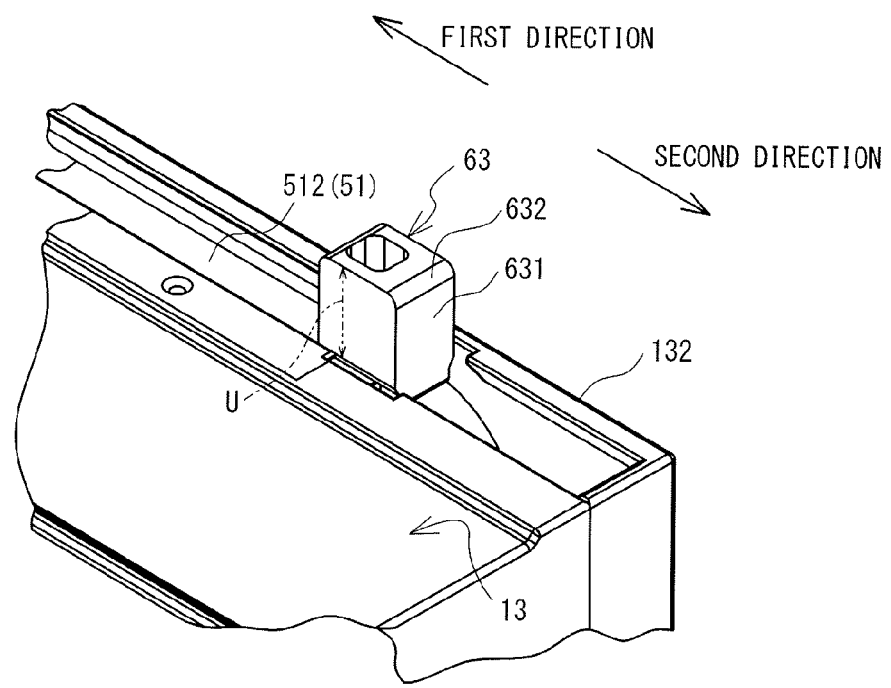
FIG. 46 is an enlarged oblique view of a third conveyance portion in the first modified example.

The conveyance portion 60 may further include a third conveyance portion 63 in addition to the first conveyance portion 61 and the second conveyance portion 62. Hereinafter, a first modified example of the control portion 60 will be explained with reference to FIG. 45 to FIG. 47. As shown in FIG. 46, the third conveyance portion 63 includes a third protruding portion 631 and a claw portion (not shown in the drawings). The third protruding portion 631 protrudes vertically and outwardly with respect to the outer side surface of the belt 51. As shown in FIG. 45, the third protruding portion 631 is provided in a position that is separated from the second protruding portion 621 of the second conveyance portion 62 by a specified second distance Q in the second direction, on the opposite side of the second conveyance portion 62 from the side on which the first conveyance portion 61 is provided. The second distance Q is substantially the same as the distance between the side 902 of the base 2 and the bottom surface portions 92 that are closer to the side 901 of the base 2. As shown in FIG. 46, a length U between the edge of the third protruding portion 631 that is on the opposite side from the side on which the third protruding portion 631 is connected to the belt 51 and the plane (the conveyance path 103) that is parallel to the receiving surface is greater than the length S (refer to FIG. 19).

A corner portion 632 of the third protruding portion 631, where the end face on the opposite side of the third protruding portion 631 from the side on which the third protruding portion 631 is connected to the belt 51 intersects the side surface on the second direction side, curves in an arc shape. A bottomed hole is provided in the end face of the third protruding portion 631 that is on the opposite side from the side on which the third protruding portion 631 is connected to the belt 51. A through hole is provided in the bottom surface of the bottomed hole. The claw portion (not shown in the drawings; described later) is fixed in place by a screw that passes through the through hole. The claw portion (not shown in the drawings) is provided on the bottom surface of the third protruding portion 631. The claw portion includes two first claw portions and two second claw portions. The claw portion secures the third conveyance portion 63 to the belt 51.

Figure 47:
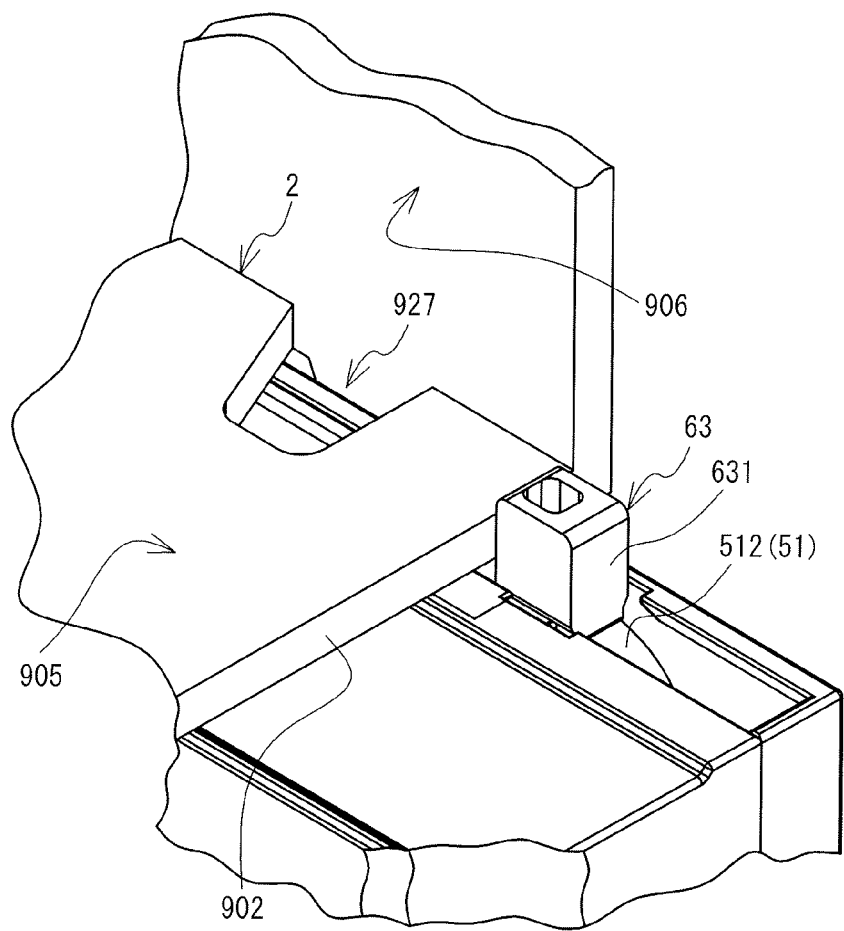
FIG. 47 is an enlarged oblique view of the third conveyance portion in the first modified example in a state in which the base has been placed on the second receiving tray.

The distance between the first protruding portion 611 of the first conveyance portion 61 and the third protruding portion 631 of the third conveyance portion 63, that is, the distance that is the sum of the first distance P and the second distance Q, is slightly shorter than the length of the second receiving tray 13 in the conveyance direction. Note that the distance that is the sum of the first distance P and the second distance Q is substantially the same as the length of the shorter side direction of the base 2, that is, the distance between the side 901 and the side 902 of the first plate-shaped portion 905. Therefore, when the base 2 is placed on the second receiving tray 13, the third protruding portion 631 of the third conveyance portion 63 is in contact with the side 902 of the first plate-shaped portion 905 from the upstream side, as shown in FIG. 47. As a result, the base 2 is held between the second protruding portion 621 of the second conveyance portion 62 and the third protruding portion 631 of the third conveyance portion 63, that is, from both the downstream side and the upstream side in the conveyance direction. The third conveyance portion 63 is provided on the belts 51 that are positioned on both the left and right side surfaces of the second receiving tray 13, so the base 2 can be held between the second protruding portion 621 of the second conveyance portion 62 and the third protruding portion 631 of the third conveyance portion 63, on both the left and right sides.

A case will be explained as an example in which the CPU 201 controls the drive portion 212 to drive the second motor 222 such that the belts 51 rotate in the direction that conveys the base 2 from the upstream side toward the downstream side. The conveyance portions 60 convey the base 2 along the conveyance path 103 from the upstream side toward the downstream side (Step S13; refer to FIG. 32). The second protruding portion 621 of the second conveyance portion 62 and the third protruding portion 631 of the third conveyance portion 63 hold the portion of the first plate-shaped portion 905 that is between the side 902 and the hole 927 that is closer to the side 901, from the downstream side and the upstream side in the conveyance direction, respectively. The third protruding portion 631 of the third conveyance portion 63 pushes the base 2 toward the downstream side. The conveyance portions 60 can therefore convey the base 2 appropriately.

A fourth conveyance portion may also be provided on the second direction side of the second conveyance portion 62. In a case where the third conveyance portion 63 is provided, the fourth conveyance portion may be provided between the second conveyance portion 62 and the third conveyance portion 63. The fourth conveyance portion may also include a protruding portion and a claw portion. The protruding portion may protrude vertically and outwardly with respect to the outer side surface of the belt 51. The protruding portion may be provided in a position where the protruding portion is separated from the first protruding portion 611 of the first conveyance portion 61 by a distance R in the second direction. Note that the distance R may be substantially the same as the distance between the hole 927 that is closer to the side 901 of the first plate-shaped portion 905 and the hole 927 that is closer to the side 902 of the first plate-shaped portion 905. A corner portion of the protruding portion, where the end face on the opposite side of the protruding portion from the side on which the protruding portion is connected to the belt 51 intersects the side surface on the first direction side, may be curved in an arc shape. The configuration that is described above makes it possible for the protruding portion of the fourth conveyance portion to be fitted into the hole 927 that is closer to the side 902 of the first plate-shaped portion 905. The fourth conveyance portion can convey the base 2 toward one of the upstream side and the downstream side by pushing the base 2 toward the corresponding one of the upstream side and the downstream side.

It is not always necessary for the belt 51 to be elastically deformable. Instead, the first extending portion 612 of the first conveyance portion 61 may be configured to be rotatable around the edge on the first direction side of the first conveyance portion 61. In that case, the first extending portion 612 may also include a mechanism that inhibits the first extending portion 612 from rotating when the first extending portion 612 extends parallel to the belt 51.

The corner portion 624 of the second protruding portion 621 may also be angulated. It is also acceptable for the packaging device 1 not to include the sensor 204. The user may also be allowed to position the conveyance portions 60 higher than the second receiving tray 13 by rotating the belts 51 manually.

Second Modified Example

Figure 48:
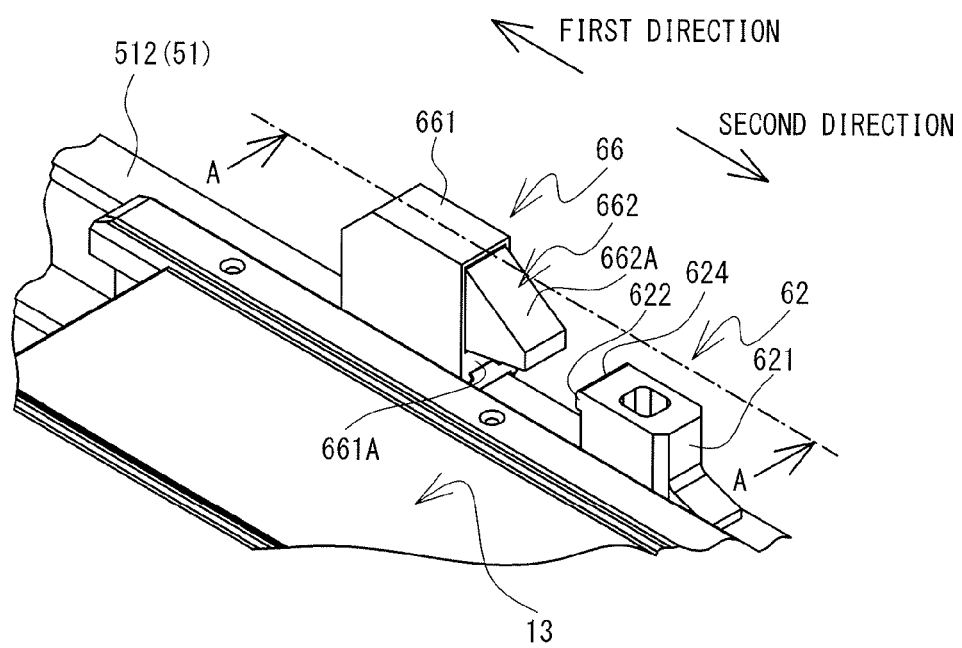
FIG. 48 is an enlarged oblique view of the first conveyance portion in a second modified example.

A second modified example of the conveyance portion 60 will be explained with reference to FIG. 48 to FIG. 51. The conveyance portion 60 in the second modified example includes a first conveyance portion 66 instead of the first conveyance portion 61 in the embodiment that is described above. The second conveyance portion 62 is the same as in the embodiment that is described above. As shown in FIG. 48, the first conveyance portion 66 and the second conveyance portion 62 are set apart from one another in the conveyance direction. The second conveyance portion 62 is located on the second direction side of the first conveyance portion 66. The first conveyance portion 66 includes a first protruding portion 661, a first extending portion 662, and a claw portion 663 (refer to FIG. 49 and FIG. 50). The first protruding portion 661 protrudes outward from the outer side surface of the belt 51. The three-dimensional shape of the first protruding portion 661 is substantially rectangular. A surface 661A on the second direction side of the first protruding portion 661 (the side that is closer to the second conveyance portion 62) extends perpendicularly (hereinafter simply called vertically) in relation to the outer side surface of the belt 51. The first extending portion 662 extends in the second direction from the surface 661A of the first protruding portion 661. The surface of the first extending portion 662 that faces the belt 51 is separated from the belt 51 and extends parallel to the conveyance direction. A surface 662A on the opposite side of the first extending portion 662 from the side that faces the belt 51 is inclined in relation to the conveyance direction. Specifically, the surface 662A is inclined such that the surface 662A comes closer to the belt 51 as the surface 662A extends in the second direction. The thickness in the vertical direction of the first extending portion 662 diminishes toward the second direction side. The claw portion 663 is provided on the bottom surface of the first protruding portion 661. The shape of the claw portion 663 is the same as the shape of the claw portion 613 of the first conveyance portion 61. The claw portion 663 secures the first conveyance portion 66 to the belt 51.

Figure 49:
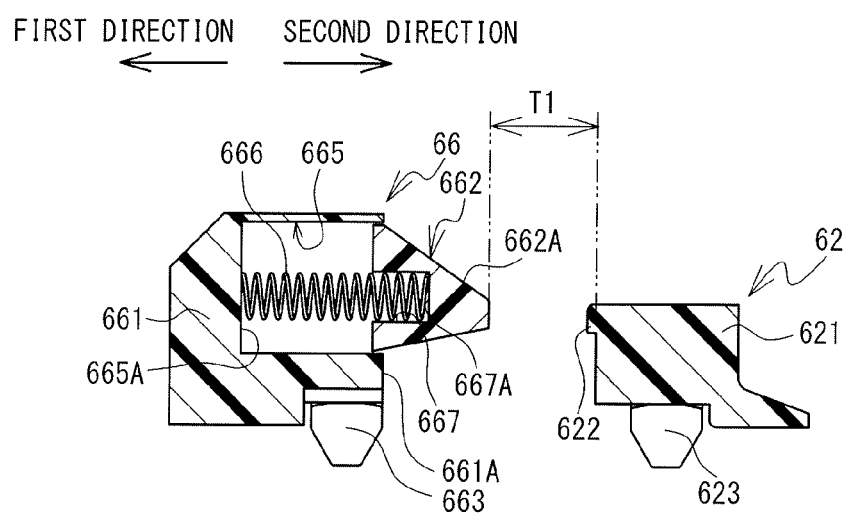
FIG. 49 is a section view as seen from the direction that is indicated by arrows A-A in FIG. 48.

As shown in FIG. 49, the first protruding portion 661 has a hole 665 that forms an opening in the surface 661A. The cross-sectional shape of the hole 665 is a square. The hole 665 extends in the first direction from the surface 661A. The length (depth) of the hole 665 in the conveyance direction is longer than the length of the first extending portion 662 in the conveyance direction. At least a portion on the first direction side of the first extending portion 662 is located within the hole 665. The cross-sectional shape of the hole 665 is the same as the shape of the surface on the first direction side of the first extending portion 662. The first extending portion 662 is configured to be movable along the hole 665 in the extending direction.

A hole 667 is provided in the surface on the first direction side of the first extending portion 662. The cross-sectional shape of the hole 667 is a circle. The hole 667 extends in the second direction from the surface on the first direction side of the first extending portion 662. A spring 666 is interposed between the surface on the first direction side of the hole 665 (hereinafter called the bottom surface 665A) and the surface on the second direction side of the hole 667 (hereinafter called a bottom surface 667A). The spring 666 is a compression coil spring. By pushing the bottom surface 667A in the second direction, the spring 666 urges the first extending portion 662 in the second direction with respect to the first protruding portion 661. The urging force of the spring 666 causes the first extending portion 662 to protrude from the first protruding portion 661 in the second direction.

Figure 50:
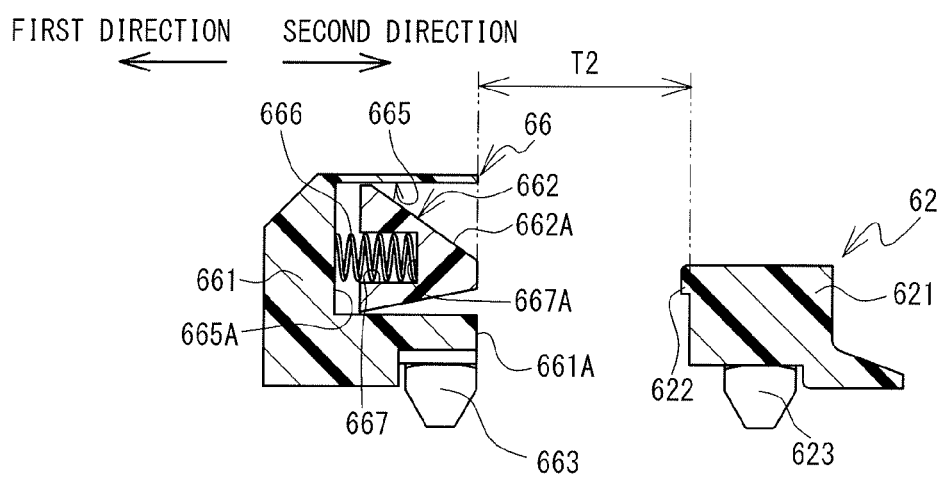
FIG. 50 is a section view as seen from the direction that is indicated by arrows A-A in FIG. 48.

When a force is applied to the first extending portion 662 in the first direction, the spring 666 is compressed, and the first extending portion 662 moves into the hole 665. In a state in which the spring 666 is compressed to the maximum extent, as shown in FIG. 50, the first extending portion 662 is located within the hole 665. The edge on the second direction side of the first extending portion 662 is in approximately the same position as the surface 661A of the first protruding portion 661. In this state, the first extending portion 662 does not protrude in the second direction from the first protruding portion 661. In a state in which the spring 666 is compressed (refer to FIG. 50), a distance T2 between the edge on the second direction side of the first extending portion 662 and the edge on the first direction side of the second protruding portion 621 is greater than a distance T1 between the edge on the second direction side of the first extending portion 662 and the edge on the first direction side of the second protruding portion 621 in a state in which the spring 666 is extended (refer to FIG. 49).

In order to place the base 2 on the second receiving tray 13, the user may move the base 2 vertically downward from above the second receiving tray 13. At this time, the first extending portion 662 of the first conveyance portion 66 is in a state in which the first extending portion 662 extends in the second direction from the first protruding portion 661 (refer to FIG. 49). The side 901 of the first plate-shaped portion 905 comes into contact with the surface 662A of the first extending portion 662 from above. Because the surface 662A is inclined, the first extending portion 662, in conjunction with the downward movement of the base 2, moves toward the first direction side, against the urging force of the spring 666. The first extending portion 662 moves into the hole 665 of the first protruding portion 661. When the spring 666 is compressed to the maximum extent and the first extending portion 662 is put into the state in which the first extending portion 662 does not protrude from the first protruding portion 661 (refer to FIG. 50), the distance between the edge on the second direction side of the first extending portion 662 and the edge on the first direction side of the second protruding portion 621 (hereinafter simply called the distance between the first extending portion 662 and the second protruding portion 621) reaches its maximum value of T2. The base 2 can be moved to the position where the base 2 comes into contact with the second receiving tray 13. When the base 2 comes into contact with the second receiving tray 13, the base 2 moves away from the surface 662A of the first extending portion 662. The urging force of the spring 666 moves the first extending portion 662 in the second direction and returns the first extending portion 662 to its original state (refer to FIG. 49).

Figure 51:
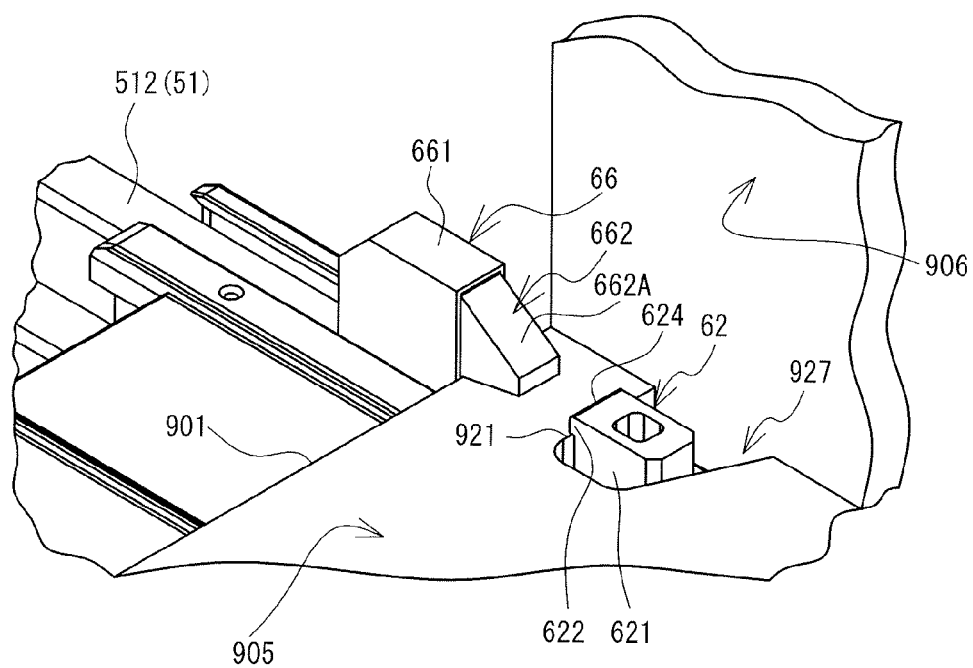
FIG. 51 is an enlarged oblique view of the first conveyance portion in the second modified example in a state in which the base has been placed on the second receiving tray.

In a state in which the base 2 has been placed on the second receiving tray 13, the first extending portion 662 covers the side 901 of the first plate-shaped portion 905 from above, as shown in FIG. 51. The side 901 is fitted into the space between the first extending portion 662 and the belt 51. The first conveyance portions 66 are provided on the belts 51 that are disposed on both the left and right sides of the second receiving tray 13. Therefore, the side 901 of the first plate-shaped portion 905 is held between the first extending portions 662 and the belts 51 on both the left and right sides.

When the CPU 201 drives the second motor 222 by controlling the drive portion 212, and the belts 51 are rotated such that the base 2 is conveyed from the upstream side toward the downstream side, the second protruding portion 621 of the second conveyance portion 62 pushes the base 2 toward the downstream side. The base 2 can be conveyed toward the downstream side. The first extending portion 662 of the first conveyance portion 66, by covering the side 901 of the first plate-shaped portion 905 from above, restrict the upward movement of the base 2. Therefore, the base 2 is conveyed in a stable manner. The surface of the first extending portion 662 that faces the belt 51 extends parallel to the conveyance direction, so the first extending portion 662 does not move in the first direction, even in a case where an upward load is imposed on the side 901 of the first plate-shaped portion 905.

As explained above, in the second modified example, the first extending portion 662 is provided such that the first extending portion 662 can move in its extending direction in relation to the first protruding portion 661. Along with the movement of the first extending portion 662, the distance between the first extending portion 662 and the second protruding portion 621 varies between T1 (refer to FIG. 49) and T2 (refer to FIG. 50). Therefore, by moving the first extending portion 662 in the first direction and increasing the distance between the first extending portion 662 and the second protruding portion 621, the packaging device 1 can create a state in which the base 2 can be fitted into the first conveyance portion 66 easily. The packaging device 1 can reduce the load that is imposed on the base 2 when the base 2 is fitted into the first conveyance portion 66. Therefore, the packaging device 1 can perform the packaging processing, using the base 2 that is not very strong. Furthermore, by moving the first extending portion 662 in the second direction and decreasing the distance between the first extending portion 662 and the second protruding portion 621, the packaging device 1 can create a state in which it is difficult for the base 2 to come loose from the first conveyance portion 66 while the base 2 is being conveyed.

In the packaging device 1, the conveyance portion 66 is configured such that the first extending portion 662 can move in the extending direction in relation to the first protruding portion 661, due to the stretch or compression of the spring 666. When a force is applied to the first extending portion 662 in the first direction, the first extending portion 662 moves in the first direction. The distance between the first extending portion 662 and the second protruding portion 621 thus becomes greater. In contrast, when a force is not applied to the first extending portion 662, the first extending portion 662 is moved in the second direction by the urging force of the spring 666. The distance between the first extending portion 662 and the second protruding portion 621 thus becomes shorter. The packaging device 1 can easily adjust the distance between the first extending portion 662 and the second protruding portion 621 in this manner. It is therefore possible for the user to fit the base 2 into the first conveyance portion 66 even more easily.

As the surface 662A of the first extending portion 662 is inclined, when the base 2 is pressed from above, the first extending portion 662 moves in the first direction. The distance between the first extending portion 662 and the second protruding portion 621 thus becomes greater. Thus, during the process in which the base 2 is placed on the second receiving tray 13, the packaging device 1 can easily increase the distance between the first extending portion 662 and the second protruding portion 621. The user is therefore able to fit the base 2 into the first conveyance portion 66 easily.

Third Modified Example

Figure 52:
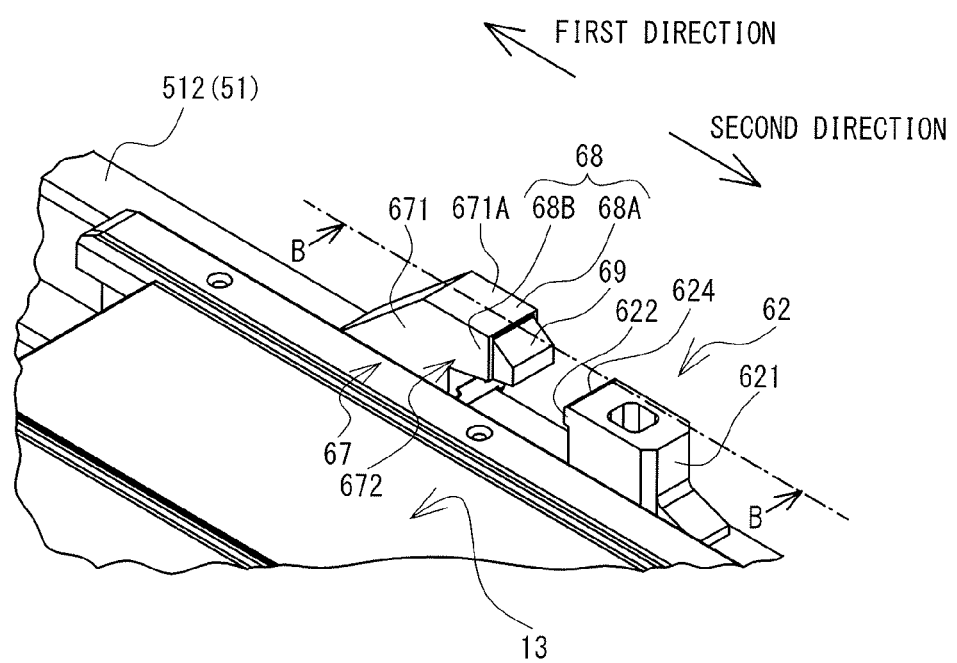
FIG. 52 is an enlarged oblique view of the first conveyance portion in a third modified example.

A third modified example of the conveyance portion 60 will be explained with reference to FIG. 52 to FIG. 55. The conveyance portion 60 in the third modified example includes a first conveyance portion 67, instead of the first conveyance portion 61 of the embodiment that is described above and the first conveyance portion 66 of the second modified example. The second conveyance portion 62 is the same as in the embodiment that is described above. As shown in FIG. 52, the first conveyance portion 67 and the second conveyance portion 62 are set apart from one another in the conveyance direction. The second conveyance portion 62 is located on the second direction side of the first conveyance portion 67. The first conveyance portion 67 includes a first protruding portion 671, a first extending portion 672, and a claw portion 673 (refer to FIG. 53 and FIG. 54). The first extending portion 672 includes a fixed portion 68 and a moving portion 69. The first protruding portion 671 and the fixed portion 68 respectively have substantially the same shapes as the first protruding portion 611 and the first extending portion 612 of the first conveyance portion 61. The moving portion 69 extends in the second direction from the edge on the second direction side of the fixed portion 68 (the side that is closer to the second conveyance portion 62). The claw portion 673 is provided on the part of the first protruding portion 661 that contacts with the belt 51. The shape of the claw portion 673 is the same as the shape of the claw portion 613 of the first conveyance portion 61. The claw portion 673 secures the first conveyance portion 67 to the belt 51.

Figure 53:
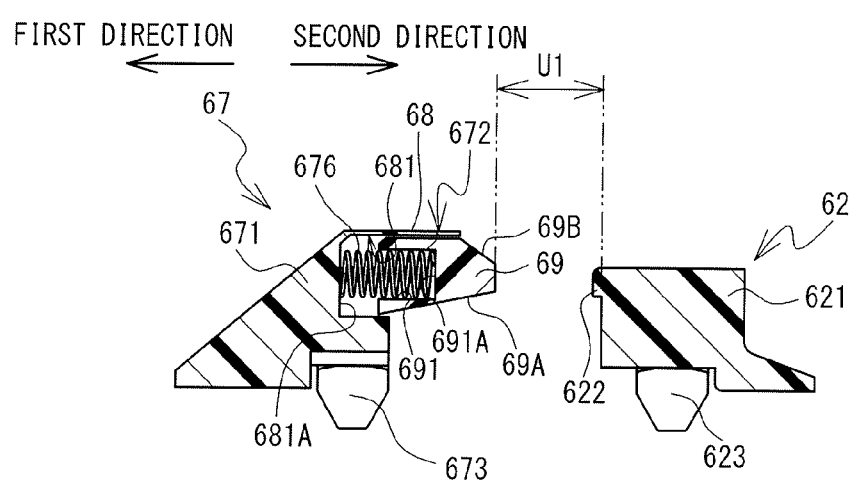
FIG. 53 is a section view as seen from the direction that is indicated by arrows B-B in FIG. 52.
Figure 54:
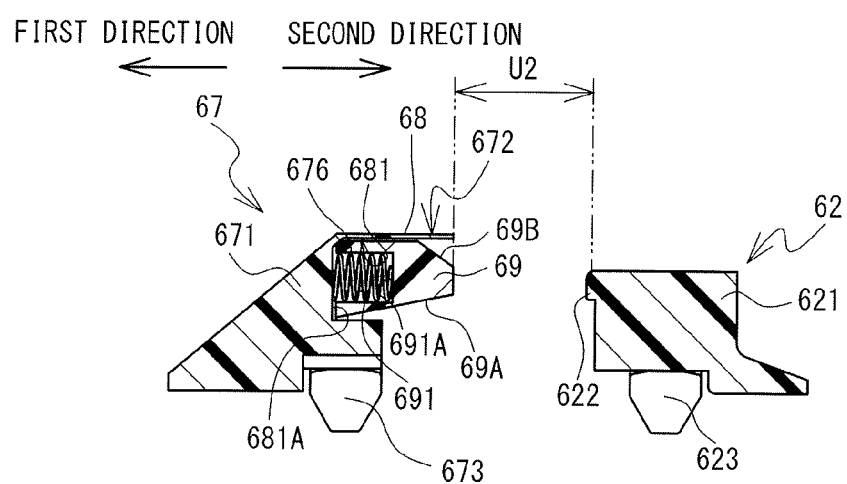
FIG. 54 is a section view as seen from the direction that is indicated by arrows B-B in FIG. 52.

The fixed portion 68 and the moving portion 69 will be explained in detail. The fixed portion 68 is provided with a top plate portion 68A and a pair of side plate portions 68B. The top plate portion 68A extends in the second direction, parallel to the conveyance direction, from a surface 671A on the opposite side of the first protruding portion 671 from the side that faces the belt 51. The pair of the side plate portions 68B extend in the second direction from a left side surface and a right side surface, respectively, of the first protruding portion 671. A space that is bounded by the top plate portion 68A and the pair of the side plate portions 68B is formed within the fixed portion 68. As shown in FIG. 53 and FIG. 54, the first protruding portion 671 has a hole 681 that connects to through the space that is bounded by the top plate portion 68A and the pair of the side plate portions 68B. The cross-sectional shape of the hole 681 is a square. The hole 681 extends in the first direction from the surface on the fixed portion 68 side. Hereinafter, the space that includes the interior of the hole 681 and the space that is bounded by the top plate portion 68A and the pair of the side plate portions 68B will be called a movement space.

The three-dimensional shape of the moving portion 69 is substantially rectangular, which is longer in the conveyance direction. At least a portion on the first direction side of the moving portion 69 is located within the hole 681. The cross-sectional shape of the hole 681 is the same as the shape of the surface on the first direction side of the moving portion 69. Within a portion on the second direction side of the moving portion 69, a surface 69A that faces the belt 51 and a surface 69B on the opposite side from the surface 69A are each inclined with respect to the conveyance direction. Specifically, the surface 69A is inclined such that the surface 69A moves away from the belt 51 as the surface 69A extends in the second direction. The surface 69B is inclined such that the surface 69B comes closer to the belt 51 as the surface 69B extends in the second direction. The thickness in the vertical direction of the moving portion 69 diminishes toward the second direction side. The moving portion 69 is configured to be movable in its extending direction along the top plate portion 68A and the pair of the side plate portions 68B of the fixed portion 68, as well as along the hole 681.

A hole 691 is provided in the surface on the first direction side of the moving portion 69. The cross-sectional shape of the hole 691 is a circle. The hole 691 extends in the second direction from the surface on the first direction side of the moving portion 69. A spring 676 is interposed between the surface on the first direction side of the hole 681 (hereinafter called a bottom surface 681A) and the surface on the second direction side of the hole 691 (hereinafter called a bottom surface 691A). The spring 676 is a compression coil spring. By pushing the bottom surface 691A in the second direction, the spring 676 urges the moving portion 69 in the second direction with respect to the first protruding portion 671 and the fixed portion 68. The urging force of the spring 676 causes the moving portion 69 to protrude from the fixed portion 68 in the second direction, as shown in FIG. 53.

When a force is applied to the moving portion 69 in the first direction, the spring 676 is compressed, and the moving portion 69 moves into the movement space. In a state in which the spring 676 is compressed to the maximum extent, as shown in FIG. 54, the moving portion 69 is located within the movement space. The edge on the second direction side of the moving portion 69 is in approximately the same position as the edge on the second direction side of the fixed portion 68. In this state, the moving portion 69 does not protrude in the second direction from the fixed portion 68. In a state in which the spring 676 is compressed (refer to FIG. 54), a distance U2 between the edge on the second direction side of the moving portion 69 and the edge on the first direction side of the second protruding portion 621 is greater than a distance U1 between the edge on the second direction side of the moving portion 69 and the edge on the first direction side of the second protruding portion 621 in a state in which the spring 676 is extended (refer to FIG. 53).

Figure 55:
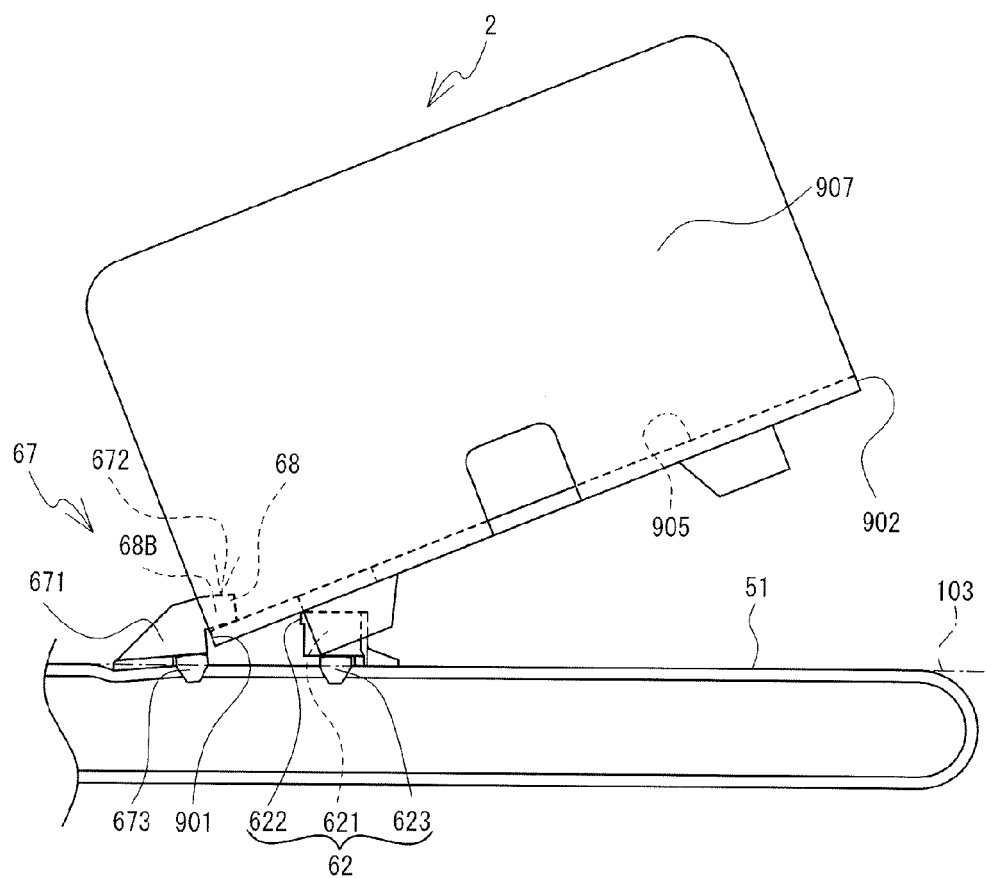
FIG. 55 is a side view showing the state of the first conveyance portion when the base is set on the second receiving tray.

A case will be explained with reference to FIG. 55 in which the user places the base 2 on the second receiving tray 13. In order to fit the side 901 of the first plate-shaped portion 905 of the base 2 into the space between the belt 51 and the first extending portion 672 of the first conveyance portion 67, the user moves the base 2 obliquely downward from the upstream side toward the downstream side. The side 901 of the first plate-shaped portion 905 moves obliquely downward from the upstream side toward the downstream side and enters the space between the first extending portion 672 and the belt 51. The side 901 of the first plate-shaped portion 905 comes into contact with the surface 69A of the moving portion 69 (refer to FIG. 53) from below. Because the surface 69A is inclined, the moving portion 69, in conjunction with the obliquely downward movement of the base 2, moves toward the fixed portion 68 side, against the urging force of the spring 676 (refer to FIG. 53). The moving portion 69 moves into the movement space. The distance between the edge on the second direction side of the moving portion 69 and the edge on the first direction side of the second protruding portion 621 (hereinafter simply called the distance between the moving portion 69 and the second protruding portion 621) becomes greater, so the base 2 can enter the space between the first extending portion 672 and the belt 51 more easily.

After the spring 676 has been compressed to the maximum extent and the moving portion 69 has been put into the state in which the moving portion 69 does not protrude from the fixed portion 68 (refer to FIG. 54), the side 901 of the base 2 is in contact with the first protruding portion 671. The base 2 applies a force to the first protruding portion 671 toward the downstream side. The first plate-shaped portion 905 contacts with the pair of the side plate portions 68B of the fixed portion 68 from below and applies an upward force to the fixed portion 68. The direction in which the first protruding portion 671 protrudes tilts toward the downstream side, with the claw portion 673 serving as a pivot point. The downstream end portion of the first protruding portion 671 moves toward the inner side of the belt 51 and presses on the belt 51. The belt 51 deforms elastically and is deflected toward the inner side. The distance between the conveyance path 103 and the edges of the pair of the side plate portions 68B on the side toward the belt 51 becomes greater. Therefore, the first plate-shaped portion 905 smoothly enters the space between the first extending portion 672 and the belt 51. When the side 902 of the base 2 is pressed downward, the first plate-shaped portion 905 is put into a state in which the base 2 is parallel to the conveyance path 103. The moving portion 69 is moved in the second direction by the urging force of the spring 676 and returns to the state in which the moving portion 69 protrudes from the fixed portion 68.

Figure 56:
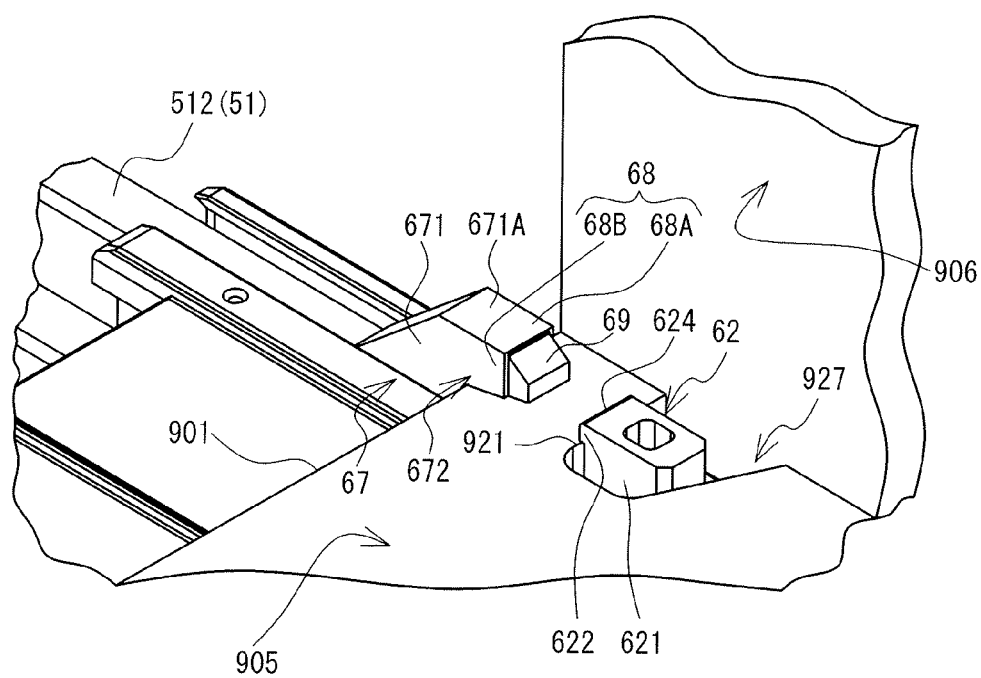
FIG. 56 is an enlarged oblique view of the first conveyance portion in the third modified example in a state in which the base has been placed on the second receiving tray.

In a state in which the base 2 has been placed on the second receiving tray 13, the first extending portion 672 covers the side 901 of the first plate-shaped portion 905 from above, as shown in FIG. 56. When the base 2 is conveyed toward the downstream side, the upward movement of the base 2 is restricted by the fixed portion 68 and the moving portion 69 of the first extending portion 672.

As explained above, the packaging device 1 can make the length of the first extending portion 672 of the first conveyance portion 67 in the conveyance direction greater than the length of the first extending portion 612 of the first conveyance portion 61 by the length of the moving portion 69 in the conveyance direction. The packaging device 1 is therefore able to convey the base 2 in a stable manner, even in a case where a large upward load is imposed on the side 901 of the first plate-shaped portion 905 when the base 2 is conveyed in the downstream direction.

Furthermore, in the packaging device 1, the moving portion 69 of the first extending portion 672 is configured to be movable in its extending direction in relation to the fixed portion 68. Along the movement of the moving portion 69, the distance between the moving portion 69 and the second protruding portion 621 varies. Therefore, by moving the moving portion 69 in the first direction and increasing the distance between the moving portion 69 and the second protruding portion 621, the packaging device 1 can create a state in which the base 2 can be fitted into the first conveyance portion 67 easily. Moreover, by moving the moving portion 69 in the second direction and decreasing the distance between the moving portion 69 and the second protruding portion 621, the packaging device 1 can create a state in which it is difficult for the base 2 to come loose from the first conveyance portion 67 while the base 2 is being conveyed.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A packaging device configured to package, with a film, an object and a base on which the object is placed, the packaging device comprising:
 a conveyance mechanism configured to convey the base along a conveyance path, the conveyance mechanism comprising
  a plurality of pulleys disposed such that axes of the plurality of pulleys are parallel to one another,
  an endless belt routed around the plurality of pulleys,
  a drive portion configured to rotationally drive the belt, and
  a conveyance portion comprising a first conveyance portion and a second conveyance portion,
   the first conveyance portion being provided on an outer side surface of the belt, the first conveyance portion comprising a first protruding portion and a first extending portion, the first protruding portion protruding outward from the outer side surface of the belt, and the first extending portion extending toward the second conveyance portion from a surface of the first protruding portion that faces the second conveyance portion,
   the second conveyance portion being provided on an outer side surface of the belt, the second conveyance portion being provided in a position separated from the first conveyance portion in a direction in which the belt extends, the second conveyance portion comprising a second protruding portion and a second extending portion, the second protruding portion protruding outward from the outer side surface of the belt, the second extending portion extending toward the first conveyance portion from a surface of the second protruding portion that faces the first conveyance portion;
 a guide portion configured to guide the film, the guide portion being configured to move along a movement path, the movement path extending in a direction that intersects the conveyance path; and
 a processor configured to cause the conveyance mechanism to convey the base and to cause the guide portion to move along the movement path, thereby packaging the object and the base with the film.

2. The packaging device according to claim 1, wherein the first extending portion includes a moving portion, the moving portion being at least a portion of the first extending portion, the moving portion being configured to move along an extending direction, and the extending direction being a direction in which the first extending portion extends.

3. The packaging device according to claim 2, wherein the first conveyance portion further comprises an urging portion configured to urge the moving toward the second conveyance portion.

4. The packaging device according to claim 1, wherein
 the belt is configured to elastically deform such that a direction in which the first protruding portion protrudes varies in relation to the conveyance path.

5. The packaging device according to claim 2, wherein
 a first surface is inclined such that the first surface comes closer to the belt as the first surface extends from a first side toward a second side, the first surface being a surface on an opposite side of the moving portion from a second surface that faces the belt, the first side being a side of the first surface connected to the first protruding portion, and the second side being a side of the first surface that is close to the second conveyance portion.

* * * * *